US009609003B1

(12) United States Patent  (10) Patent No.: US 9,609,003 B1
Chmielewski et al.  (45) Date of Patent: Mar. 28, 2017

(54) GENERATING RISK PROFILE USING DATA OF HOME MONITORING AND SECURITY SYSTEM

(71) Applicant: ICONTROL NETWORKS, INC., Redwood City, CA (US)

(72) Inventors: Tom Chmielewski, Redwood City, CA (US); Jim Kitchen, Redwood City, CA (US)

(73) Assignee: iControl Networks, Inc., Redwood City, CA (US)

( * ) Notice: Subject to any disclaimer, the term of this patent is extended or adjusted under 35 U.S.C. 154(b) by 0 days.

(21) Appl. No.: 14/201,022

(22) Filed: Mar. 7, 2014

Related U.S. Application Data

(63) Continuation-in-part of application No. 12/197,946, filed on Aug. 25, 2008, now Pat. No. 8,612,591, (Continued)

(51) Int. Cl.
*H04L 29/06* (2006.01)
*G06F 3/041* (2006.01)
(Continued)

(52) U.S. Cl.
CPC .......... *H04L 63/1408* (2013.01); *G05B 15/02* (2013.01); *G06F 3/041* (2013.01);
(Continued)

(58) Field of Classification Search
None
See application file for complete search history.

(56) References Cited

U.S. PATENT DOCUMENTS 686,838 A 11/1901 Appel
4,141,006 A 2/1979 Braxton
(Continued)

FOREIGN PATENT DOCUMENTS

AU 2005223267 B2 12/2010
AU 2010297957 A1 5/2012
(Continued)

OTHER PUBLICATIONS

Alarm.com—Interactive Security Systems, Elders [retrieved on Nov. 4, 2003], 1 page.
(Continued)

*Primary Examiner* — Mohamed Barakat
(74) *Attorney, Agent, or Firm* — IPR Law Goup, PC

(57) ABSTRACT

Systems and methods are described comprising a touchscreen that includes a processor coupled to a security system at a premises. A plurality of user interfaces presented via the touchscreen includes a security interface and a network interface. The security interface provides control of functions of the security system and access to data collected by the security system. The network interface provides access to network devices. The network devices are located at the premises and are coupled to the touchscreen. A security server at a remote location is coupled to the gateway and comprises a client interface through which remote client devices exchange data with the gateway and the security system. At least one of the security server and touchscreen collect behavioral data using the security system and the network devices, and generate a risk score using the behavioral data.

1 Claim, 22 Drawing Sheets

Related U.S. Application Data which is a continuation-in-part of application No. 13/718,851, filed on Dec. 18, 2012, and a continuation-in-part of application No. 13/932,837, filed on Jul. 1, 2013, and a continuation-in-part of application No. 11/761,745, filed on Jun. 12, 2007, now Pat. No. 8,635,350, and a continuation-in-part of application No. 12/019,568, filed on Jan. 24, 2008, and a continuation-in-part of application No. 13/925,181, filed on Jun. 24, 2013, and a continuation-in-part of application No. 13/531,757, filed on Jun. 25, 2012, and a continuation-in-part of application No. 13/335,279, filed on Dec. 22, 2011, and a continuation-in-part of application No. 12/539,537, filed on Aug. 11, 2009, and a continuation-in-part of application No. 12/750,470, filed on Mar. 30, 2010, now Pat. No. 9,191,228, and a continuation-in-part of application No. 13/104,932, filed on May 10, 2011.

(60) Provisional application No. 61/789,542, filed on Mar. 15, 2013, provisional application No. 61/782,345, filed on Mar. 14, 2013, provisional application No. 61/802,077, filed on Mar. 15, 2013, provisional application No. 61/777,061, filed on Mar. 12, 2013, provisional application No. 61/778,853, filed on Mar. 13, 2013, provisional application No. 61/779,028, filed on Mar. 13, 2013, provisional application No. 61/779,753, filed on Mar. 13, 2013, provisional application No. 61/780,092, filed on Mar. 13, 2013, provisional application No. 61/780,290, filed on Mar. 13, 2013, provisional application No. 61/780,435, filed on Mar. 13, 2013, provisional application No. 61/780,538, filed on Mar. 13, 2013, provisional application No. 61/780,637, filed on Mar. 13, 2013, provisional application No. 61/781,401, filed on Mar. 14, 2013, provisional application No. 61/781,713, filed on Mar. 14, 2013.

(51) Int. Cl.
  *G05B 15/02* (2006.01)
  *G08B 25/12* (2006.01)
  *H04L 29/08* (2006.01)

(52) U.S. Cl.
  CPC ............. *H04L 63/02* (2013.01); *G08B 25/12* (2013.01); *H04L 67/025* (2013.01); *H04L 67/04* (2013.01)

(56) References Cited

U.S. PATENT DOCUMENTS

| | | |
|---|---|---|
| 4,257,038 A | 3/1981 | Rounds et al. |
| 4,363,031 A | 12/1982 | Reinowitz |
| 4,520,503 A | 5/1985 | Kirst et al. |
| 4,559,526 A | 12/1985 | Tani et al. |
| 4,574,305 A | 3/1986 | Campbell et al. |
| 4,581,606 A | 4/1986 | Mallory |
| D284,084 S | 6/1986 | Ferrara, Jr. |
| 4,641,127 A | 2/1987 | Hogan et al. |
| 4,652,859 A | 3/1987 | Van Wienen |
| 4,694,282 A | 9/1987 | Tamura et al. |
| 4,730,184 A | 3/1988 | Bach |
| 4,754,261 A | 6/1988 | Marino |
| 4,779,007 A | 10/1988 | Schlanger et al. |
| 4,801,924 A | 1/1989 | Burgmann et al. |
| 4,812,820 A | 3/1989 | Chatwin |
| 4,833,449 A | 5/1989 | Gaffigan |
| 4,855,713 A | 8/1989 | Brunius |
| 4,860,185 A | 8/1989 | Brewer et al. |
| 4,897,630 A | 1/1990 | Nykerk |
| 4,918,623 A | 4/1990 | Lockitt et al. |
| 4,951,029 A | 8/1990 | Severson |
| 4,959,713 A | 9/1990 | Morotomi et al. |
| 4,993,059 A | 2/1991 | Smith et al. |
| 4,994,787 A | 2/1991 | Kratt et al. |
| 5,023,901 A | 6/1991 | Sloan et al. |
| 5,086,385 A | 2/1992 | Launey et al. |
| 5,091,780 A | 2/1992 | Pomerleau |
| 5,132,968 A | 7/1992 | Cephus |
| 5,134,644 A | 7/1992 | Garton et al. |
| 5,159,315 A | 10/1992 | Schultz et al. |
| 5,160,879 A | 11/1992 | Tortola et al. |
| D337,569 S | 7/1993 | Kando |
| 5,227,776 A | 7/1993 | Starefoss |
| 5,237,305 A | 8/1993 | Ishikuro et al. |
| 5,319,394 A | 6/1994 | Dukek |
| 5,319,698 A | 6/1994 | Glidewell et al. |
| 5,334,974 A | 8/1994 | Simms et al. |
| 5,438,607 A | 8/1995 | Przygoda, Jr. et al. |
| 5,446,445 A | 8/1995 | Bloomfield et al. |
| 5,465,081 A | 11/1995 | Todd |
| 5,471,194 A | 11/1995 | Guscott |
| 5,486,812 A | 1/1996 | Todd |
| 5,499,014 A | 3/1996 | Greenwaldt |
| 5,499,196 A | 3/1996 | Pacheco |
| 5,519,878 A | 5/1996 | Dolin, Jr. |
| 5,578,989 A | 11/1996 | Pedtke |
| 5,579,197 A | 11/1996 | Mengelt et al. |
| D377,034 S | 12/1996 | Matsushita |
| 5,587,705 A | 12/1996 | Morris |
| 5,623,601 A | 4/1997 | Vu |
| 5,625,338 A | 4/1997 | Pildner et al. |
| 5,630,216 A | 5/1997 | McEwan |
| 5,651,070 A | 7/1997 | Blunt |
| D389,501 S | 1/1998 | Mascarenas, Sr. et al. |
| 5,715,394 A | 2/1998 | Jabs |
| 5,717,379 A | 2/1998 | Peters |
| 5,717,578 A | 2/1998 | Afzal |
| 5,731,756 A | 3/1998 | Roddy |
| 5,777,551 A | 7/1998 | Hess |
| 5,874,952 A | 2/1999 | Morgan |
| 5,886,894 A | 3/1999 | Rakoff |
| 5,892,442 A | 4/1999 | Ozery |
| 5,907,279 A | 5/1999 | Bruins et al. |
| 5,909,183 A | 6/1999 | Borgstahl et al. |
| 5,914,655 A | 6/1999 | Clifton et al. |
| 5,943,394 A | 8/1999 | Ader et al. |
| 5,955,946 A | 9/1999 | Beheshti et al. |
| 5,958,053 A | 9/1999 | Denker |
| 5,959,528 A | 9/1999 | Right et al. |
| 5,963,916 A | 10/1999 | Kaplan |
| D416,910 S | 11/1999 | Vasquez |
| 5,991,795 A | 11/1999 | Howard et al. |
| 6,032,036 A | 2/2000 | Maystre et al. |
| 6,037,991 A | 3/2000 | Thro et al. |
| 6,038,289 A | 3/2000 | Sands |
| 6,040,770 A | 3/2000 | Britton |
| 6,049,272 A | 4/2000 | Lee et al. |
| 6,049,273 A | 4/2000 | Hess |
| 6,052,052 A | 4/2000 | Delmonaco |
| 6,060,994 A | 5/2000 | Chen |
| 6,067,346 A | 5/2000 | Akhteruzzaman et al. |
| 6,067,440 A | 5/2000 | Diefes |
| 6,078,253 A | 6/2000 | Fowler |
| 6,078,257 A | 6/2000 | Ferraro |
| 6,085,030 A | 7/2000 | Whitehead et al. |
| 6,104,785 A | 8/2000 | Chen |
| 6,134,591 A | 10/2000 | Nickles |
| 6,138,249 A | 10/2000 | Nolet |
| 6,140,987 A * | 10/2000 | Stein ............... H01H 13/70 345/173 |
| 6,181,341 B1 | 1/2001 | Shinagawa |
| 6,192,418 B1 | 2/2001 | Hale et al. |
| 6,198,475 B1 | 3/2001 | Kunimatsu et al. |
| 6,198,479 B1 | 3/2001 | Humpleman et al. |
| 6,208,247 B1 | 3/2001 | Agre et al. |
| 6,211,783 B1 | 4/2001 | Wang |
| 6,219,677 B1 | 4/2001 | Howard |

(56) References Cited

U.S. PATENT DOCUMENTS

| | | |
|---|---|---|
| 6,246,320 B1 | 6/2001 | Monroe |
| 6,271,752 B1 | 8/2001 | Vaios |
| 6,281,790 B1 | 8/2001 | Kimmel et al. |
| 6,282,569 B1 | 8/2001 | Wallis et al. |
| 6,286,038 B1 | 9/2001 | Reichmeyer et al. |
| 6,288,716 B1 | 9/2001 | Humpleman et al. |
| 6,289,382 B1 | 9/2001 | Bowman-Amuah |
| 6,295,346 B1 | 9/2001 | Markowitz et al. |
| 6,320,506 B1 | 11/2001 | Ferraro |
| D451,529 S | 12/2001 | Vasquez |
| 6,331,122 B1 | 12/2001 | Wu |
| 6,351,829 B1 | 2/2002 | Dupont et al. |
| 6,353,891 B1 | 3/2002 | Borella et al. |
| 6,363,417 B1 | 3/2002 | Howard et al. |
| 6,363,422 B1 | 3/2002 | Hunter et al. |
| 6,369,695 B1 | 4/2002 | Horon |
| 6,369,705 B1 | 4/2002 | Kennedy |
| 6,370,436 B1 | 4/2002 | Howard et al. |
| 6,374,079 B1 | 4/2002 | Hsu |
| 6,377,861 B1 | 4/2002 | York |
| 6,385,772 B1 | 5/2002 | Courtney |
| 6,400,265 B1 | 6/2002 | Saylor et al. |
| D460,472 S | 7/2002 | Wang |
| 6,418,037 B1 | 7/2002 | Zhang |
| 6,433,683 B1 | 8/2002 | Robinson |
| D464,328 S | 10/2002 | Vasquez et al. |
| D464,948 S | 10/2002 | Vasquez et al. |
| 6,462,507 B2 | 10/2002 | Fisher et al. |
| 6,462,663 B1 | 10/2002 | Wilson et al. |
| 6,467,084 B1 | 10/2002 | Howard et al. |
| 6,480,901 B1 | 11/2002 | Weber et al. |
| 6,493,020 B1 | 12/2002 | Stevenson et al. |
| 6,496,927 B1 | 12/2002 | McGrane et al. |
| 6,529,723 B1 | 3/2003 | Bentley |
| 6,542,075 B2 | 4/2003 | Barker et al. |
| 6,553,336 B1 | 4/2003 | Johnson et al. |
| 6,563,800 B1 | 5/2003 | Salo et al. |
| 6,574,234 B1 | 6/2003 | Myer et al. |
| 6,580,950 B1 | 6/2003 | Johnson et al. |
| 6,587,455 B1 | 7/2003 | Ray et al. |
| 6,587,736 B2 | 7/2003 | Howard et al. |
| 6,591,094 B1 | 7/2003 | Bentley |
| 6,597,703 B1 | 7/2003 | Li et al. |
| 6,601,086 B1 | 7/2003 | Howard et al. |
| 6,603,488 B2 | 8/2003 | Humpleman et al. |
| 6,609,127 B1 | 8/2003 | Lee et al. |
| 6,615,088 B1 | 9/2003 | Myer et al. |
| 6,621,827 B1 | 9/2003 | Rezvani et al. |
| 6,624,750 B1 | 9/2003 | Marman et al. |
| 6,631,416 B2 | 10/2003 | Bendinelli et al. |
| 6,636,893 B1 | 10/2003 | Fong |
| 6,643,652 B2 | 11/2003 | Helgeson et al. |
| 6,643,669 B1 | 11/2003 | Novak et al. |
| 6,648,682 B1 | 11/2003 | Wu |
| 6,658,091 B1 | 12/2003 | Naidoo et al. |
| 6,661,340 B1 | 12/2003 | Saylor et al. |
| 6,686,838 B1 | 2/2004 | Rezvani et al. |
| 6,690,411 B2 | 2/2004 | Naidoo et al. |
| 6,693,530 B1 | 2/2004 | Dowens et al. |
| 6,693,545 B2 | 2/2004 | Brown et al. |
| 6,697,103 B1 | 2/2004 | Fernandez et al. |
| 6,704,786 B1 | 3/2004 | Gupta et al. |
| 6,721,689 B2 | 4/2004 | Markle et al. |
| 6,721,747 B2 | 4/2004 | Lipkin |
| 6,738,824 B1 | 5/2004 | Blair |
| 6,754,717 B1 | 6/2004 | Day, III et al. |
| 6,756,896 B2 | 6/2004 | Ford |
| 6,756,998 B1 | 6/2004 | Bilger |
| 6,762,686 B1 | 7/2004 | Tabe |
| 6,778,085 B2 | 8/2004 | Faulkner et al. |
| 6,781,509 B1 | 8/2004 | Oppedahl et al. |
| 6,785,542 B1 | 8/2004 | Blight et al. |
| 6,789,147 B1 | 9/2004 | Kessler et al. |
| 6,795,322 B2 | 9/2004 | Aihara et al. |
| 6,798,344 B2 | 9/2004 | Faulkner et al. |
| 6,810,409 B1 | 10/2004 | Fry et al. |
| 6,826,233 B1 | 11/2004 | Oosawa |
| 6,850,252 B1 | 2/2005 | Hoffberg |
| 6,856,236 B2 | 2/2005 | Christensen et al. |
| 6,865,690 B2 | 3/2005 | Kocin |
| 6,873,256 B2 | 3/2005 | Lemelson et al. |
| D504,889 S | 5/2005 | Andre et al. |
| 6,891,838 B1 | 5/2005 | Petite et al. |
| 6,912,429 B1 | 6/2005 | Bilger |
| 6,918,112 B2 | 7/2005 | Bourke-Dunphy et al. |
| 6,928,148 B2 | 8/2005 | Simon et al. |
| 6,930,599 B2 | 8/2005 | Naidoo et al. |
| 6,930,730 B2 | 8/2005 | Maxon et al. |
| 6,931,445 B2 | 8/2005 | Davis |
| 6,943,681 B2 | 9/2005 | Rezvani et al. |
| 6,956,477 B2 | 10/2005 | Chun |
| 6,959,341 B1 | 10/2005 | Leung |
| 6,959,393 B2 | 10/2005 | Hollis et al. |
| 6,963,981 B1 | 11/2005 | Bailey et al. |
| 6,965,313 B1 | 11/2005 | Saylor et al. |
| 6,970,183 B1 | 11/2005 | Monroe |
| 6,972,676 B1 | 12/2005 | Kimmel et al. |
| 6,975,220 B1 | 12/2005 | Foodman et al. |
| 6,977,485 B1 | 12/2005 | Wei |
| 6,990,591 B1 | 1/2006 | Pearson |
| 7,015,806 B2 | 3/2006 | Naidoo et al. |
| 7,016,970 B2 | 3/2006 | Harumoto et al. |
| 7,020,697 B1 | 3/2006 | Goodman et al. |
| 7,020,701 B1 | 3/2006 | Gelvin et al. |
| 7,024,676 B1 | 4/2006 | Klopfenstein |
| 7,030,752 B2 | 4/2006 | Tyroler |
| 7,032,002 B1 | 4/2006 | Rezvani et al. |
| 7,034,681 B2 | 4/2006 | Yamamoto et al. |
| 7,035,907 B1 | 4/2006 | Decasper et al. |
| 7,039,391 B2 | 5/2006 | Rezvani et al. |
| 7,043,537 B1 | 5/2006 | Pratt |
| 7,047,088 B2 | 5/2006 | Nakamura et al. |
| 7,047,092 B2 | 5/2006 | Wimsatt |
| 7,053,764 B2 | 5/2006 | Stilp |
| 7,072,934 B2 | 7/2006 | Helgeson et al. |
| 7,075,429 B2 | 7/2006 | Marshall |
| 7,079,020 B2 | 7/2006 | Stilp |
| 7,080,046 B1 | 7/2006 | Rezvani et al. |
| 7,081,813 B2 | 7/2006 | Winick et al. |
| 7,082,460 B2 | 7/2006 | Hansen et al. |
| 7,085,937 B1 | 8/2006 | Rezvani et al. |
| 7,099,944 B1 | 8/2006 | Anschutz et al. |
| 7,099,994 B2 | 8/2006 | Thayer et al. |
| 7,103,152 B2 | 9/2006 | Naidoo et al. |
| 7,106,176 B2 | 9/2006 | La et al. |
| 7,107,322 B1 | 9/2006 | Freeny, Jr. |
| 7,110,774 B1 | 9/2006 | Davis et al. |
| 7,113,090 B1 * | 9/2006 | Saylor .............. G08B 13/19682 340/5.33 |
| 7,113,099 B2 | 9/2006 | Tyroler et al. |
| 7,114,554 B2 | 10/2006 | Bergman et al. |
| 7,119,674 B2 | 10/2006 | Sefton |
| 7,120,232 B2 | 10/2006 | Naidoo et al. |
| 7,120,233 B2 | 10/2006 | Naidoo et al. |
| 7,130,383 B2 | 10/2006 | Naidoo et al. |
| 7,130,585 B1 | 10/2006 | Ollis et al. |
| 7,148,810 B2 | 12/2006 | Bhat |
| 7,149,798 B2 | 12/2006 | Rezvani et al. |
| 7,149,814 B2 | 12/2006 | Neufeld et al. |
| 7,164,907 B2 | 1/2007 | Cochran et al. |
| 7,166,987 B2 | 1/2007 | Lee et al. |
| 7,174,564 B2 | 2/2007 | Weatherspoon et al. |
| 7,183,907 B2 | 2/2007 | Simon et al. |
| 7,203,486 B2 | 4/2007 | Patel |
| 7,209,945 B2 | 4/2007 | Hicks et al. |
| 7,212,570 B2 | 5/2007 | Akiyama et al. |
| 7,218,217 B2 | 5/2007 | Adonailo et al. |
| 7,222,359 B2 | 5/2007 | Freund et al. |
| 7,237,267 B2 | 6/2007 | Rayes et al. |
| 7,248,161 B2 | 7/2007 | Spoltore et al. |
| 7,249,317 B1 | 7/2007 | Nakagawa et al. |
| 7,250,854 B2 | 7/2007 | Rezvani et al. |
| 7,250,859 B2 | 7/2007 | Martin et al. |
| 7,254,779 B1 | 8/2007 | Rezvani et al. |

(56) References Cited

U.S. PATENT DOCUMENTS

| | | |
|---|---|---|
| 7,262,690 B2 | 8/2007 | Heaton et al. |
| 7,298,253 B2 | 11/2007 | Petricoin et al. |
| 7,305,461 B2 | 12/2007 | Ullman |
| 7,310,115 B2 | 12/2007 | Tanimoto |
| 7,313,102 B2 | 12/2007 | Stephenson et al. |
| D558,460 S | 1/2008 | Yu et al. |
| D558,756 S | 1/2008 | Andre et al. |
| 7,337,217 B2 | 2/2008 | Wang |
| 7,337,473 B2 | 2/2008 | Chang et al. |
| 7,343,619 B2 | 3/2008 | Ofek et al. |
| 7,349,761 B1 | 3/2008 | Cruse |
| 7,349,967 B2 | 3/2008 | Wang |
| 7,367,045 B2 | 4/2008 | Ofek et al. |
| 7,370,115 B2 | 5/2008 | Bae et al. |
| 7,383,339 B1 | 6/2008 | Meenan et al. |
| 7,403,838 B2 * | 7/2008 | Deen ............ G05B 19/042 379/102.01 |
| 7,409,045 B2 | 8/2008 | Naidoo et al. |
| 7,409,451 B1 | 8/2008 | Meenan et al. |
| 7,412,447 B2 | 8/2008 | Hilbert et al. |
| 7,425,101 B2 | 9/2008 | Cheng |
| 7,428,585 B1 | 9/2008 | Owens, II et al. |
| 7,430,614 B2 | 9/2008 | Shen et al. |
| 7,437,753 B2 | 10/2008 | Nahum |
| 7,440,434 B2 | 10/2008 | Chaskar et al. |
| 7,457,869 B2 | 11/2008 | Kernan |
| 7,469,139 B2 | 12/2008 | Van De Groenendaal |
| 7,469,294 B1 | 12/2008 | Luo et al. |
| 7,469,381 B2 | 12/2008 | Ording |
| D584,738 S | 1/2009 | Kim et al. |
| D585,399 S | 1/2009 | Hwang |
| 7,479,949 B2 | 1/2009 | Jobs et al. |
| 7,480,713 B2 | 1/2009 | Ullman |
| 7,480,724 B2 | 1/2009 | Zimler et al. |
| 7,498,695 B2 | 3/2009 | Gaudreau et al. |
| 7,506,052 B2 | 3/2009 | Qian et al. |
| 7,509,687 B2 | 3/2009 | Ofek et al. |
| 7,511,614 B2 | 3/2009 | Stilp et al. |
| 7,512,965 B1 | 3/2009 | Amdur et al. |
| 7,526,539 B1 | 4/2009 | Hsu |
| 7,526,762 B1 | 4/2009 | Astala et al. |
| 7,528,723 B2 | 5/2009 | Fast et al. |
| 7,551,071 B2 | 6/2009 | Bennett, III |
| 7,554,934 B2 | 6/2009 | Abraham et al. |
| 7,558,379 B2 | 7/2009 | Winick |
| 7,568,018 B1 | 7/2009 | Hove et al. |
| 7,571,459 B2 | 8/2009 | Ganesh et al. |
| 7,577,420 B2 | 8/2009 | Srinivasan et al. |
| 7,587,464 B2 | 9/2009 | Moorer et al. |
| D602,014 S | 10/2009 | Andre et al. |
| D602,015 S | 10/2009 | Andre et al. |
| D602,017 S | 10/2009 | Andre et al. |
| D602,486 S | 10/2009 | Andre et al. |
| D602,487 S | 10/2009 | Maskatia |
| 7,619,512 B2 | 11/2009 | Trundle et al. |
| 7,620,427 B2 | 11/2009 | Shanahan |
| 7,627,665 B2 | 12/2009 | Barker et al. |
| 7,633,385 B2 | 12/2009 | Cohn et al. |
| 7,634,519 B2 | 12/2009 | Creamer et al. |
| 7,651,530 B2 | 1/2010 | Winick |
| 7,653,911 B2 | 1/2010 | Doshi et al. |
| 7,681,201 B2 | 3/2010 | Dale et al. |
| 7,697,028 B1 | 4/2010 | Johnson |
| 7,701,970 B2 | 4/2010 | Krits et al. |
| D615,083 S | 5/2010 | Andre et al. |
| 7,711,796 B2 | 5/2010 | Gutt et al. |
| 7,734,020 B2 | 6/2010 | Elliot et al. |
| 7,734,286 B2 | 6/2010 | Almeda et al. |
| 7,734,906 B2 | 6/2010 | Orlando et al. |
| 7,739,596 B2 | 6/2010 | Clarke-Martin et al. |
| 7,751,409 B1 | 7/2010 | Carolan |
| 7,787,863 B2 | 8/2010 | van de Groenendaal |
| D624,896 S | 10/2010 | Park et al. |
| D626,437 S | 11/2010 | Lee et al. |
| 7,827,252 B2 | 11/2010 | Hopmann et al. |
| 7,855,635 B2 | 12/2010 | Cohn et al. |
| 7,859,404 B2 | 12/2010 | Chul Lee et al. |
| 7,882,537 B2 | 2/2011 | Okajo et al. |
| 7,884,855 B2 | 2/2011 | Ortiz |
| 7,890,612 B2 | 2/2011 | Todd et al. |
| 7,911,341 B2 | 3/2011 | Raji et al. |
| D636,769 S | 4/2011 | Wood et al. |
| 7,921,686 B2 | 4/2011 | Bagepalli et al. |
| D637,596 S | 5/2011 | Akana et al. |
| D639,805 S | 6/2011 | Song et al. |
| D640,663 S | 6/2011 | Arnholt et al. |
| 7,956,736 B2 | 6/2011 | Cohn et al. |
| 7,970,863 B1 | 6/2011 | Fontaine |
| D641,018 S | 7/2011 | Lee et al. |
| 7,974,235 B2 | 7/2011 | Ghozati et al. |
| D642,563 S | 8/2011 | Akana et al. |
| 8,001,219 B2 | 8/2011 | Moorer et al. |
| D645,015 S | 9/2011 | Lee et al. |
| D645,435 S | 9/2011 | Kim et al. |
| D645,833 S | 9/2011 | Seflic et al. |
| 8,022,833 B2 | 9/2011 | Cho |
| 8,028,041 B2 | 9/2011 | Olliphant et al. |
| 8,042,049 B2 | 10/2011 | Killian et al. |
| 8,046,411 B2 | 10/2011 | Hayashi et al. |
| D650,381 S | 12/2011 | Park et al. |
| 8,073,931 B2 | 12/2011 | Dawes et al. |
| 8,086,702 B2 | 12/2011 | Baum et al. |
| 8,086,703 B2 | 12/2011 | Baum et al. |
| D654,460 S | 2/2012 | Kim et al. |
| D654,497 S | 2/2012 | Lee |
| 8,122,131 B2 | 2/2012 | Baum et al. |
| 8,125,184 B2 | 2/2012 | Raji et al. |
| D656,137 S | 3/2012 | Chung et al. |
| 8,140,658 B1 | 3/2012 | Gelvin et al. |
| 8,159,519 B2 | 4/2012 | Kurtz et al. |
| 8,200,827 B1 | 6/2012 | Hunyady et al. |
| 8,209,400 B2 | 6/2012 | Baum et al. |
| D663,298 S | 7/2012 | Song et al. |
| D664,540 S | 7/2012 | Kim et al. |
| 8,214,496 B2 | 7/2012 | Gutt et al. |
| D664,954 S | 8/2012 | Kim et al. |
| D666,198 S | 8/2012 | Van Den Nieuwenhuizen et al. |
| 8,239,477 B2 | 8/2012 | Sharma et al. |
| D667,395 S | 9/2012 | Lee |
| D667,396 S | 9/2012 | Koh |
| D667,397 S | 9/2012 | Koh |
| D667,398 S | 9/2012 | Koh |
| D667,399 S | 9/2012 | Koh |
| 8,269,623 B2 | 9/2012 | Addy et al. |
| D668,650 S | 10/2012 | Han |
| D668,651 S | 10/2012 | Kim et al. |
| D668,652 S | 10/2012 | Kim et al. |
| D669,469 S | 10/2012 | Kang |
| D670,692 S | 11/2012 | Akana et al. |
| D671,514 S | 11/2012 | Kim et al. |
| 8,311,526 B2 | 11/2012 | Forstall et al. |
| D671,938 S | 12/2012 | Hsu et al. |
| D672,344 S | 12/2012 | Li |
| D672,345 S | 12/2012 | Li |
| D672,739 S | 12/2012 | Sin |
| D672,768 S | 12/2012 | Huang et al. |
| 8,335,842 B2 | 12/2012 | Raji et al. |
| 8,335,854 B2 | 12/2012 | Eldering |
| D673,561 S | 1/2013 | Hyun et al. |
| D673,948 S | 1/2013 | Andre et al. |
| D673,950 S | 1/2013 | Li et al. |
| D674,369 S | 1/2013 | Jaewoong |
| D675,203 S | 1/2013 | Yang |
| D675,588 S | 2/2013 | Park |
| D675,612 S | 2/2013 | Andre et al. |
| D676,443 S | 2/2013 | Canizares et al. |
| D676,819 S | 2/2013 | Choi |
| D677,255 S | 3/2013 | McManigal et al. |
| D677,640 S | 3/2013 | Kim et al. |
| D677,659 S | 3/2013 | Akana et al. |
| D677,660 S | 3/2013 | Groene et al. |
| D678,271 S | 3/2013 | Chiu |
| D678,272 S | 3/2013 | Groene et al. |
| D678,877 S | 3/2013 | Groene et al. |

(56) References Cited

U.S. PATENT DOCUMENTS

| | | | |
|---|---|---|---|
| D679,706 S | 4/2013 | Tang et al. |
| D680,151 S | 4/2013 | Katori |
| D680,524 S | 4/2013 | Feng et al. |
| D681,032 S | 4/2013 | Akana et al. |
| D681,583 S | 5/2013 | Park |
| D681,591 S | 5/2013 | Sung |
| D681,632 S | 5/2013 | Akana et al. |
| D682,239 S | 5/2013 | Yeh et al. |
| 8,451,986 B2 | 5/2013 | Cohn et al. |
| D684,553 S | 6/2013 | Kim et al. |
| D684,968 S | 6/2013 | Smith et al. |
| 8,473,619 B2 | 6/2013 | Baum et al. |
| D685,778 S | 7/2013 | Fahrendorff et al. |
| D685,783 S | 7/2013 | Bryan et al. |
| 8,478,844 B2 | 7/2013 | Baum et al. |
| 8,478,871 B2 | 7/2013 | Gutt et al. |
| 8,483,853 B1 | 7/2013 | Lambourne |
| 8,499,038 B1 | 7/2013 | Vucurevich |
| 8,520,068 B2 | 8/2013 | Naidoo et al. |
| 8,525,664 B2 | 9/2013 | Hadizad et al. |
| 8,543,665 B2 | 9/2013 | Ansari et al. |
| 8,584,199 B1 | 11/2013 | Chen et al. |
| 8,612,591 B2 | 12/2013 | Dawes et al. |
| 8,675,071 B1 | 3/2014 | Slavin et al. |
| 8,730,834 B2 | 5/2014 | Marusca et al. |
| 8,836,467 B1 | 9/2014 | Cohn et al. |
| 8,902,740 B2 | 12/2014 | Hicks, III |
| 8,914,526 B1 | 12/2014 | Lindquist et al. |
| 8,935,236 B2 | 1/2015 | Morita et al. |
| 2001/0016501 A1 | 8/2001 | King |
| 2001/0030597 A1 | 10/2001 | Inoue et al. |
| 2001/0034754 A1 | 10/2001 | Elwahab et al. |
| 2002/0004828 A1 | 1/2002 | Davis et al. |
| 2002/0026476 A1 | 2/2002 | Miyazaki et al. |
| 2002/0026531 A1 | 2/2002 | Keane et al. |
| 2002/0027504 A1 | 3/2002 | Davis et al. |
| 2002/0029276 A1 | 3/2002 | Bendinelli et al. |
| 2002/0038380 A1 | 3/2002 | Brawn et al. |
| 2002/0052913 A1 | 5/2002 | Yamada et al. |
| 2002/0059637 A1 | 5/2002 | Rakib |
| 2002/0083342 A1 | 6/2002 | Webb et al. |
| 2002/0095490 A1 | 7/2002 | Barker et al. |
| 2002/0099809 A1 | 7/2002 | Lee |
| 2002/0099829 A1 | 7/2002 | Richards et al. |
| 2002/0103898 A1 | 8/2002 | Moyer et al. |
| 2002/0103927 A1 | 8/2002 | Parent |
| 2002/0107910 A1 | 8/2002 | Zhao |
| 2002/0109580 A1 | 8/2002 | Shreve et al. |
| 2002/0111698 A1* | 8/2002 | Graziano ............... G05B 15/02 700/17 |
| 2002/0112051 A1 | 8/2002 | Ullman |
| 2002/0112182 A1 | 8/2002 | Chang et al. |
| 2002/0114439 A1 | 8/2002 | Dunlap |
| 2002/0116117 A1 | 8/2002 | Martens et al. |
| 2002/0118107 A1 | 8/2002 | Yamamoto et al. |
| 2002/0120790 A1 | 8/2002 | Schwalb |
| 2002/0128728 A1 | 9/2002 | Murakami et al. |
| 2002/0133539 A1 | 9/2002 | Monday |
| 2002/0133578 A1 | 9/2002 | Wu |
| 2002/0143923 A1 | 10/2002 | Alexander |
| 2002/0147982 A1 | 10/2002 | Naidoo et al. |
| 2002/0156564 A1 | 10/2002 | Preston et al. |
| 2002/0163534 A1 | 11/2002 | Choi et al. |
| 2002/0163997 A1 | 11/2002 | Bergman et al. |
| 2002/0165006 A1 | 11/2002 | Haller et al. |
| 2002/0174367 A1 | 11/2002 | Kimmel et al. |
| 2002/0177428 A1 | 11/2002 | Menard et al. |
| 2002/0180579 A1 | 12/2002 | Nagaoka et al. |
| 2002/0184301 A1 | 12/2002 | Parent |
| 2003/0005030 A1 | 1/2003 | Sutton et al. |
| 2003/0009552 A1 | 1/2003 | Benfield et al. |
| 2003/0009553 A1 | 1/2003 | Benfield et al. |
| 2003/0023839 A1 | 1/2003 | Burkhardt et al. |
| 2003/0030548 A1 | 2/2003 | Kovacs et al. |
| 2003/0038849 A1 | 2/2003 | Craven et al. |
| 2003/0041137 A1 | 2/2003 | Horie et al. |
| 2003/0041167 A1 | 2/2003 | French et al. |
| 2003/0051009 A1 | 3/2003 | Shah et al. |
| 2003/0052923 A1 | 3/2003 | Porter |
| 2003/0061344 A1 | 3/2003 | Monroe |
| 2003/0062997 A1 | 4/2003 | Naidoo et al. |
| 2003/0065757 A1 | 4/2003 | Mentze et al. |
| 2003/0071724 A1 | 4/2003 | D'Amico |
| 2003/0081768 A1 | 5/2003 | Caminschi et al. |
| 2003/0090473 A1 | 5/2003 | Joshi |
| 2003/0103088 A1 | 6/2003 | Dresti et al. |
| 2003/0115345 A1 | 6/2003 | Chien et al. |
| 2003/0128115 A1 | 7/2003 | Giacopelli et al. |
| 2003/0132018 A1 | 7/2003 | Okita et al. |
| 2003/0137426 A1 | 7/2003 | Anthony et al. |
| 2003/0147534 A1 | 8/2003 | Ablay et al. |
| 2003/0158635 A1 | 8/2003 | Pillar et al. |
| 2003/0159135 A1 | 8/2003 | Hiller et al. |
| 2003/0174648 A1 | 9/2003 | Wang et al. |
| 2003/0177236 A1 | 9/2003 | Goto et al. |
| 2003/0182396 A1 | 9/2003 | Reich et al. |
| 2003/0187920 A1 | 10/2003 | Redkar |
| 2003/0189509 A1 | 10/2003 | Hayes et al. |
| 2003/0197847 A1 | 10/2003 | Shinoda |
| 2003/0200325 A1 | 10/2003 | Krishnaswamy et al. |
| 2003/0201889 A1 | 10/2003 | Zulkowski |
| 2003/0210126 A1 | 11/2003 | Kanazawa |
| 2003/0217136 A1 | 11/2003 | Cho et al. |
| 2003/0230934 A1 | 12/2003 | Cordelli et al. |
| 2003/0236841 A1 | 12/2003 | Epshteyn |
| 2004/0003241 A1 | 1/2004 | Sengodan et al. |
| 2004/0015572 A1 | 1/2004 | Kang |
| 2004/0024851 A1 | 2/2004 | Naidoo et al. |
| 2004/0037295 A1 | 2/2004 | Tanaka et al. |
| 2004/0054789 A1 | 3/2004 | Breh et al. |
| 2004/0086088 A1 | 5/2004 | Naidoo et al. |
| 2004/0086090 A1 | 5/2004 | Naidoo et al. |
| 2004/0086093 A1 | 5/2004 | Schranz |
| 2004/0103308 A1 | 5/2004 | Paller |
| 2004/0117330 A1 | 6/2004 | Ehlers et al. |
| 2004/0117462 A1 | 6/2004 | Bodin et al. |
| 2004/0117465 A1 | 6/2004 | Bodin et al. |
| 2004/0123149 A1 | 6/2004 | Tyroler |
| 2004/0139227 A1 | 7/2004 | Takeda |
| 2004/0143749 A1 | 7/2004 | Tajalli et al. |
| 2004/0155757 A1 | 8/2004 | Litwin et al. |
| 2004/0162902 A1 | 8/2004 | Davis |
| 2004/0163073 A1 | 8/2004 | Krzyzanowski et al. |
| 2004/0163118 A1 | 8/2004 | Mottur |
| 2004/0169288 A1 | 9/2004 | Hsieh et al. |
| 2004/0177163 A1 | 9/2004 | Casey et al. |
| 2004/0189460 A1 | 9/2004 | Heaton et al. |
| 2004/0189871 A1 | 9/2004 | Kurosawa et al. |
| 2004/0196844 A1 | 10/2004 | Hagino |
| 2004/0199645 A1 | 10/2004 | Rouhi |
| 2004/0202351 A1 | 10/2004 | Park et al. |
| 2004/0212503 A1 | 10/2004 | Stilp |
| 2004/0215694 A1 | 10/2004 | Podolsky |
| 2004/0215700 A1 | 10/2004 | Shenfield et al. |
| 2004/0223605 A1 | 11/2004 | Donnelly |
| 2004/0243835 A1 | 12/2004 | Terzis et al. |
| 2004/0243996 A1 | 12/2004 | Sheehy et al. |
| 2004/0246339 A1 | 12/2004 | Ooshima et al. |
| 2004/0249922 A1 | 12/2004 | Hackman et al. |
| 2004/0257433 A1 | 12/2004 | Lia et al. |
| 2004/0260407 A1 | 12/2004 | Wimsatt |
| 2004/0260427 A1 | 12/2004 | Wimsatt |
| 2004/0267937 A1 | 12/2004 | Klemets |
| 2005/0010866 A1 | 1/2005 | Humpleman et al. |
| 2005/0015805 A1 | 1/2005 | Iwamura |
| 2005/0023858 A1 | 2/2005 | Bingle et al. |
| 2005/0024203 A1 | 2/2005 | Wolfe |
| 2005/0038325 A1 | 2/2005 | Moll |
| 2005/0038326 A1 | 2/2005 | Mathur |
| 2005/0044061 A1 | 2/2005 | Klemow |
| 2005/0052831 A1 | 3/2005 | Chen |
| 2005/0060411 A1 | 3/2005 | Coulombe et al. |
| 2005/0066045 A1 | 3/2005 | Johnson et al. |
| 2005/0069098 A1 | 3/2005 | Kalervo et al. |

(56) References Cited

U.S. PATENT DOCUMENTS

| | | |
|---|---|---|
| 2005/0079855 A1 | 4/2005 | Jethi et al. |
| 2005/0086126 A1 | 4/2005 | Patterson |
| 2005/0086211 A1 | 4/2005 | Mayer |
| 2005/0091696 A1 | 4/2005 | Wolfe et al. |
| 2005/0096753 A1 | 5/2005 | Arling et al. |
| 2005/0102152 A1 | 5/2005 | Hodges |
| 2005/0108091 A1 | 5/2005 | Sotak et al. |
| 2005/0108369 A1 | 5/2005 | Sather et al. |
| 2005/0120082 A1 | 6/2005 | Hesselink et al. |
| 2005/0125083 A1 | 6/2005 | Kiko |
| 2005/0128068 A1 | 6/2005 | Winick et al. |
| 2005/0128083 A1 | 6/2005 | Puzio et al. |
| 2005/0144312 A1 | 6/2005 | Kadyk et al. |
| 2005/0149639 A1 | 7/2005 | Vrielink et al. |
| 2005/0149746 A1 | 7/2005 | Lu et al. |
| 2005/0156568 A1 | 7/2005 | Yueh |
| 2005/0159823 A1 | 7/2005 | Hayes et al. |
| 2005/0169288 A1 | 8/2005 | Kamiwada et al. |
| 2005/0184865 A1 | 8/2005 | Han et al. |
| 2005/0197847 A1 | 9/2005 | Smith |
| 2005/0200474 A1 | 9/2005 | Behnke |
| 2005/0204076 A1 | 9/2005 | Cumpson et al. |
| 2005/0210532 A1 | 9/2005 | Winick |
| 2005/0216302 A1 | 9/2005 | Raji et al. |
| 2005/0216580 A1 | 9/2005 | Raji et al. |
| 2005/0222820 A1 | 10/2005 | Chung et al. |
| 2005/0231349 A1 | 10/2005 | Bhat |
| 2005/0237182 A1 | 10/2005 | Wang |
| 2005/0249199 A1 | 11/2005 | Albert et al. |
| 2005/0256608 A1 | 11/2005 | King et al. |
| 2005/0267605 A1 | 12/2005 | Lee et al. |
| 2005/0273831 A1 | 12/2005 | Slomovich et al. |
| 2005/0276389 A1 | 12/2005 | Hinkson et al. |
| 2005/0280964 A1 | 12/2005 | Richmond et al. |
| 2006/0009863 A1 | 1/2006 | Lingemann |
| 2006/0010078 A1 | 1/2006 | Rezvani et al. |
| 2006/0018328 A1 | 1/2006 | Mody et al. |
| 2006/0045074 A1 | 3/2006 | Lee |
| 2006/0051122 A1 | 3/2006 | Kawazu et al. |
| 2006/0063534 A1 | 3/2006 | Kokkonen et al. |
| 2006/0064305 A1 | 3/2006 | Alonso |
| 2006/0064478 A1 | 3/2006 | Sirkin |
| 2006/0067344 A1 | 3/2006 | Sakurai |
| 2006/0067484 A1 | 3/2006 | Elliot et al. |
| 2006/0075235 A1 | 4/2006 | Renkis |
| 2006/0078344 A1 | 4/2006 | Kawazu et al. |
| 2006/0088092 A1 | 4/2006 | Chen et al. |
| 2006/0105713 A1 | 5/2006 | Zheng et al. |
| 2006/0109113 A1 | 5/2006 | Reyes et al. |
| 2006/0111095 A1 | 5/2006 | Weigand |
| 2006/0129837 A1 | 6/2006 | Im et al. |
| 2006/0132302 A1 | 6/2006 | Stilp |
| 2006/0142880 A1 | 6/2006 | Deen et al. |
| 2006/0142968 A1 | 6/2006 | Han et al. |
| 2006/0143268 A1 | 6/2006 | Chatani |
| 2006/0145842 A1 | 7/2006 | Stilp |
| 2006/0161270 A1 | 7/2006 | Luskin et al. |
| 2006/0161662 A1 | 7/2006 | Ng et al. |
| 2006/0161960 A1 | 7/2006 | Benoit |
| 2006/0167784 A1 | 7/2006 | Hoffberg |
| 2006/0168178 A1 | 7/2006 | Hwang et al. |
| 2006/0181406 A1 | 8/2006 | Petite et al. |
| 2006/0182100 A1 | 8/2006 | Li et al. |
| 2006/0187900 A1 | 8/2006 | Akbar |
| 2006/0190458 A1 | 8/2006 | Mishina et al. |
| 2006/0197660 A1 | 9/2006 | Luebke et al. |
| 2006/0200845 A1 | 9/2006 | Foster et al. |
| 2006/0206220 A1 | 9/2006 | Amundson |
| 2006/0209857 A1 | 9/2006 | Hicks, III |
| 2006/0218593 A1 | 9/2006 | Afshary et al. |
| 2006/0220830 A1* | 10/2006 | Bennett, III ........ H04L 12/2803 340/506 |
| 2006/0222153 A1 | 10/2006 | Tarkoff et al. |
| 2006/0229746 A1 | 10/2006 | Ollis et al. |
| 2006/0230270 A1 | 10/2006 | Goffin |
| 2006/0242395 A1 | 10/2006 | Fausak |
| 2006/0245369 A1 | 11/2006 | Schimmelpfeng et al. |
| 2006/0246919 A1 | 11/2006 | Park et al. |
| 2006/0258342 A1 | 11/2006 | Fok et al. |
| 2006/0265489 A1 | 11/2006 | Moore |
| 2006/0271695 A1 | 11/2006 | Lavian |
| 2006/0282886 A1 | 12/2006 | Gaug |
| 2007/0002833 A1 | 1/2007 | Bajic |
| 2007/0005736 A1 | 1/2007 | Hansen et al. |
| 2007/0005957 A1 | 1/2007 | Sahita et al. |
| 2007/0006177 A1 | 1/2007 | Aiber et al. |
| 2007/0052675 A1 | 3/2007 | Chang |
| 2007/0055770 A1 | 3/2007 | Karmakar et al. |
| 2007/0061266 A1 | 3/2007 | Moore et al. |
| 2007/0063866 A1 | 3/2007 | Webb |
| 2007/0079151 A1 | 4/2007 | Connor et al. |
| 2007/0079385 A1 | 4/2007 | Williams et al. |
| 2007/0096981 A1 | 5/2007 | Abraham |
| 2007/0101345 A1 | 5/2007 | Takagi |
| 2007/0106124 A1 | 5/2007 | Kuriyama et al. |
| 2007/0130286 A1 | 6/2007 | Hopmann et al. |
| 2007/0142022 A1 | 6/2007 | Madonna et al. |
| 2007/0143440 A1 | 6/2007 | Reckamp et al. |
| 2007/0146484 A1 | 6/2007 | Horton et al. |
| 2007/0147419 A1 | 6/2007 | Tsujimoto et al. |
| 2007/0155325 A1 | 7/2007 | Bambic et al. |
| 2007/0162228 A1 | 7/2007 | Mitchell |
| 2007/0162680 A1 | 7/2007 | Mitchell et al. |
| 2007/0192486 A1 | 8/2007 | Wilson et al. |
| 2007/0198698 A1 | 8/2007 | Boyd et al. |
| 2007/0216783 A1 | 9/2007 | Ortiz et al. |
| 2007/0223465 A1 | 9/2007 | Wang et al. |
| 2007/0226182 A1 | 9/2007 | Sobotka et al. |
| 2007/0230415 A1 | 10/2007 | Malik |
| 2007/0245223 A1 | 10/2007 | Siedzik et al. |
| 2007/0256105 A1 | 11/2007 | Tabe |
| 2007/0265866 A1 | 11/2007 | Fehling et al. |
| 2007/0271398 A1 | 11/2007 | Manchester et al. |
| 2007/0286210 A1 | 12/2007 | Gutt et al. |
| 2007/0286369 A1 | 12/2007 | Gutt et al. |
| 2007/0287405 A1 | 12/2007 | Radtke |
| 2007/0288849 A1 | 12/2007 | Moorer et al. |
| 2007/0298772 A1 | 12/2007 | Owens et al. |
| 2008/0001734 A1 | 1/2008 | Stilp et al. |
| 2008/0013957 A1 | 1/2008 | Akers et al. |
| 2008/0027587 A1 | 1/2008 | Nickerson et al. |
| 2008/0042826 A1 | 2/2008 | Hevia et al. |
| 2008/0048975 A1 | 2/2008 | Leibow |
| 2008/0065681 A1 | 3/2008 | Fontijn et al. |
| 2008/0072244 A1 | 3/2008 | Eker et al. |
| 2008/0084296 A1 | 4/2008 | Kutzik et al. |
| 2008/0091793 A1 | 4/2008 | Diroo et al. |
| 2008/0104516 A1 | 5/2008 | Lee |
| 2008/0109650 A1 | 5/2008 | Shim et al. |
| 2008/0112405 A1 | 5/2008 | Cholas et al. |
| 2008/0117029 A1 | 5/2008 | Dohrmann et al. |
| 2008/0126535 A1 | 5/2008 | Zhu et al. |
| 2008/0133725 A1 | 6/2008 | Shaouy |
| 2008/0141303 A1 | 6/2008 | Walker et al. |
| 2008/0141341 A1 | 6/2008 | Vinogradov et al. |
| 2008/0147834 A1 | 6/2008 | Quinn et al. |
| 2008/0163355 A1 | 7/2008 | Chu |
| 2008/0168404 A1 | 7/2008 | Ording |
| 2008/0170511 A1 | 7/2008 | Shorty et al. |
| 2008/0180240 A1 | 7/2008 | Raji et al. |
| 2008/0183842 A1 | 7/2008 | Raji et al. |
| 2008/0189609 A1 | 8/2008 | Larson et al. |
| 2008/0219239 A1 | 9/2008 | Bell et al. |
| 2008/0235326 A1 | 9/2008 | Parsi et al. |
| 2008/0235600 A1 | 9/2008 | Harper et al. |
| 2008/0240372 A1 | 10/2008 | Frenette |
| 2008/0253391 A1 | 10/2008 | Krits et al. |
| 2008/0261540 A1 | 10/2008 | Rohani et al. |
| 2008/0284587 A1 | 11/2008 | Saigh et al. |
| 2008/0316024 A1 | 12/2008 | Chantelou et al. |
| 2009/0019141 A1 | 1/2009 | Bush et al. |
| 2009/0036142 A1 | 2/2009 | Yan |
| 2009/0041467 A1 | 2/2009 | Carleton et al. |
| 2009/0042649 A1 | 2/2009 | Hsieh et al. |

(56) References Cited

U.S. PATENT DOCUMENTS

| | | |
|---|---|---|
| 2009/0049488 A1 | 2/2009 | Stransky |
| 2009/0063582 A1 | 3/2009 | Anna et al. |
| 2009/0066788 A1 | 3/2009 | Baum et al. |
| 2009/0066789 A1 | 3/2009 | Baum et al. |
| 2009/0067395 A1 | 3/2009 | Curtis et al. |
| 2009/0070436 A1 | 3/2009 | Dawes et al. |
| 2009/0070473 A1 | 3/2009 | Baum et al. |
| 2009/0070477 A1 | 3/2009 | Baum et al. |
| 2009/0070681 A1 | 3/2009 | Dawes et al. |
| 2009/0070682 A1 | 3/2009 | Dawes et al. |
| 2009/0070692 A1 | 3/2009 | Dawes et al. |
| 2009/0074184 A1 | 3/2009 | Baum et al. |
| 2009/0077167 A1 | 3/2009 | Baum et al. |
| 2009/0077622 A1 | 3/2009 | Baum et al. |
| 2009/0077623 A1 | 3/2009 | Baum et al. |
| 2009/0077624 A1 | 3/2009 | Baum et al. |
| 2009/0100329 A1 | 4/2009 | Espinoza |
| 2009/0100492 A1 | 4/2009 | Hicks, III et al. |
| 2009/0113344 A1 | 4/2009 | Nesse et al. |
| 2009/0119397 A1 | 5/2009 | Neerdaels |
| 2009/0125708 A1 | 5/2009 | Woodring et al. |
| 2009/0128365 A1 | 5/2009 | Laskin |
| 2009/0134998 A1 | 5/2009 | Baum et al. |
| 2009/0138600 A1 | 5/2009 | Baum et al. |
| 2009/0138958 A1 | 5/2009 | Baum et al. |
| 2009/0146846 A1 | 6/2009 | Grossman |
| 2009/0158189 A1 | 6/2009 | Itani |
| 2009/0158292 A1 | 6/2009 | Rattner et al. |
| 2009/0165114 A1 | 6/2009 | Baum et al. |
| 2009/0177906 A1 | 7/2009 | Paniagua, Jr. et al. |
| 2009/0204693 A1 | 8/2009 | Andreev et al. |
| 2009/0221368 A1 | 9/2009 | Yen et al. |
| 2009/0240787 A1 | 9/2009 | Denny |
| 2009/0240814 A1 | 9/2009 | Brubacher et al. |
| 2009/0240946 A1 | 9/2009 | Yeap et al. |
| 2009/0256708 A1 | 10/2009 | Hsiao et al. |
| 2009/0303100 A1 | 12/2009 | Zemany |
| 2009/0313693 A1 | 12/2009 | Rogers |
| 2009/0322510 A1 | 12/2009 | Berger et al. |
| 2010/0008274 A1 | 1/2010 | Kneckt et al. |
| 2010/0023865 A1 | 1/2010 | Fulker et al. |
| 2010/0026487 A1 | 2/2010 | Hershkovitz |
| 2010/0030578 A1 | 2/2010 | Siddique et al. |
| 2010/0030810 A1 | 2/2010 | Marr |
| 2010/0052612 A1 | 3/2010 | Raji et al. |
| 2010/0066530 A1 | 3/2010 | Cohn et al. |
| 2010/0074112 A1 | 3/2010 | Derr et al. |
| 2010/0077111 A1 | 3/2010 | Holmes et al. |
| 2010/0082744 A1 | 4/2010 | Raji et al. |
| 2010/0095111 A1 | 4/2010 | Gutt et al. |
| 2010/0095369 A1 | 4/2010 | Gutt et al. |
| 2010/0121521 A1 | 5/2010 | Kiribayashi |
| 2010/0153853 A1 | 6/2010 | Dawes et al. |
| 2010/0159967 A1 | 6/2010 | Pounds et al. |
| 2010/0185857 A1 | 7/2010 | Neitzel et al. |
| 2010/0197219 A1 | 8/2010 | Issa et al. |
| 2010/0204839 A1* | 8/2010 | Behm .................... E03B 7/071 700/282 |
| 2010/0210240 A1 | 8/2010 | Mahaffey et al. |
| 2010/0212012 A1 | 8/2010 | Touboul et al. |
| 2010/0218104 A1 | 8/2010 | Lewis |
| 2010/0245107 A1 | 9/2010 | Fulker et al. |
| 2010/0267390 A1 | 10/2010 | Lin et al. |
| 2010/0280635 A1 | 11/2010 | Cohn et al. |
| 2010/0280637 A1 | 11/2010 | Cohn et al. |
| 2010/0298024 A1 | 11/2010 | Choi |
| 2010/0321151 A1 | 12/2010 | Matsuura et al. |
| 2010/0332164 A1 | 12/2010 | Aisa et al. |
| 2011/0000521 A1 | 1/2011 | Tachibana |
| 2011/0029875 A1 | 2/2011 | Milch |
| 2011/0040415 A1 | 2/2011 | Nickerson et al. |
| 2011/0040877 A1 | 2/2011 | Foisy |
| 2011/0096678 A1 | 4/2011 | Ketonen |
| 2011/0102588 A1 | 5/2011 | Trundle et al. |
| 2011/0197327 A1 | 8/2011 | McElroy et al. |
| 2011/0234392 A1 | 9/2011 | Cohn et al. |
| 2011/0283006 A1 | 11/2011 | Ramamurthy |
| 2012/0023151 A1 | 1/2012 | Bennett, III et al. |
| 2012/0066608 A1 | 3/2012 | Sundermeyer et al. |
| 2012/0081842 A1 | 4/2012 | Ewing et al. |
| 2012/0154138 A1 | 6/2012 | Cohn et al. |
| 2012/0182245 A1 | 7/2012 | Hutton |
| 2012/0242788 A1 | 9/2012 | Chuang et al. |
| 2012/0260184 A1 | 10/2012 | Dawes et al. |
| 2012/0278877 A1 | 11/2012 | Baum et al. |
| 2012/0327242 A1 | 12/2012 | Barley et al. |
| 2014/0143695 A1 | 5/2014 | Sundermeyer et al. |
| 2014/0143854 A1 | 5/2014 | Lopez et al. |
| 2014/0153695 A1 | 6/2014 | Yanagisawa et al. |
| 2015/0088982 A1 | 3/2015 | Johnson et al. |

FOREIGN PATENT DOCUMENTS

| | | |
|---|---|---|
| AU | 2011250886 A1 | 1/2013 |
| AU | 2011305163 A1 | 5/2013 |
| CA | 2559842 C | 5/2014 |
| EP | 0295146 A2 | 12/1988 |
| EP | 0308046 A2 | 3/1989 |
| EP | 0591585 A1 | 4/1994 |
| EP | 0978111 B1 | 11/2001 |
| EP | 2112784 A1 | 10/2009 |
| FR | 2584217 A1 | 1/1987 |
| FR | 2661023 A1 | 10/1991 |
| FR | 2793334 A1 | 11/2000 |
| GB | 2222288 A | 2/1990 |
| GB | 2273593 A | 6/1994 |
| GB | 2319373 A | 5/1998 |
| GB | 2324630 A | 10/1998 |
| GB | 2335523 A | 9/1999 |
| GB | 2349293 A | 10/2000 |
| GB | 2370400 A | 6/2002 |
| JP | 8227491 A | 9/1996 |
| JP | 2002055895 A | 2/2002 |
| JP | 2003085258 A | 3/2003 |
| JP | 2003141659 A | 5/2003 |
| JP | 2004192659 A | 7/2004 |
| KR | 20060021605 A | 3/2006 |
| WO | WO-8907855 A1 | 8/1989 |
| WO | WO-9403881 A1 | 2/1994 |
| WO | WO-9636301 A1 | 11/1996 |
| WO | WO-9849663 A1 | 11/1998 |
| WO | WO-9934339 A2 | 7/1999 |
| WO | WO-0152478 A2 | 7/2001 |
| WO | WO-0199078 A2 | 12/2001 |
| WO | WO-0221300 A1 | 3/2002 |
| WO | WO-02097584 A2 | 12/2002 |
| WO | WO-03040839 A1 | 5/2003 |
| WO | WO-2004004222 A1 | 1/2004 |
| WO | WO-2004098127 A1 | 11/2004 |
| WO | WO-2004107710 A1 | 12/2004 |
| WO | WO-2005091218 A2 | 9/2005 |
| WO | WO-2005091218 A3 | 7/2006 |
| WO | WO-2007038872 A1 | 4/2007 |
| WO | WO-2007124453 A2 | 11/2007 |
| WO | WO-2009006670 A1 | 1/2009 |
| WO | WO-2009145747 A1 | 12/2009 |

OTHER PUBLICATIONS

Alarm.com—Interactive Security Systems, Frequently Asked Questions [retrieved on Nov. 4, 2003], 3 pages.
Alarm.com—Interactive Security Systems, Overview [retrieved on Nov. 4, 2003], 2 pages.
Alarm.com—Interactive Security Systems, Product Advantages [retrieved on Nov. 4, 2003], 3 pages.
Australian Patent App. No. 2010297957.
Australian Patent App. No. 2011250886.
Australian Patent App. No. 2011305163.
Canadian Patent App. No. 2559842.
Chinese Patent App. No. 201080053845.7.
Chinese Patent App. No. 201180034090.0.
Control Panel Standard—Features for False Alarm Reduction, The Security Industry Association, SIA 2009, pp. 1-48.

(56) References Cited

OTHER PUBLICATIONS

Co-pending U.S. Appl. No. 11/761,745, filed Jun. 12, 2007.
Co-pending U.S. Appl. No. 12/019,568, filed Jan. 24, 2008.
Co-pending U.S. Appl. No. 12/189,780, filed Aug. 11, 2008.
Co-pending U.S. Appl. No. 12/189,785, filed Aug. 11, 2008.
Co-pending U.S. Appl. No. 12/197,931, filed Aug. 25, 2008.
Co-pending U.S. Appl. No. 12/197,946, filed Aug. 25, 2008.
Co-pending U.S. Appl. No. 12/197,958, filed Aug. 25, 2008.
Co-pending U.S. Appl. No. 12/198,039, filed Aug. 25, 2008.
Co-pending U.S. Appl. No. 12/198,051, filed Aug. 25, 2008.
Co-pending U.S. Appl. No. 12/198,060, filed May 28, 2008.
Co-pending U.S. Appl. No. 12/198,066, filed Aug. 25, 2008.
Co-pending U.S. Appl. No. 12/269,735, filed Nov. 12, 2008.
Co-pending U.S. Appl. No. 12/539,537, filed Aug. 11, 2009.
Co-pending U.S. Appl. No. 12/568,718, filed Sep. 29, 2009.
Co-pending U.S. Appl. No. 12/630,092, filed Dec. 3, 2009.
Co-pending U.S. Appl. No. 12/691,992, filed Jan. 22, 2010.
Co-pending U.S. Appl. No. 12/718,385, filed Mar. 5, 2010.
Co-pending U.S. Appl. No. 12/732,879, filed Mar. 26, 2010.
Co-pending U.S. Appl. No. 12/750,470, filed Mar. 30, 2010.
Co-pending U.S. Appl. No. 12/770,253, filed Apr. 29, 2010.
Co-pending U.S. Appl. No. 12/770,365, filed Apr. 29, 2010.
Co-pending U.S. Appl. No. 12/771,071, filed Apr. 30, 2010.
Co-pending U.S. Appl. No. 12/771,372, filed Apr. 30, 2010.
Co-pending U.S. Appl. No. 12/771,471, filed Apr. 30, 2010.
Co-pending U.S. Appl. No. 12/771,624, filed Apr. 30, 2010.
Co-pending U.S. Appl. No. 12/892,303, filed Sep. 28, 2010.
Co-pending U.S. Appl. No. 12/892,801, filed Sep. 28, 2010.
Co-pending U.S. Appl. No. 12/952,080, filed Nov. 22, 2010.
Co-pending U.S. Appl. No. 12/970,313, filed Dec. 16, 2010.
Co-pending U.S. Appl. No. 12/971,282, filed Dec. 17, 2010.
Co-pending U.S. Appl. No. 12/972,740, filed Dec. 20, 2010.
Co-pending U.S. Appl. No. 13/099,293, filed May 2, 2011.
Co-pending U.S. Appl. No. 13/104,932, filed May 10, 2011.
Co-pending U.S. Appl. No. 13/104,936, filed May 10, 2011.
Co-pending U.S. Appl. No. 13/153,807, filed Jun. 6, 2011.
Co-pending U.S. Appl. No. 13/244,008, filed Sep. 23, 2011.
Co-pending U.S. Appl. No. 13/311,365, filed Dec. 5, 2011.
Co-pending U.S. Appl. No. 13/334,998, filed Dec. 22, 2011.
Co-pending U.S. Appl. No. 13/335,279, filed Dec. 22, 2011.
Co-pending U.S. Appl. No. 13/400,477, filed Dec. 22, 2011.
Co-pending U.S. Appl. No. 13/406,264, filed Feb. 27, 2012.
Co-pending U.S. Appl. No. 13/486,276, filed Jun. 1, 2012.
Co-pending U.S. Appl. No. 13/531,757, filed Jun. 25, 2012.
Co-pending U.S. Appl. No. 13/718,851, filed Dec. 18, 2012.
Co-pending U.S. Appl. No. 13/725,607, filed Dec. 21, 2012.
Co-pending U.S. Appl. No. 13/925,181, filed Jun. 24, 2013.
Co-pending U.S. Appl. No. 13/929,568, filed Jun. 27, 2013.
Co-pending U.S. Appl. No. 13/932,816, filed Jul. 1, 2013.
Co-pending U.S. Appl. No. 13/932,837, filed Jul. 1, 2013.
Co-pending U.S. Appl. No. 29/419,628, filed Apr. 30, 2012.
Co-pending U.S. Appl. No. 29/420,377, filed May 8, 2012.
European Patent App. No. 05725743.8.
European Patent App. No. 08797646.0.
European Patent App. No. 08828613.3.
European Patent App. No. 09807196.2.
European Patent App. No. 10819658.5.
European Patent App. No. 11781184.4.
European Patent App. No. 11827671.6.
Examination Report under Section 18(3) re for UK Patent Application No. GB0620362.4, mailed on Aug. 13, 2007.
Examination Report under Section 18(3) re for UK Patent Application No. GB0724248.0, mailed on Jun. 4, 2008.
Examination Report under Section 18(3) re for UK Patent Application No. GB0724248.0, mailed on Jan. 30, 2008.
Examination Report under Section 18(3) re for UK Patent Application No. GB0724760.4, mailed on Jan. 30, 2008.
Examination Report under Section 18(3) re for UK Patent Application No. GB0800040.8, mailed on Jan. 30, 2008.
Faultline, "AT&T Targets Video Home Security as Next Broadband Market," The Register, Nov. 2, 2006, 2 pages.
Final Office Action mailed Aug. 1, 2011 for U.S. Appl. No. 12/630,092, filed Dec. 3, 2009.
Final Office Action mailed Jun. 1, 2009 for U.S. Appl. No. 11/084,232, filed Mar. 16, 2005.
Final Office Action mailed Jun. 5, 2012 for U.S. Appl. No. 12/771,071, filed Apr. 30, 2010.
Final Office Action mailed May 9, 2013 for U.S. Appl. No. 12/189,780, filed Aug. 11, 2008.
Final Office Action mailed May 9, 2013 for U.S. Appl. No. 12/952,080, filed Nov. 22, 2010.
Final Office Action mailed Jan. 10, 2011 for U.S. Appl. No. 12/189,785, filed Aug. 11, 2008.
Final Office Action mailed Jun. 10, 2011 for U.S. Appl. No. 11/084,232, filed Mar. 16, 2005.
Final Office Action mailed Jul. 12, 2010 for U.S. Appl. No. 12/019,554, filed Jan. 24, 2008.
Final Office Action mailed Jan. 13, 2011 for U.S. Appl. No. 12/189,780, filed Aug. 11, 2008.
Final Office Action mailed Sep. 14, 2011 for U.S. Appl. No. 12/197,931, filed Aug. 25, 2008.
Final Office Action mailed Feb. 16, 2011 for U.S. Appl. No. 12/019,568, filed Jan. 24, 2008.
Final Office Action mailed Oct. 17, 2012 for U.S. Appl. No. 12/637,671, filed Dec. 14, 2009.
Final Office Action mailed Sep. 17, 2012 for U.S. Appl. No. 12/197,958, filed Aug. 25, 2008.
Final Office Action mailed Mar. 21, 2013 for U.S. Appl. No. 12/691,992, filed Jan. 22, 2010.
Final Office Action mailed Jul. 23, 2013 for U.S. Appl. No. 13/531,757, filed Jun. 25, 2012.
Final Office Action mailed Feb. 26, 2013 for U.S. Appl. No. 12/771,471, filed Apr. 30, 2010.
Final Office Action mailed Jun. 29, 2012 for U.S. Appl. No. 12/539,537, filed Aug. 11, 2009.
Final Office Action mailed Dec. 31, 2012 for U.S. Appl. No. 12/770,365, filed Apr. 29, 2010.
Final Office Action mailed Oct. 31, 2012 for U.S. Appl. No. 12/771,624, filed Apr. 30, 2010.
Form PCT/ISA/210, "PCT International Search Report for the Application No. PCT/US05/08766," May 23, 2006, 2 pages.
Form PCT/ISA/210, "PCT International Search Report for the Application No. PCT/US08/72831," Nov. 4, 2008, 2 pages.
Form PCT/ISA/210, "PCT International Search Report for the Application No. PCT/US08/74246," Nov. 14, 2008, 2 pages.
Form PCT/ISA/210, "PCT International Search Report for the Application No. PCT/US08/74260," Nov. 13, 2008, 2 pages.
Form PCT/ISA/210, "PCT International Search Report for the Application No. PCT/US09/53485," Oct. 22, 2009, 2 pages.
Form PCT/ISA/210, "PCT International Search Report for the Application No. PCT/US09/55559," Nov. 12, 2009, 2 pages.
Form PCT/ISA/210, "PCT International Search Report for the Application No. PCT/US10/50585," Dec. 30, 2010, 2 pages.
Form PCT/ISA/210, "PCT International Search Report for the Application No. PCT/US10/57674," Mar. 2, 2011, 2 pages.
Form PCT/ISA/210, "PCT International Search Report for the Application No. PCT/US11/34858," Oct. 3, 2011, 2 pages.
Form PCT/ISA/210, "PCT International Search Report for the Application No. PCT/US11/35994," Sep. 28, 2011, 2 pages.
Form PCT/ISA/210, "PCT International Search Report for the Application No. PCT/US11/53136," Jan. 5, 2012, 2 pages.
Form PCT/ISA/210, "PCT International Search Report for the Application No. PCT/US08/83254," Jan. 14, 2009, 2 pages.
Form PCT/ISA/220, "PCT Notification of Transmittal of The International Search Report and the Written Opinion of the International Searching Authority, or the Declaration," 1 pg.
Form PCT/ISA/220, "PCT Notification of Transmittal of the International Search Report and the Written Opinion of the International Searching Authority, or the Declaration for the Application No. PCT/US05/08766," May 23, 2006, 1 page.
Form PCT/ISA/220, "PCT Notification of Transmittal of the International Search Report and the Written Opinion of the International

(56) References Cited

OTHER PUBLICATIONS

Searching Authority, or the Declaration for the Application No. PCT/US08/72831," Nov. 4, 2008, 1 page.
Form PCT/ISA/220, "PCT Notification of Transmittal of the International Search Report and the Written Opinion of the International Searching Authority, or the Declaration for the Application No. PCT/US08/74246" Nov. 14, 2008, 1 page.
Form PCT/ISA/220, "PCT Notification of Transmittal of the International Search Report and the Written Opinion of the International Searching Authority, or the Declaration for the Application No. PCT/US08/74260," Nov. 13, 2008, 1 page.
Form PCT/ISA/220, "PCT Notification of Transmittal of the International Search Report and the Written Opinion of the International Searching Authority, or the Declaration for the Application No. PCT/US09/53485," Oct. 22, 2009, 1 page.
Form PCT/ISA/220, "PCT Notification of Transmittal of the International Search Report and the Written Opinion of the International Searching Authority, or the Declaration for the Application No. PCT/US09/55559," Nov. 12, 2009, 1 page.
Form PCT/ISA/220, "PCT Notification of Transmittal of the International Search Report and the Written Opinion of the International Searching Authority, or the Declaration for the Application No. PCT/US10/50585," Dec. 30, 2010, 1 page.
Form PCT/ISA/220, "PCT Notification of Transmittal of the International Search Report and the Written Opinion of the International Searching Authority, or the Declaration for the Application No. PCT/US10/57674," Mar. 2, 2011, 1 page.
Form PCT/ISA/220, "PCT Notification of Transmittal of the International Search Report and the Written Opinion of the International Searching Authority, or the Declaration for the Application No. PCT/US11/35994," Sep. 28, 2011, 1 page.
Form PCT/ISA/220, "PCT Notification of Transmittal of the International Search Report and the Written Opinion of the International Searching Authority, or the Declaration of the Application No. PCT/US08/83254," Jan. 14, 2009, 1 page.
Form PCT/ISA/237, "PCT Written Opinion ofthe International Searching Authority for the Application No. PCT/US05/08766," May 23, 2006, 5 pages.
Form PCT/ISA/237, "PCT Written Opinion of the International Searching Authority," 6 pgs.
Form PCT/ISA/237, "PCT Written Opinion of the International Searching Authority for the Application No. PCT/US08/72831," Nov. 4, 2008, 6 pages.
Form PCT/ISA/237, "PCT Written Opinion of the International Searching Authority for the Application No. PCT/US08/74246," Nov. 14, 2008, 6 pages.
Form PCT/ISA/237, "PCT Written Opinion of the International Searching Authority for the Application No. PCT/US08/74260," Nov. 13, 2008, 6 pages.
Form PCT/ISA/237, "PCT Written Opinion of the International Searching Authority for the Application No. PCT/US09/53485," Oct. 22, 2009, 8 pages.
Form PCT/ISA/237, "PCT Written Opinion of the International Searching Authority for the Application No. PCT/US09/55559," Nov. 12, 2009, 6 pages.
Form PCT/ISA/237, "PCT Written Opinion of the International Searching Authority for the Application No. PCT/US10/50585," Dec. 30, 2010, 7 pages.
Form PCT/ISA/237, "PCT Written Opinion of the International Searching Authority for the Application No. PCT/US10/57674," Mar. 2, 2011, 6 pages.
Form PCT/ISA/237, "PCT Written Opinion of the International Searching Authority for the Application No. PCT/US11/34858," Oct. 3, 2011, 8 pages.
Form PCT/ISA/237, "PCT Written Opinion of the International Searching Authority for the Application No. PCT/US11/35994," Sep. 28, 2011, 11 pages.
Form PCT/ISA/237, "PCT Written Opinion of the International Searching Authority for the Application No. PCT/US11/53136," Jan. 5, 2012.
Form PCT/ISA/237, "PCT Written Opinion ofthe International Searching Authority of the Application No. PCT/US08/83254," Jan. 14, 2009, 7 pages.
Gutierrez J.A., "On the Use of IEEE 802.15.4 to Enable Wireless Sensor Networks in Building Automation," Personal, Indoor and Mobile Radio Communications (PIMRC), 15th IEEE International Symposium, 2004, vol. 3, pp. 1865-1869.
Indian Patent App. No. 10698/DELNP/2012.
Indian Patent App. No. 3687/DELNP/2012.
International Patent Application No. PCT/US2013/048324.
International Search Report for Application No. PCT/US13/48324, mailed on Jan. 14, 2014, 2 pages.
International Search Report for Application No. PCT/US2014/050548, mailed on Mar. 18, 2015, 4 pages.
Lagotek Wireless Home Automation System, May 2006 [retrieved on Aug. 22, 2012].
Non-Final Office Action mailed Apr. 4, 2013 for U.S. Appl. No. 12/197,931, filed Aug. 25, 2008.
Non-Final Office Action mailed Mar. 4, 2013 for U.S. Appl. No. 13/400,477, filed Feb. 20, 2012.
Non-Final Office Action mailed Jan. 5, 2010 for U.S. Appl. No. 12/019,554, filed Jan. 24, 2008.
Non-Final Office Action mailed May 5, 2010 for U.S. Appl. No. 12/189,780, filed Aug. 11, 2008.
Non-Final Office Action mailed May 5, 2010 for U.S. Appl. No. 12/189,785, filed Aug. 11, 2008.
Non-Final Office Action mailed Feb. 7, 2012 for U.S. Appl. No. 12/637,671, filed Dec. 14, 2009.
Non-Final Office Action mailed Feb. 7, 2013 for U.S. Appl. No. 12/970,313, filed Dec. 16, 2010.
Non-Final Office Action mailed Feb. 7, 2012 for U.S. Appl. No. 12/630,092, filed Dec. 3, 2009.
Non-Final Office Action mailed Apr. 9, 2012 for U.S. Appl. No. 12/771,624, filed Apr. 30, 2010.
Non-Final Office Action mailed Dec. 9, 2008 for U.S. Appl. No. 11/084,232, filed Mar. 16, 2005.
Non-Final Office Action mailed Aug. 10, 2012 for U.S. Appl. No. 12/771,471, filed Apr. 30, 2010.
Non-Final Office Action mailed Oct. 11, 2012 for U.S. Appl. No. 12/019,568, filed Jan. 24, 2008.
Non-Final Office Action mailed Apr. 12, 2012 for U.S. Appl. No. 12/770,365, filed Apr. 29, 2010.
Non-Final Office Action mailed Jul. 12, 2012 for U.S. Appl. No. 12/691,992, filed Jan. 22, 2010.
Non-Final Office Action mailed Oct. 12, 2012 for U.S. Appl. No. 12/630,092, filed Dec. 3, 2009.
Non-Final Office Action mailed Sep. 12, 2012 for U.S. Appl. No. 12/952,080, filed Nov. 22, 2010.
Non-Final Office Action mailed Apr. 13, 2010 for U.S. Appl. No. 11/761,745, filed Jun. 12, 2007.
Non-Final Office Action mailed Jul. 13, 2010 for U.S. Appl. No. 12/019,568, filed Jan. 24, 2008.
Non-Final Office Action mailed Nov. 14, 2012 for U.S. Appl. No. 13/531,757, filed Jun. 25, 2012.
Non-Final Office Action mailed Sep. 14, 2010 for U.S. Appl. No. 11/084,232, filed Mar. 16, 2005.
Non-Final Office Action mailed Sep. 16, 2011 for U.S. Appl. No. 12/539,537, filed Aug. 11, 2009.
Non-Final Office Action mailed Sep. 17, 2012 for U.S. Appl. No. 12/189,780, filed Aug. 11, 2008.
Non-Final Office Action mailed Aug. 18, 2011 for U.S. Appl. No. 12/197,958, filed Aug. 25, 2008.
Non-Final Office Action mailed Feb. 18, 2011 for U.S. Appl. No. 12/630,092, filed Dec. 3, 2009.
Non-Final Office Action mailed Jan. 18, 2012 for U.S. Appl. No. 12/771,071, filed Apr. 30, 2010.
Non-Final Office Action mailed Feb. 21, 2013 for U.S. Appl. No. 12/771,372, filed Apr. 30, 2010.
Non-Final Office Action mailed Jul. 21, 2010 for U.S. Appl. No. 12/630,092, filed Dec. 3, 2009.
Non-Final Office Action mailed Dec. 22, 2010 for U.S. Appl. No. 12/197,931, filed Aug. 25, 2008.

(56) References Cited

OTHER PUBLICATIONS

Non-Final Office Action mailed Jul. 22, 2013 for U.S. Appl. No. 12/630,092, filed Dec. 3, 2009.
Non-Final Office Action mailed May 23, 2013 for U.S. Appl. No. 13/104,932, filed May 10, 2011.
Non-Final Office Action mailed May 23, 2013 for U.S. Appl. No. 13/104,936, filed May 10, 2011.
Non-Final Office Action mailed Jan. 26, 2012 for U.S. Appl. No. 12/019,568, filed Jan. 24, 2008.
Non-Final Office Action mailed Nov. 26, 2010 for U.S. Appl. No. 12/197,958, filed Aug. 25, 2008.
Non-Final Office Action mailed Jun. 27, 2013 for U.S. Appl. No. 12/019,568, filed Jan. 24, 2008.
Non-Final Office Action mailed Dec. 30, 2009 for U.S. Appl. No. 11/084,232, filed Mar. 16, 2005.
Non-Final Office Action mailed May 30, 2008 for U.S. Appl. No. 11/084,232, filed Mar. 16, 2005.
Notice of Allowance mailed May 14, 2013 for U.S. Appl. No. 12/637,671, filed Dec. 14, 2009.
Notice of Allowance mailed Oct. 25, 2012 for U.S. Appl. No. 11/084,232, filed Mar. 16, 2005.
Requirement for Restriction/Election mailed Jan. 22, 2013 for U.S. Appl. No. 13/104,932, filed May 10, 2011.
Requirement for Restriction/Election mailed Jan. 22, 2013 for U.S. Appl. No. 13/104,936, filed May 10, 2011.
Requirement for Restriction/Election mailed Oct. 24, 2012 for U.S. Appl. No. 12/750,470, filed Mar. 30, 2010.
Security for the Future, Introducing 5804BD—Advanced two-way wireless remote technology, Advertisement, ADEMCO Group, Syosset, NY, circa 1997.
South African Patent App. No. 2013/02668.
Supplemental European Search Report for Application No. EP05725743.8 mailed on Sep. 14, 2010, 2 pages.
Supplementary European Search Report for Application No. EP10819658, mailed on Mar. 10, 2015, 2 pages.
Supplementary European Search Report for Application No. EP11827671, mailed on Mar. 10, 2015, 2 pages.
Supplementary European Search Report for Application No. EP2191351, mailed on Jun. 23, 2014, 2 pages.
Supplementary Non-Final Office Action mailed Oct. 28, 2010 for U.S. Appl. No. 12/630,092, filed Dec. 3, 2009.
Supplementary Partial European Search Report for Application No. EP09807196, mailed on Nov. 17, 2014, 5 pages.
Taiwanese Patent App. No. 99113848.
Taiwanese Patent App. No. 99113853.
Taiwanese Patent App. No. 99113855.
Taiwanese Patent App. No. 99113856.
Topalis E., et al., "A Generic Network Management Architecture Targeted to Support Home Automation Networks and Home Internet Connectivity, Consumer Electronics, IEEE Transactions," 2000, vol. 46 (1), pp. 44-51.
United Kingdom Patent No. 2428821.
United Kingdom Patent No. 2442628.
United Kingdom Patent No. 2442633.
United Kingdom Patent No. 2442640.
Wireless, Battery-Powered Smoke Detectors, Brochure, SafeNight Technology, Inc. Roanoke, VA, 1995.
WLS906 Photoelectric Smoke Alarm, Data Sheet, DSC Security Products, Ontario, Canada, Jan. 1998.
X10—ActiveHome, Home Automation Made Easy [retrieved on Nov. 4, 2003], 3 pages.

* cited by examiner

GENERATING RISK PROFILE USING DATA OF HOME MONITORING AND SECURITY SYSTEM

RELATED APPLICATIONS

This application claims the benefit of United States (U.S.) Patent Application No. 61/789,542, filed Mar. 15, 2013.

This application claims the benefit of U.S. Patent Application No. 61/782,345, filed Mar. 14, 2013.

This application claims the benefit of U.S. Patent Application No. 61/802,077, filed Mar. 15, 2013.

This application claims the benefit of U.S. Patent Application No. 61/777,061, filed Mar. 12, 2013.

This application claims the benefit of U.S. Patent Application No. 61/778,853, filed Mar. 13, 2013.

This application claims the benefit of U.S. Patent Application No. 61/779,028, filed Mar. 13, 2013.

This application claims the benefit of U.S. Patent Application No. 61/779,753, filed Mar. 13, 2013.

This application claims the benefit of U.S. Patent Application No. 61/780,092, filed Mar. 13, 2013.

This application claims the benefit of U.S. Patent Application No. 61/780,290, filed Mar. 13, 2013.

This application claims the benefit of U.S. Patent Application No. 61/780,435, filed Mar. 13, 2013.

This application claims the benefit of U.S. Patent Application No. 61/780,538, filed Mar. 13, 2013.

This application claims the benefit of U.S. Patent Application No. 61/780,637, filed Mar. 13, 2013.

This application claims the benefit of U.S. Patent Application No. 61/781,401, filed Mar. 14, 2013.

This application claims the benefit of U.S. Patent Application No. 61/781,713, filed Mar. 14, 2013.

This application is a continuation in part application of U.S. patent application Ser. No. 12/197,946, filed Aug. 25, 2008.

This application is a continuation in part application of U.S. patent application Ser. No. 13/718,851, filed Dec. 18, 2012.

This application is a continuation in part application of U.S. patent application Ser. No. 13/932,837, filed Jul. 1, 2013.

This application is a continuation in part application of U.S. patent application Ser. No. 11/761,745, filed Jun. 12, 2007.

This application is a continuation in part application of U.S. patent application Ser. No. 12/019,568, filed Jan. 24, 2008.

This application is a continuation in part application of U.S. patent application Ser. No. 13/925,181, filed Jun. 24, 2013.

This application is a continuation in part application of U.S. patent application Ser. No. 13/531,757, filed Jun. 25, 2012.

This application is a continuation in part application of U.S. patent application Ser. No. 13/335,279, filed Dec. 22, 2011.

This application is a continuation in part application of U.S. patent application Ser. No. 12/539,537, filed Aug. 11, 2009.

This application is a continuation in part application of U.S. patent application Ser. No. 12/750,470, filed Mar. 30, 2010.

This application is a continuation in part application of U.S. patent application Ser. No. 13/104,932, filed May 10, 2011.

TECHNICAL FIELD

The embodiments described herein relate generally to a method and apparatus for improving the capabilities of security systems in home and business applications. More particularly, the embodiments described herein relate to a touchscreen device that integrates security system control and functionality with network content interactivity, management and presentation.

BACKGROUND

The field of home and small business security is dominated by technology suppliers who build comprehensive 'closed' security systems, where the individual components (sensors, security panels, keypads) operate solely within the confines of a single vendor solution. For example, a wireless motion sensor from vendor A cannot be used with a security panel from vendor B. Each vendor typically has developed sophisticated proprietary wireless technologies to enable the installation and management of wireless sensors, with little or no ability for the wireless devices to operate separate from the vendor's homogeneous system. Furthermore, these traditional systems are extremely limited in their ability to interface either to a local or wide area standards-based network (such as an IP network); most installed systems support only a low-bandwidth, intermittent connection utilizing phone lines or cellular (RF) backup systems. Wireless security technology from providers such as GE Security, Honeywell, and DSC/Tyco are well known in the art, and are examples of this proprietary approach to security systems for home and business.

Furthermore, with the proliferation of the internet, ethernet and WiFi local area networks (LANs) and advanced wide area networks (WANs) that offer high bandwidth, low latency connections (broadband), as well as more advanced wireless WAN data networks (e.g. GPRS or COMA 1×RTT) there increasingly exists the networking capability to extend these traditional security systems to offer enhanced functionality. In addition, the proliferation of broadband access has driven a corresponding increase in home and small business networking technologies and devices. It is desirable to extend traditional security systems to encompass enhanced functionality such as the ability to control and manage security systems from the world wide web, cellular telephones, or advanced function internet-based devices. Other desired functionality includes an open systems approach to interface home security systems to home and small business networks.

Due to the proprietary approach described above, the traditional vendors are the only ones capable of taking advantage of these new network functions. To date, even though the vast majority of home and business customers have broadband network access in their premises, most security systems do not offer the advanced capabilities associated with high speed, low-latency LANs and WANs. This is primarily because the proprietary vendors have not been able to deliver such technology efficiently or effectively. Solution providers attempting to address this need are becoming known in the art, including three categories of vendors: traditional proprietary hardware providers such as Honeywell and GE Security; third party hard-wired module providers such as Alarm.com, NextAlarm, and uControl; and new proprietary systems providers such as InGrid.

A disadvantage of the prior art technologies of the traditional proprietary hardware providers arises due to the continued proprietary approach of these vendors. As they develop technology in this area it once again operates only with the hardware from that specific vendor, ignoring the need for a heterogeneous, cross-vendor solution. Yet another disadvantage of the prior art technologies of the traditional proprietary hardware providers arises due to the lack of experience and capability of these companies in creating open internet and web based solutions, and consumer friendly interfaces.

A disadvantage of the prior art technologies of the third party hard-wired module providers arises due to the installation and operational complexities and functional limitations associated with hardwiring a new component into existing security systems. Moreover, a disadvantage of the prior art technologies of the new proprietary systems providers arises due to the need to discard all prior technologies, and implement an entirely new form of security system to access the new functionalities associated with broadband and wireless data networks. There remains, therefore, a need for systems, devices, and methods that easily interface to and control the existing proprietary security technologies utilizing a variety of wireless technologies.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

Figure 1:
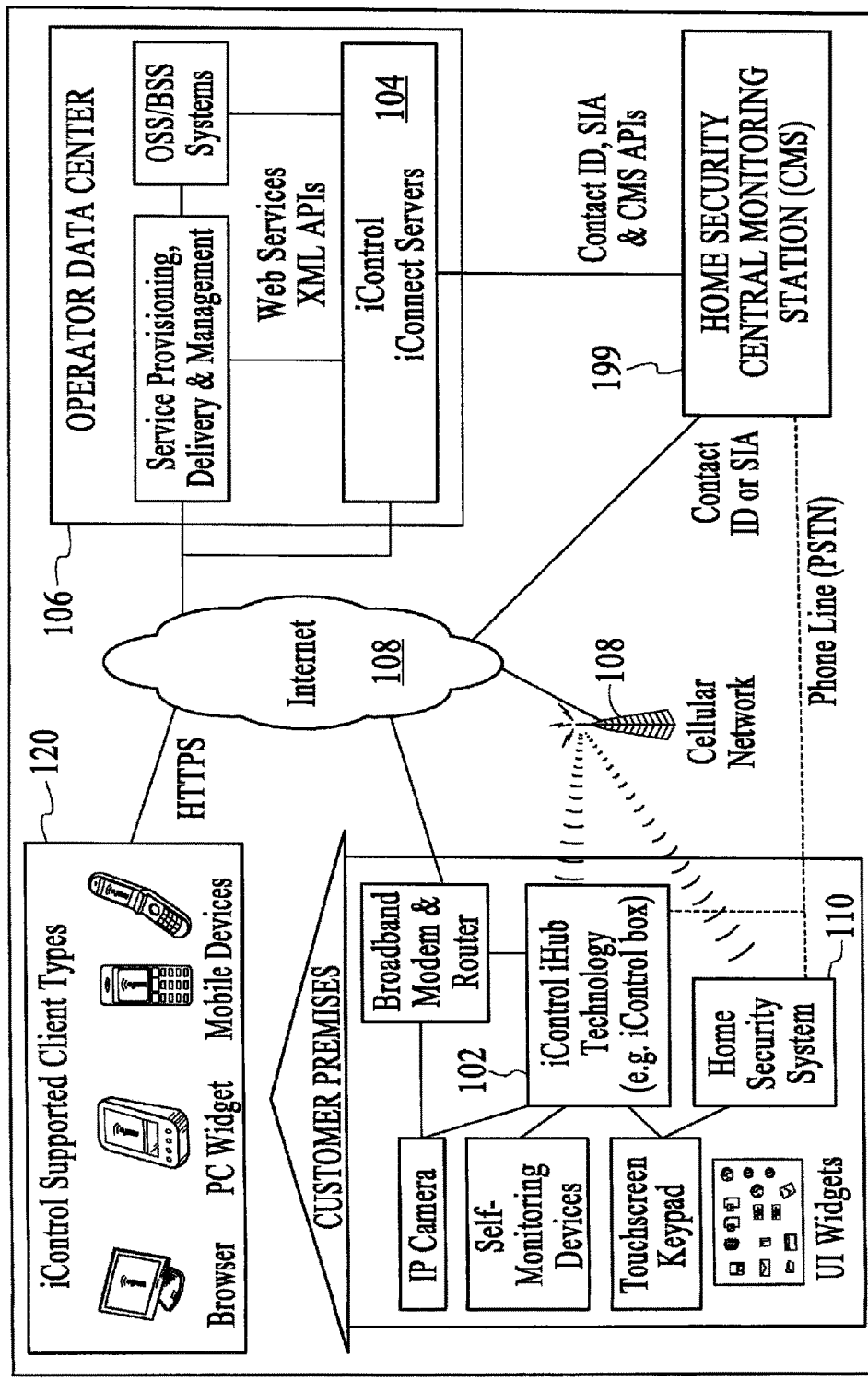
FIG. 1 is a block diagram of the integrated security system, under an embodiment.

An integrated security system is described that integrates broadband and mobile access and control with conventional security systems and premise devices to provide a tri-mode security network (broadband, cellular/GSM, POTS access) that enables users to remotely stay connected to their premises. The integrated security system, while delivering remote premise monitoring and control functionality to conventional monitored premise protection, complements existing premise protection equipment. The integrated security system integrates into the premise network and couples wirelessly with the conventional security panel, enabling broadband access to premise security systems. Automation devices (cameras, lamp modules, thermostats, etc.) can be added, enabling users to remotely see live video and/or pictures and control home devices via their personal web portal or webpage, mobile phone, and/or other remote client device. Users can also receive notifications via email or text message when happenings occur, or do not occur, in their home.

Although the detailed description herein contains many specifics for the purposes of illustration, anyone of ordinary skill in the art will appreciate that many variations and alterations to the following details are within the scope of the embodiments described herein. Thus, the following illustrative embodiments are set forth without any loss of generality to, and without imposing limitations upon, the claimed invention.

As described herein, computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The integrated security system can be a component of a single system, multiple systems, and/or geographically separate systems. The integrated security system can also be a subcomponent or subsystem of a single system, multiple systems, and/or geographically separate systems. The integrated security system can be coupled to one or more other components (not shown) of a host system or a system coupled to the host system.

One or more components of the integrated security system and/or a corresponding system or application to which the integrated security system is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that includes the integrated security system can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the integrated security system and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the integrated security system and corresponding systems and methods include: microcontrollers with memory (such as electronically erasable programmable read only memory (EEPROM)), embedded microprocessors, firmware, software, etc. Furthermore, aspects of the integrated security system and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the integrated security system and corresponding systems and methods is not intended to be exhaustive or to limit the systems and methods to the precise forms disclosed. While specific embodiments of, and examples for, the integrated security system and corresponding systems and methods are described herein for illustrative purposes, various equivalent modifications are possible within the scope of the systems and methods, as those skilled in the relevant art will recognize. The teachings of the integrated security system and corresponding systems and methods provided herein can be applied to other systems and methods, not only for the systems and methods described above.

The elements and acts of the various embodiments described above can be combined to provide further embodiments. These and other changes can be made to the integrated security system and corresponding systems and methods in light of the above detailed description.

In accordance with the embodiments described herein, a wireless system (e.g., radio frequency (RF)) is provided that enables a security provider or consumer to extend the capabilities of an existing RF-capable security system or a non-RF-capable security system that has been upgraded to support RF capabilities. The system includes an RF-capable Gateway device (physically located within RF range of the RF-capable security system) and associated software operating on the Gateway device. The system also includes a web server, application server, and remote database providing a persistent store for information related to the system.

The security systems of an embodiment, referred to herein as the iControl security system or integrated security system, extend the value of traditional home security by adding broadband access and the advantages of remote home monitoring and home control through the formation of a security network including components of the integrated security system integrated with a conventional premise security system and a premise local area network (LAN). With the integrated security system, conventional home security sensors, cameras, touchscreen keypads, lighting controls, and/or Internet Protocol (IP) devices in the home (or business) become connected devices that are accessible anywhere in the world from a web browser, mobile phone or through content-enabled touchscreens. The integrated security system experience allows security operators to both extend the value proposition of their monitored security systems and reach new consumers that include broadband users interested in staying connected to their family, home and property when they are away from home.

The integrated security system of an embodiment includes security servers (also referred to herein as iConnect servers or security network servers) and an iHub gateway (also referred to herein as the gateway, the iHub, or the iHub client) that couples or integrates into a home network (e.g., LAN) and communicates directly with the home security panel, in both wired and wireless installations. The security system of an embodiment automatically discovers the security system components (e.g., sensors, etc.) belonging to the security system and connected to a control panel of the security system and provides consumers with full two-way access via web and mobile portals. The gateway supports various wireless protocols and can interconnect with a wide range of control panels offered by security system providers. Service providers and users can then extend the system's capabilities with the additional IP cameras, lighting modules or security devices such as interactive touchscreen keypads. The integrated security system adds an enhanced value to these security systems by enabling consumers to stay connected through email and SMS alerts, photo push, event-based video capture and rule-based monitoring and notifications. This solution extends the reach of home security to households with broadband access.

The integrated security system builds upon the foundation afforded by traditional security systems by layering broadband and mobile access, IP cameras, interactive touchscreens, and an open approach to home automation on top of traditional security system configurations. The integrated security system is easily installed and managed by the security operator, and simplifies the traditional security installation process, as described below.

The integrated security system provides an open systems solution to the home security market. As such, the foundation of the integrated security system customer premises equipment (CPE) approach has been to abstract devices, and allows applications to manipulate and manage multiple devices from any vendor. The integrated security system DeviceConnect technology that enables this capability supports protocols, devices, and panels from GE Security and Honeywell, as well as consumer devices using Z-Wave, IP cameras (e.g., Ethernet, wifi, and Homeplug), and IP touchscreens. The DeviceConnect is a device abstraction layer that enables any device or protocol layer to interoperate with integrated security system components. This architecture enables the addition of new devices supporting any of these interfaces, as well as add entirely new protocols.

The benefit of DeviceConnect is that it provides supplier flexibility. The same consistent touchscreen, web, and mobile user experience operate unchanged on whatever security equipment selected by a security system provider, with the system provider's choice of IP cameras, backend data center and central station software.

The integrated security system provides a complete system that integrates or layers on top of a conventional host security system available from a security system provider. The security system provider therefore can select different components or configurations to offer (e.g., CDMA, GPRS, no cellular, etc.) as well as have iControl modify the integrated security system configuration for the system provider's specific needs (e.g., change the functionality of the web or mobile portal, add a GE or Honeywell-compatible TouchScreen, etc.).

The integrated security system integrates with the security system provider infrastructure for central station reporting directly via Broadband and GPRS alarm transmissions. Traditional dial-up reporting is supported via the standard panel connectivity. Additionally, the integrated security system provides interfaces for advanced functionality to the CMS, including enhanced alarm events, system installation optimizations, system test verification, video verification, 2-way voice over IP and GSM.

The integrated security system is an IP centric system that includes broadband connectivity so that the gateway augments the existing security system with broadband and GPRS connectivity. If broadband is down or unavailable GPRS may be used, for example. The integrated security system supports GPRS connectivity using an optional wireless package that includes a GPRS modem in the gateway. The integrated security system treats the GPRS connection as a higher cost though flexible option for data transfers. In an embodiment the GPRS connection is only used to route alarm events (e.g., for cost), however the gateway can be configured (e.g., through the iConnect server interface) to act as a primary channel and pass any or all events over GPRS. Consequently, the integrated security system does not interfere with the current plain old telephone service (POTS) security panel interface. Alarm events can still be routed through POTS; however the gateway also allows such events to be routed through a broadband or GPRS connection as well. The integrated security system provides a web application interface to the CSR tool suite as well as XML web services interfaces for programmatic integration between the security system provider's existing call center products. The integrated security system includes, for example, APIs that allow the security system provider to integrate components of the integrated security system into a custom call center interface. The APIs include XML web service APIs for integration of existing security system provider call center applications with the integrated security system service. All functionality available in the CSR Web application is provided with these API sets. The Java and XML-based APIs of the integrated security system support provisioning, billing, system administration, CSR, central station, portal user interfaces, and content management functions, to name a few. The integrated security system can provide a customized interface to the security system provider's billing system, or alternatively can provide security system developers with APIs and support in the integration effort.

The integrated security system provides or includes business component interfaces for provisioning, administration, and customer care to name a few. Standard templates and examples are provided with a defined customer professional services engagement to help integrate OSS/BSS systems of a Service Provider with the integrated security system.

The integrated security system components support and allow for the integration of customer account creation and deletion with a security system. The iConnect APIs provides access to the provisioning and account management system in iConnect and provide full support for account creation, provisioning, and deletion. Depending on the requirements of the security system provider, the iConnect APIs can be used to completely customize any aspect of the integrated security system backend operational system.

The integrated security system includes a gateway that supports the following standards-based interfaces, to name a few: Ethernet IP communications via Ethernet ports on the gateway, and standard XML/TCP/IP protocols and ports are employed over secured SSL sessions; USB 2.0 via ports on the gateway; 802.11b/g/n IP communications; GSM/GPRS RF WAN communications; CDMA 1xRTT RF WAN communications (optional, can also support EVDO and 3G technologies).

The gateway supports the following proprietary interfaces, to name a few: interfaces including Dialog RF network (319.5 MHz) and RS485 Superbus 2000 wired interface; RF mesh network (908 MHz); and interfaces including RF network (345 MHz) and RS485/RS232bus wired interfaces.

Regarding security for the IP communications (e.g., authentication, authorization, encryption, anti-spoofing, etc), the integrated security system uses SSL to encrypt all IP traffic, using server and client-certificates for authentication, as well as authentication in the data sent over the SSL-encrypted channel. For encryption, integrated security system issues public/private key pairs at the time/place of manufacture, and certificates are not stored in any online storage in an embodiment.

The integrated security system does not need any special rules at the customer premise and/or at the security system provider central station because the integrated security system makes outgoing connections using TCP over the standard HTTP and HTTPS ports. Provided outbound TCP connections are allowed then no special requirements on the firewalls are necessary.

FIG. 1 is a block diagram of the integrated security system 100, under an embodiment. The integrated security system 100 of an embodiment includes the gateway 102 and the security servers 104 coupled to the conventional home security system 110. At a customer's home or business, the gateway 102 connects and manages the diverse variety of home security and self-monitoring devices. The gateway 102 communicates with the iConnect Servers 104 located in the service provider's data center 106 (or hosted in integrated security system data center), with the communication taking place via a communication network 108 or other network (e.g., cellular network, internet, etc.). These servers 104 manage the system integrations necessary to deliver the integrated system service described herein. The combination of the gateway 102 and the iConnect servers 104 enable a wide variety of remote client devices 120 (e.g., PCs, mobile phones and PDAs) allowing users to remotely stay in touch with their home, business and family. In addition, the technology allows home security and self-monitoring information, as well as relevant third party content such as traffic and weather, to be presented in intuitive ways within the home, such as on advanced touchscreen keypads.

The integrated security system service (also referred to as iControl service) can be managed by a service provider via browser-based Maintenance and Service Management applications that are provided with the iConnect Servers. Or, if desired, the service can be more tightly integrated with existing OSS/BSS and service delivery systems via the iConnect web services-based XML APIs.

The integrated security system service can also coordinate the sending of alarms to the home security Central Monitoring Station (CMS) 199. Alarms are passed to the CMS 199 using standard protocols such as Contact ID or SIA and can be generated from the home security panel location as well as by iConnect server 104 conditions (such as lack of communications with the integrated security system). In addition, the link between the security servers 104 and CMS 199 provides tighter integration between home security and self-monitoring devices and the gateway 102. Such integration enables advanced security capabilities such as the ability for CMS personnel to view photos taken at the time a burglary alarm was triggered. For maximum security, the gateway 102 and iConnect servers 104 support the use of a mobile network (both GPRS and CDMA options are available) as a backup to the primary broadband connection.

Figure 2:
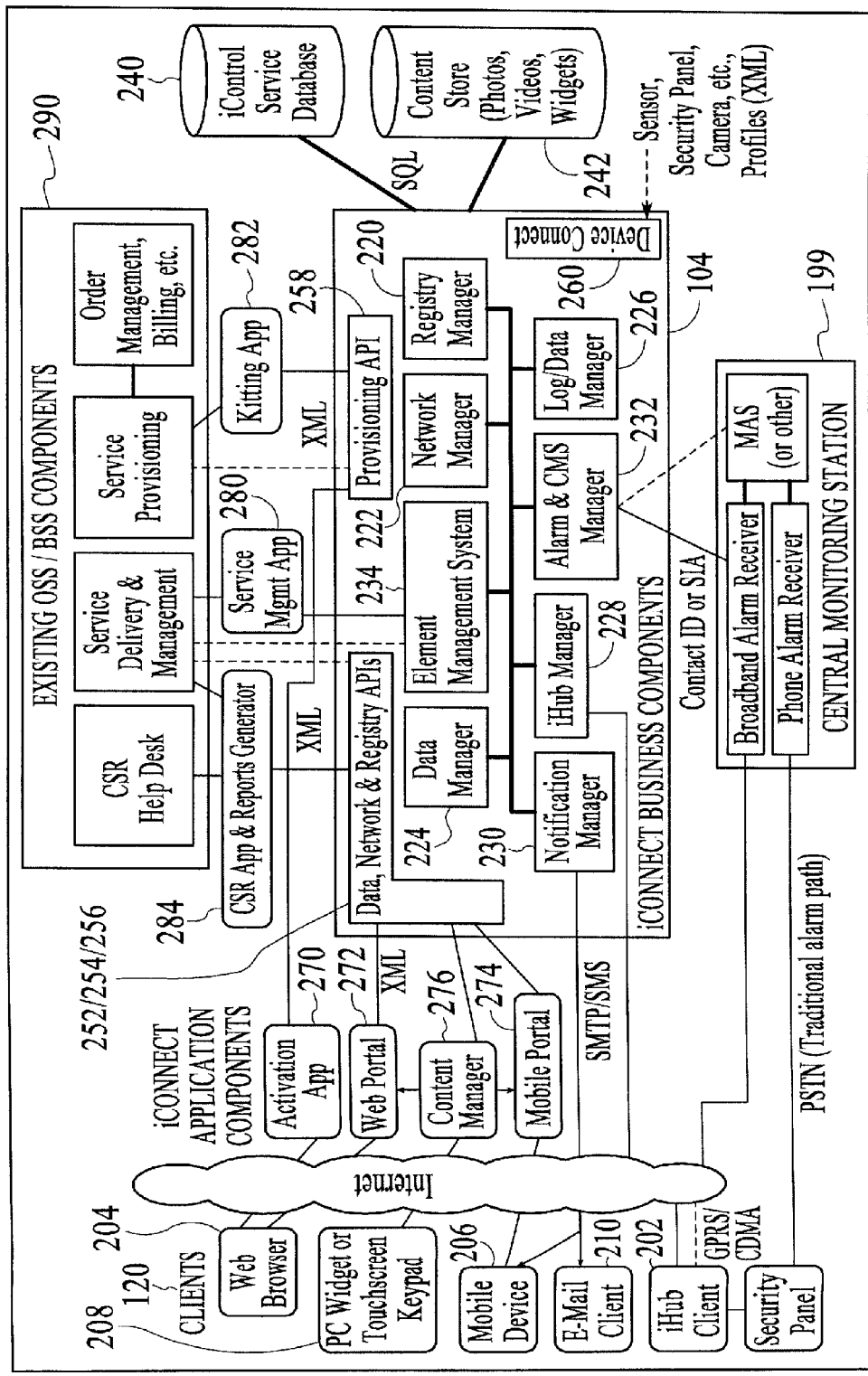
FIG. 2 is a block diagram of components of the integrated security system, under an embodiment.

The integrated security system service is delivered by hosted servers running software components that communicate with a variety of client types while interacting with other systems. FIG. 2 is a block diagram of components of the integrated security system 100, under an embodiment. Following is a more detailed description of the components.

The iConnect servers 104 support a diverse collection of clients 120 ranging from mobile devices, to PCs, to in-home security devices, to a service provider's internal systems. Most clients 120 are used by end-users, but there are also a number of clients 120 that are used to operate the service.

Clients 120 used by end-users of the integrated security system 100 include, but are not limited to, the following:

Clients based on gateway client applications 202 (e.g., a processor-based device running the gateway technology that manages home security and automation devices).

A web browser 204 accessing a Web Portal application, performing end-user configuration and customization of the integrated security system service as well as monitoring of in-home device status, viewing photos and video, etc. Device and user management can also be performed by this portal application.

A mobile device 206 (e.g., PDA, mobile phone, etc.) accessing the integrated security system Mobile Portal. This type of client 206 is used by end-users to view system status and perform operations on devices (e.g., turning on a lamp, arming a security panel, etc.) rather than for system configuration tasks such as adding a new device or user.

PC or browser-based "widget" containers 208 that present integrated security system service content, as well as other third-party content, in simple, targeted ways (e.g. a widget that resides on a PC desktop and shows live video from a single in-home camera). "Widget" as used herein means applications or programs in the system.

Touchscreen home security keypads 208 and advanced in-home devices that present a variety of content widgets via an intuitive touchscreen user interface.

Notification recipients 210 (e.g., cell phones that receive SMS-based notifications when certain events occur (or don't occur), email clients that receive an email message with similar information, etc.).

Custom-built clients (not shown) that access the iConnect web services XML API to interact with users' home security and self-monitoring information in new and unique ways. Such clients could include new types of mobile devices, or complex applications where integrated security system content is integrated into a broader set of application features.

In addition to the end-user clients, the iConnect servers 104 support PC browser-based Service Management clients that manage the ongoing operation of the overall service. These clients run applications that handle tasks such as provisioning, service monitoring, customer support and reporting.

There are numerous types of server components of the iConnect servers 104 of an embodiment including, but not limited to, the following: Business Components which manage information about all of the home security and self-monitoring devices; End-User Application Components which display that information for users and access the Business Components via published XML APIs; and Service Management Application Components which enable operators to administer the service (these components also access the Business Components via the XML APIs, and also via published SNMP MIBs).

The server components provide access to, and management of, the objects associated with an integrated security system installation. The top-level object is the "network." It is a location where a gateway 102 is located, and is also commonly referred to as a site or premises; the premises can include any type of structure (e.g., home, office, warehouse, etc.) at which a gateway 102 is located. Users can only access the networks to which they have been granted permission. Within a network, every object monitored by the gateway 102 is called a device. Devices include the sensors, cameras, home security panels and automation devices, as well as the controller or processor-based device running the gateway applications.

Various types of interactions are possible between the objects in a system. Automations define actions that occur as a result of a change in state of a device. For example, take a picture with the front entry camera when the front door sensor changes to "open". Notifications are messages sent to users to indicate that something has occurred, such as the front door going to "open" state, or has not occurred (referred to as an iWatch notification). Schedules define changes in device states that are to take place at predefined days and times. For example, set the security panel to "Armed" mode every weeknight at 11:00 pm.

The iConnect Business Components are responsible for orchestrating all of the low-level service management activities for the integrated security system service. They define all of the users and devices associated with a network (site), analyze how the devices interact, and trigger associated actions (such as sending notifications to users). All changes in device states are monitored and logged. The Business Components also manage all interactions with external systems as required, including sending alarms and other related self-monitoring data to the home security Central Monitoring System (CMS) 199. The Business Components are implemented as portable Java J2EE Servlets, but are not so limited.

The following iConnect Business Components manage the main elements of the integrated security system service, but the embodiment is not so limited:

A Registry Manager 220 defines and manages users and networks. This component is responsible for the creation, modification and termination of users and networks. It is also where a user's access to networks is defined.

A Network Manager 222 defines and manages security and self-monitoring devices that are deployed on a network (site). This component handles the creation, modification, deletion and configuration of the devices, as well as the creation of automations, schedules and notification rules associated with those devices.

A Data Manager 224 manages access to current and logged state data for an existing network and its devices. This component specifically does not provide any access to network management capabilities, such as adding new devices to a network, which are handled exclusively by the Network Manager 222.

To achieve optimal performance for all types of queries, data for current device states is stored separately from historical state data (a.k.a. "logs") in the database. A Log Data Manager 226 performs ongoing transfers of current device state data to the historical data log tables.

Additional iConnect Business Components handle direct communications with certain clients and other systems, for example:

An iHub Manager 228 directly manages all communications with gateway clients, including receiving information about device state changes, changing the configuration of devices, and pushing new versions of the gateway client to the hardware it is running on.

A Notification Manager 230 is responsible for sending all notifications to clients via SMS (mobile phone messages), email (via a relay server like an SMTP email server), etc.

An Alarm and CMS Manager 232 sends critical server-generated alarm events to the home security Central Monitoring Station (CMS) and manages all other communications of integrated security system service data to and from the CMS.

The Element Management System (EMS) 234 is an iControl Business Component that manages all activities associated with service installation, scaling and monitoring, and filters and packages service operations data for use by service management applications. The SNMP MIBs published by the EMS can also be incorporated into any third party monitoring system if desired.

The iConnect Business Components store information about the objects that they manage in the iControl Service Database 240 and in the iControl Content Store 242. The iControl Content Store is used to store media objects like video, photos and widget content, while the Service Database stores information about users, networks, and devices.

Database interaction is performed via a JDBC interface. For security purposes, the Business Components manage all data storage and retrieval.

The iControl Business Components provide web services-based APIs that application components use to access the Business Components' capabilities. Functions of application components include presenting integrated security system service data to end-users, performing administrative duties, and integrating with external systems and back-office applications.

The primary published APIs for the iConnect Business Components include, but are not limited to, the following:

- A Registry Manager API 252 provides access to the Registry Manager Business Component's functionality, allowing management of networks and users.
- A Network Manager API 254 provides access to the Network Manager Business Component's functionality, allowing management of devices on a network.
- A Data Manager API 256 provides access to the Data Manager Business Component's functionality, such as setting and retrieving (current and historical) data about device states.
- A Provisioning API 258 provides a simple way to create new networks and configure initial default properties.

Each API of an embodiment includes two modes of access: Java API or XML API. The XML APIs are published as web services so that they can be easily accessed by applications or servers over a network. The Java APIs are a programmer-friendly wrapper for the XML APIs. Application components and integrations written in Java should generally use the Java APIs rather than the XML APIs directly.

The iConnect Business Components also have an XML-based interface 260 for quickly adding support for new devices to the integrated security system. This interface 260, referred to as DeviceConnect 260, is a flexible, standards-based mechanism for defining the properties of new devices and how they can be managed. Although the format is flexible enough to allow the addition of any type of future device, pre-defined XML profiles are currently available for adding common types of devices such as sensors (SensorConnect), home security panels (PanelConnect) and IP cameras (CameraConnect).

The iConnect End-User Application Components deliver the user interfaces that run on the different types of clients supported by the integrated security system service. The components are written in portable Java J2EE technology (e.g., as Java Servlets, as JavaServer Pages (JSPs), etc.) and they all interact with the iControl Business Components via the published APIs.

The following End-User Application Components generate CSS-based HTML/JavaScript that is displayed on the target client. These applications can be dynamically branded with partner-specific logos and URL links (such as Customer Support, etc.). The End-User Application Components of an embodiment include, but are not limited to, the following:

- An iControl Activation Application 270 that delivers the first application that a user sees when they set up the integrated security system service. This wizard-based web browser application securely associates a new user with a purchased gateway and the other devices included with it as a kit (if any). It primarily uses functionality published by the Provisioning API.
- An iControl Web Portal Application 272 runs on PC browsers and delivers the web-based interface to the integrated security system service. This application allows users to manage their networks (e.g. add devices and create automations) as well as to view/change device states, and manage pictures and videos. Because of the wide scope of capabilities of this application, it uses three different Business Component APIs that include the Registry Manager API, Network Manager API, and Data Manager API, but the embodiment is not so limited.
- An iControl Mobile Portal 274 is a small-footprint web-based interface that runs on mobile phones and PDAs. This interface is optimized for remote viewing of device states and pictures/videos rather than network management. As such, its interaction with the Business Components is primarily via the Data Manager API.

Custom portals and targeted client applications can be provided that leverage the same Business Component APIs used by the above applications.

A Content Manager Application Component 276 delivers content to a variety of clients. It sends multimedia-rich user interface components to widget container clients (both PC and browser-based), as well as to advanced touchscreen keypad clients. In addition to providing content directly to end-user devices, the Content Manager 276 provides widget-based user interface components to satisfy requests from other Application Components such as the iControl Web 272 and Mobile 274 portals.

A number of Application Components are responsible for overall management of the service. These pre-defined applications, referred to as Service Management Application Components, are configured to offer off-the-shelf solutions for production management of the integrated security system service including provisioning, overall service monitoring, customer support, and reporting, for example. The Service Management Application Components of an embodiment include, but are not limited to, the following:

- A Service Management Application 280 allows service administrators to perform activities associated with service installation, scaling and monitoring/alerting. This application interacts heavily with the Element Management System (EMS) Business Component to execute its functionality, and also retrieves its monitoring data from that component via protocols such as SNMP MIBs.
- A Kitting Application 282 is used by employees performing service provisioning tasks. This application allows home security and self-monitoring devices to be associated with gateways during the warehouse kitting process.
- A CSR Application and Report Generator 284 is used by personnel supporting the integrated security system service, such as CSRs resolving end-user issues and employees enquiring about overall service usage. The push of new gateway firmware to deployed gateways is also managed by this application.

The iConnect servers 104 also support custom-built integrations with a service provider's existing OSS/BSS, CSR and service delivery systems 290. Such systems can access the iConnect web services XML API to transfer data to and from the iConnect servers 104. These types of integrations can compliment or replace the PC browser-based Service Management applications, depending on service provider needs.

As described above, the integrated security system of an embodiment includes a gateway, or iHub. The gateway of an embodiment includes a device that is deployed in the home or business and couples or connects the various third-party cameras, home security panels, sensors and devices to the iConnect server over a WAN connection as described in detail herein. The gateway couples to the home network and communicates directly with the home security panel in both wired and wireless sensor installations. The gateway is configured to be low-cost, reliable and thin so that it complements the integrated security system network-based architecture.

The gateway supports various wireless protocols and can interconnect with a wide range of home security control panels. Service providers and users can then extend the system's capabilities by adding IP cameras, lighting modules and additional security devices. The gateway is configurable to be integrated into many consumer appliances, including set-top boxes, routers and security panels. The small and efficient footprint of the gateway enables this portability and versatility, thereby simplifying and reducing the overall cost of the deployment.

Figure 3:
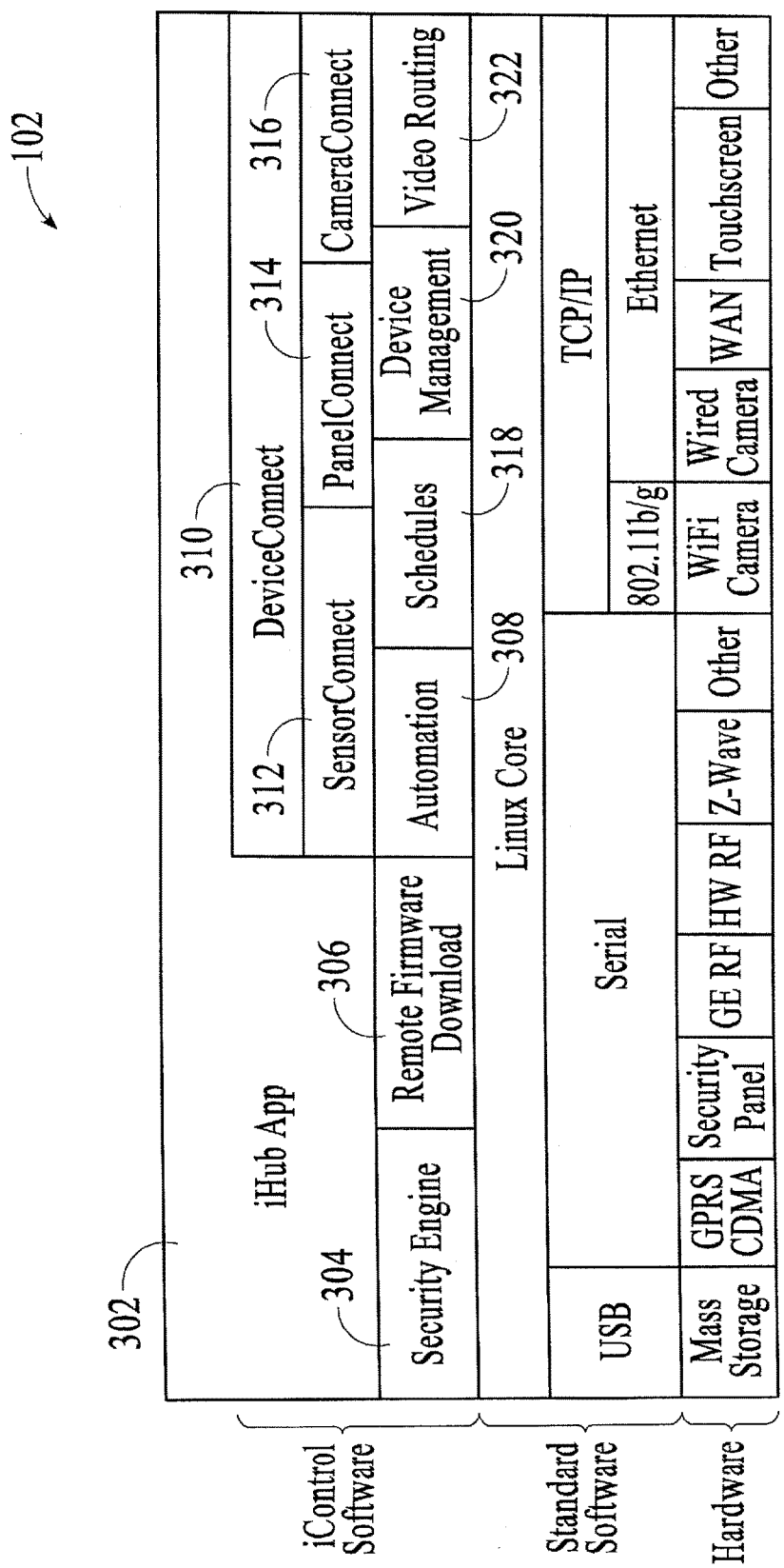
FIG. 3 is a block diagram of the gateway software or applications, under an embodiment.

FIG. 3 is a block diagram of the gateway 102 including gateway software or applications, under an embodiment. The gateway software architecture is relatively thin and efficient, thereby simplifying its integration into other consumer appliances such as set-top boxes, routers, touch screens and security panels. The software architecture also provides a high degree of security against unauthorized access. This section describes the various key components of the gateway software architecture.

The gateway application layer 302 is the main program that orchestrates the operations performed by the gateway. The Security Engine 304 provides robust protection against intentional and unintentional intrusion into the integrated security system network from the outside world (both from inside the premises as well as from the WAN). The Security Engine 304 of an embodiment comprises one or more sub-modules or components that perform functions including, but not limited to, the following:

Encryption including 128-bit SSL encryption for gateway and iConnect server communication to protect user data privacy and provide secure communication.

Bi-directional authentication between the gateway and iConnect server in order to prevent unauthorized spoofing and attacks. Data sent from the iConnect server to the gateway application (or vice versa) is digitally signed as an additional layer of security. Digital signing provides both authentication and validation that the data has not been altered in transit.

Camera SSL encapsulation because picture and video traffic offered by off-the-shelf networked IP cameras is not secure when traveling over the Internet. The gateway provides for 128-bit SSL encapsulation of the user picture and video data sent over the internet for complete user security and privacy.

802.11b/g/n with WPA-2 security to ensure that wireless camera communications always takes place using the strongest available protection.

A gateway-enabled device is assigned a unique activation key for activation with an iConnect server. This ensures that only valid gateway-enabled devices can be activated for use with the specific instance of iConnect server in use. Attempts to activate gateway-enabled devices by brute force are detected by the Security Engine. Partners deploying gateway-enabled devices have the knowledge that only a gateway with the correct serial number and activation key can be activated for use with an iConnect server. Stolen devices, devices attempting to masquerade as gateway-enabled devices, and malicious outsiders (or insiders as knowledgeable but nefarious customers) cannot effect other customers' gateway-enabled devices.

As standards evolve, and new encryption and authentication methods are proven to be useful, and older mechanisms proven to be breakable, the security manager can be upgraded "over the air" to provide new and better security for communications between the iConnect server and the gateway application, and locally at the premises to remove any risk of eavesdropping on camera communications.

A Remote Firmware Download module 306 allows for seamless and secure updates to the gateway firmware through the iControl Maintenance Application on the server 104, providing a transparent, hassle-free mechanism for the service provider to deploy new features and bug fixes to the installed user base. The firmware download mechanism is tolerant of connection loss, power interruption and user interventions (both intentional and unintentional). Such robustness reduces down time and customer support issues. Gateway firmware can be remotely download either for one gateway at a time, a group of gateways, or in batches.

The Automations engine 308 manages the user-defined rules of interaction between the different devices (e.g. when door opens turn on the light). Though the automation rules are programmed and reside at the portal/server level, they are cached at the gateway level in order to provide short latency between device triggers and actions.

DeviceConnect 310 includes definitions of all supported devices (e.g., cameras, security panels, sensors, etc.) using a standardized plug-in architecture. The DeviceConnect module 310 offers an interface that can be used to quickly add support for any new device as well as enabling interoperability between devices that use different technologies/protocols. For common device types, pre-defined sub-modules have been defined, making supporting new devices of these types even easier. SensorConnect 312 is provided for adding new sensors, CameraConnect 316 for adding IP cameras, and PanelConnect 314 for adding home security panels.

The Schedules engine 318 is responsible for executing the user defined schedules (e.g., take a picture every five minutes; every day at 8 am set temperature to 65 degrees Fahrenheit, etc.). Though the schedules are programmed and reside at the iConnect server level they are sent to the scheduler within the gateway application. The Schedules Engine 318 then interfaces with SensorConnect 312 to ensure that scheduled events occur at precisely the desired time.

The Device Management module 320 is in charge of all discovery, installation and configuration of both wired and wireless IP devices (e.g., cameras, etc.) coupled or connected to the system. Networked IP devices, such as those used in the integrated security system, require user configuration of many IP and security parameters—to simplify the user experience and reduce the customer support burden, the device management module of an embodiment handles the details of this configuration. The device management module also manages the video routing module described below.

The video routing engine 322 is responsible for delivering seamless video streams to the user with zero-configuration. Through a multi-step, staged approach the video routing engine uses a combination of UPnP port-forwarding, relay server routing and STUN/TURN peer-to-peer routing.

Figure 4:
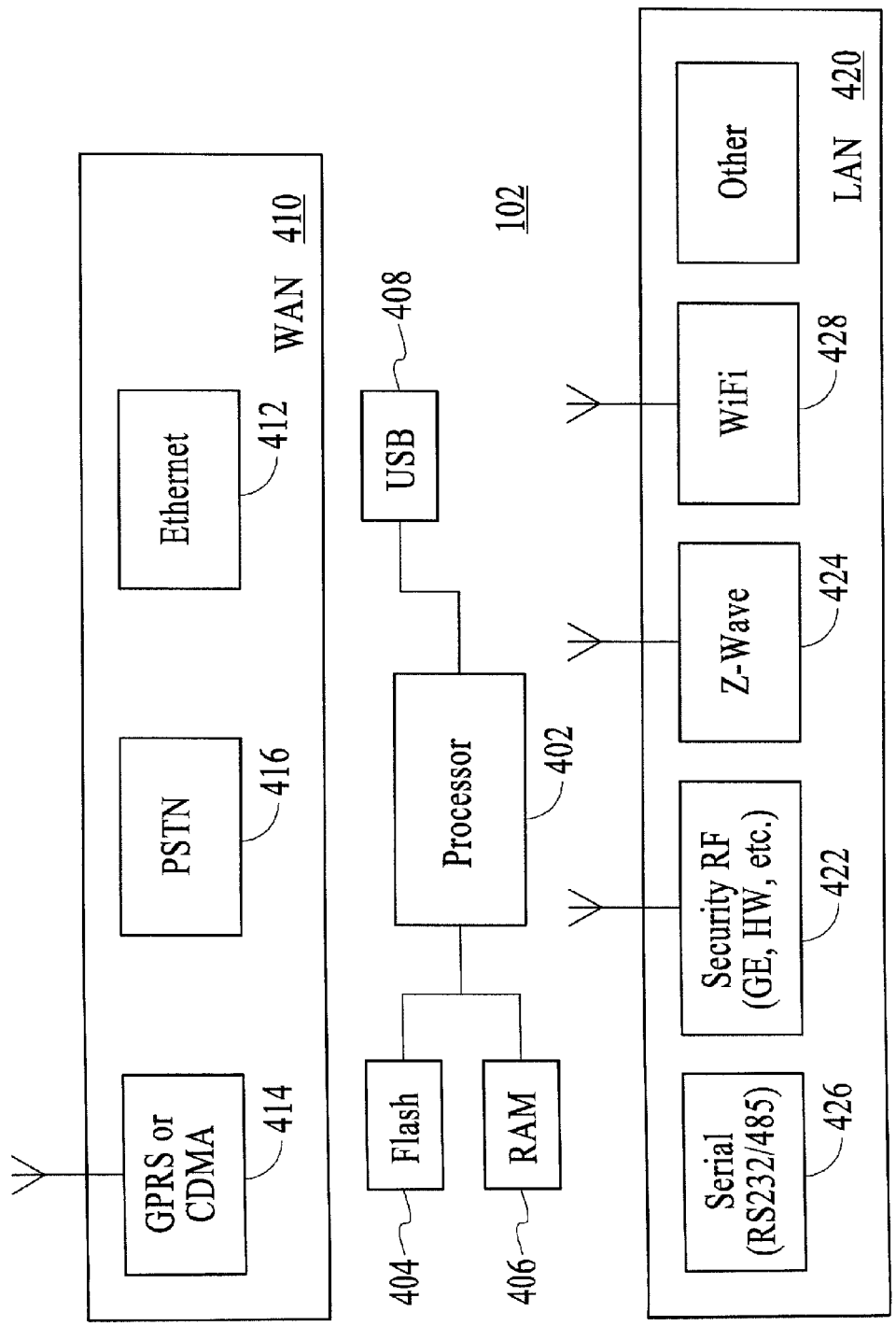
FIG. 4 is a block diagram of the gateway components, under an embodiment.

FIG. 4 is a block diagram of components of the gateway 102, under an embodiment. Depending on the specific set of functionality desired by the service provider deploying the integrated security system service, the gateway 102 can use any of a number of processors 402, due to the small footprint of the gateway application firmware. In an embodiment, the gateway could include the Broadcom BCM5354 as the processor for example. In addition, the gateway 102 includes memory (e.g., FLASH 404, RAM 406, etc.) and any number of input/output (I/O) ports 408.

Referring to the WAN portion 410 of the gateway 102, the gateway 102 of an embodiment can communicate with the iConnect server using a number of communication types and/or protocols, for example Broadband 412, GPRS 414 and/or Public Switched Telephone Network (PTSN) 416 to name a few. In general, broadband communication 412 is the primary means of connection between the gateway 102 and the iConnect server 104 and the GPRS/CDMA 414 and/or PSTN 416 interfaces acts as back-up for fault tolerance in case the user's broadband connection fails for whatever reason, but the embodiment is not so limited.

Referring to the LAN portion 420 of the gateway 102, various protocols and physical transceivers can be used to communicate to off-the-shelf sensors and cameras. The gateway 102 is protocol-agnostic and technology-agnostic and as such can easily support almost any device networking protocol. The gateway 102 can, for example, support GE and Honeywell security RF protocols 422, Z-Wave 424, serial (RS232 and RS485) 426 for direct connection to security panels as well as WiFi 428 (802.11b/g) for communication to WiFi cameras.

The integrated security system includes couplings or connections among a variety of IP devices or components, and the device management module is in charge of the discovery, installation and configuration of the IP devices coupled or connected to the system, as described above. The integrated security system of an embodiment uses a "sandbox" network to discover and manage all IP devices coupled or connected as components of the system. The IP devices of an embodiment include wired devices, wireless devices, cameras, interactive touchscreens, and security panels to name a few. These devices can be wired via ethernet cable or Wifi devices, all of which are secured within the sandbox network, as described below. The "sandbox" network is described in detail below.

Figure 5:
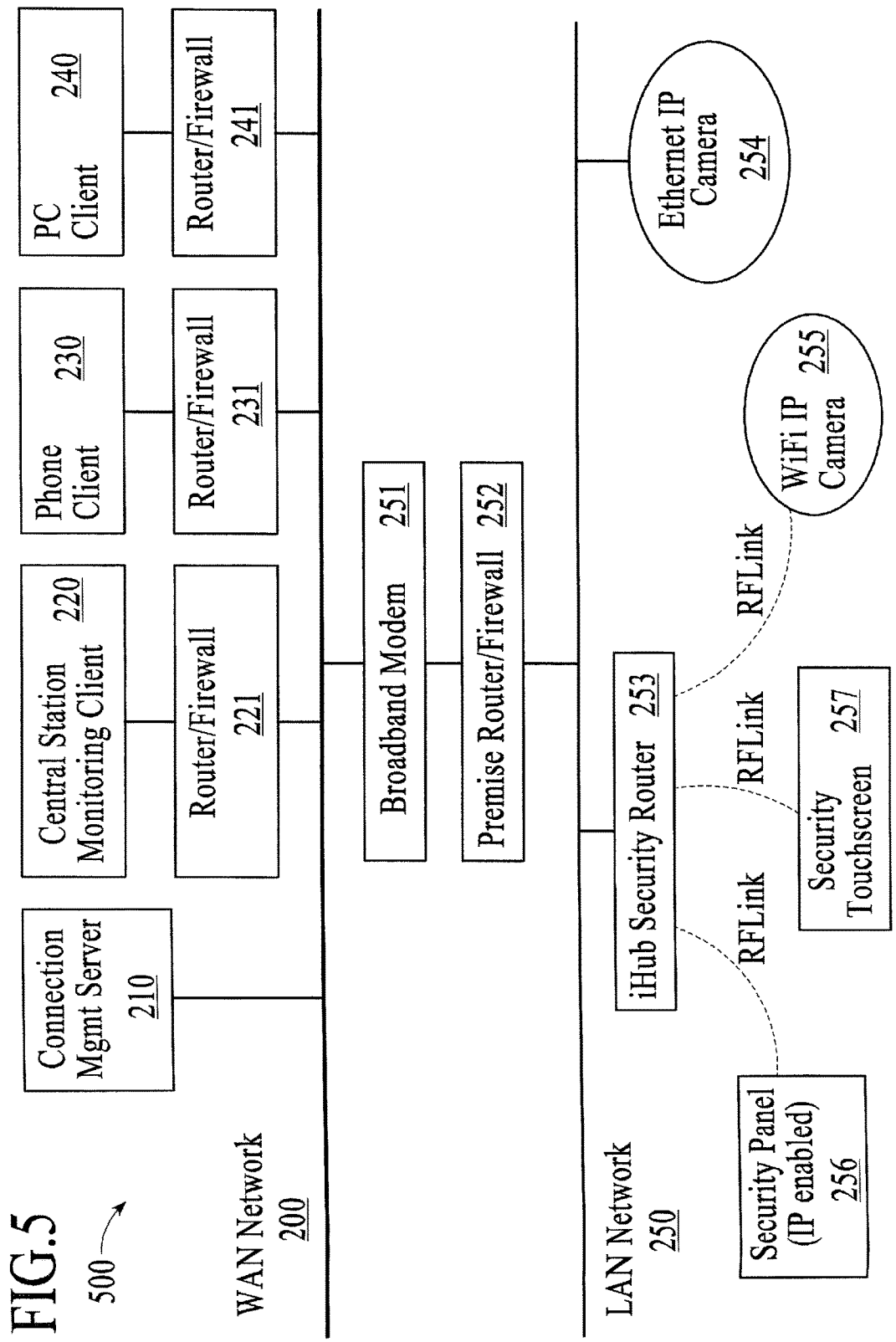
FIG. 5 is a block diagram of IP device integration with a premise network, under an embodiment.

FIG. 5 is a block diagram 500 of network or premise device integration with a premise network 250, under an embodiment. In an embodiment, network devices 255-257 are coupled to the gateway 102 using a secure network coupling or connection such as SSL over an encrypted 802.11 link (utilizing for example WPA-2 security for the wireless encryption). The network coupling or connection between the gateway 102 and the network devices 255-257 is a private coupling or connection in that it is segregated from any other network couplings or connections. The gateway 102 is coupled to the premise router/firewall 252 via a coupling with a premise LAN 250. The premise router/firewall 252 is coupled to a broadband modem 251, and the broadband modem 251 is coupled to a WAN 200 or other network outside the premise. The gateway 102 thus enables or forms a separate wireless network, or sub-network, that includes some number of devices and is coupled or connected to the LAN 250 of the host premises. The gateway sub-network can include, but is not limited to, any number of other devices like WiFi IP cameras, security panels (e.g., IP-enabled), and security touchscreens, to name a few. The gateway 102 manages or controls the sub-network separately from the LAN 250 and transfers data and information between components of the sub-network and the LAN 250/WAN 200, but is not so limited. Additionally, other network devices 254 can be coupled to the LAN 250 without being coupled to the gateway 102.

Figure 6:
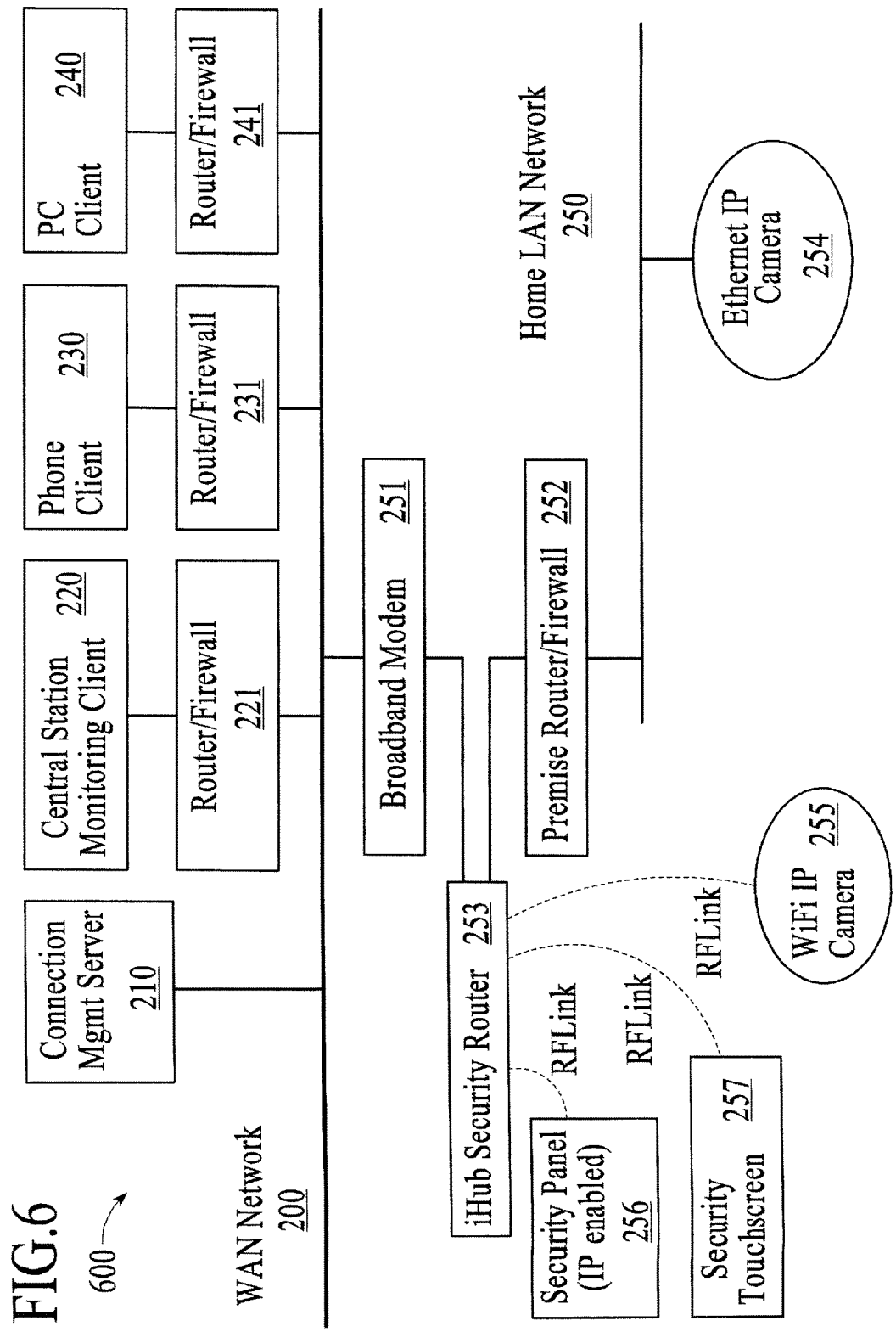
FIG. 6 is a block diagram of IP device integration with a premise network, under an alternative embodiment.

FIG. 6 is a block diagram 600 of network or premise device integration with a premise network 250, under an alternative embodiment. The network or premise devices 255-257 are coupled to the gateway 102. The network coupling or connection between the gateway 102 and the network devices 255-257 is a private coupling or connection in that it is segregated from any other network couplings or connections. The gateway 102 is coupled or connected between the premise router/firewall 252 and the broadband modem 251. The broadband modem 251 is coupled to a WAN 200 or other network outside the premise, while the premise router/firewall 252 is coupled to a premise LAN 250. As a result of its location between the broadband modem 251 and the premise router/firewall 252, the gateway 102 can be configured or function as the premise router routing specified data between the outside network (e.g., WAN 200) and the premise router/firewall 252 of the LAN 250. As described above, the gateway 102 in this configuration enables or forms a separate wireless network, or sub-network, that includes the network or premise devices 255-257 and is coupled or connected between the LAN 250 of the host premises and the WAN 200. The gateway sub-network can include, but is not limited to, any number of network or premise devices 255-257 like WiFi IP cameras, security panels (e.g., IP-enabled), and security touchscreens, to name a few. The gateway 102 manages or controls the sub-network separately from the LAN 250 and transfers data and information between components of the sub-network and the LAN 250/WAN 200, but is not so limited. Additionally, other network devices 254 can be coupled to the LAN 250 without being coupled to the gateway 102.

The examples described above with reference to FIGS. 5 and 6 are presented only as examples of IP device integration. The integrated security system is not limited to the type, number and/or combination of IP devices shown and described in these examples, and any type, number and/or combination of IP devices is contemplated within the scope of this disclosure as capable of being integrated with the premise network.

The integrated security system of an embodiment includes a touchscreen (also referred to as the iControl touchscreen or integrated security system touchscreen), as described above, which provides core security keypad functionality, content management and presentation, and embedded systems design. The networked security touchscreen system of an embodiment enables a consumer or security provider to easily and automatically install, configure and manage the security system and touchscreen located at a customer premise. Using this system the customer may access and control the local security system, local IP devices such as cameras, local sensors and control devices (such as lighting controls or pipe freeze sensors), as well as the local security system panel and associated security sensors (such as door/window, motion, and smoke detectors). The customer premise may be a home, business, and/or other location equipped with a wired or wireless broadband IP connection.

The system of an embodiment includes a touchscreen with a configurable software user interface and/or a gateway device (e.g., iHub) that couples or connects to a premise security panel through a wired or wireless connection, and a remote server that provides access to content and information from the premises devices to a user when they are remote from the home. The touchscreen supports broadband and/or WAN wireless connectivity. In this embodiment, the touchscreen incorporates an IP broadband connection (e.g., Wifi radio, Ethernet port, etc.), and/or a cellular radio (e.g., GPRS/GSM, CDMA, WiMax, etc.). The touchscreen described herein can be used as one or more of a security system interface panel and a network user interface (UI) that provides an interface to interact with a network (e.g., LAN, WAN, internet, etc.).

The touchscreen of an embodiment provides an integrated touchscreen and security panel as an all-in-one device. Once integrated using the touchscreen, the touchscreen and a security panel of a premise security system become physically co-located in one device, and the functionality of both may even be co-resident on the same CPU and memory (though this is not required).

The touchscreen of an embodiment also provides an integrated IP video and touchscreen UI. As such, the touchscreen supports one or more standard video CODECs/players (e.g., H.264, Flash Video, MOV, MPEG4, M-JPEG, etc.). The touchscreen UI then provides a mechanism (such as a camera or video widget) to play video. In an embodiment the video is streamed live from an IP video camera. In other embodiments the video comprises video clips or photos sent from an IP camera or from a remote location.

The touchscreen of an embodiment provides a configurable user interface system that includes a configuration supporting use as a security touchscreen. In this embodiment, the touchscreen utilizes a modular user interface that allows components to be modified easily by a service provider, an installer, or even the end user. Examples of such a modular approach include using Flash widgets, HTML-based widgets, or other downloadable code modules such that the user interface of the touchscreen can be updated and modified while the application is running. In an embodiment the touchscreen user interface modules can be downloaded over the internet. For example, a new security configuration widget can be downloaded from a standard web server, and the touchscreen then loads such configuration app into memory, and inserts it in place of the old security configuration widget. The touchscreen of an embodiment is configured to provide a self-install user interface.

Embodiments of the networked security touchscreen system described herein include a touchscreen device with a user interface that includes a security toolbar providing one or more functions including arm, disarm, panic, medic, and alert. The touchscreen therefore includes at least one screen having a separate region of the screen dedicated to a security toolbar. The security toolbar of an embodiment is present in the dedicated region at all times that the screen is active.

The touchscreen of an embodiment includes a home screen having a separate region of the screen allocated to managing home-based functions. The home-based functions of an embodiment include managing, viewing, and/or controlling IP video cameras. In this embodiment, regions of the home screen are allocated in the form of widget icons; these widget icons (e.g. for cameras, thermostats, lighting, etc) provide functionality for managing home systems. So, for example, a displayed camera icon, when selected, launches a Camera Widget, and the Camera widget in turn provides access to video from one or more cameras, as well as providing the user with relevant camera controls (take a picture, focus the camera, etc.)

The touchscreen of an embodiment includes a home screen having a separate region of the screen allocated to managing, viewing, and/or controlling internet-based content or applications. For example, the Widget Manager UI presents a region of the home screen (up to and including the entire home screen) where internet widgets icons such as weather, sports, etc) may be accessed. Each of these icons may be selected to launch their respective content services.

The touchscreen of an embodiment is integrated into a premise network using the gateway, as described above. The gateway as described herein functions to enable a separate wireless network, or sub-network, that is coupled, connected, or integrated with another network (e.g., WAN, LAN of the host premises, etc.). The sub-network enabled by the gateway optimizes the installation process for IP devices, like the touchscreen, that couple or connect to the sub-network by segregating these IP devices from other such devices on the network. This segregation of the IP devices of the sub-network further enables separate security and privacy policies to be implemented for these IP devices so that, where the IP devices are dedicated to specific functions (e.g., security), the security and privacy policies can be tailored specifically for the specific functions. Furthermore, the gateway and the sub-network it forms enables the segregation of data traffic, resulting in faster and more efficient data flow between components of the host network, components of the sub-network, and between components of the sub-network and components of the network.

The touchscreen of an embodiment includes a core functional embedded system that includes an embedded operating system, required hardware drivers, and an open system interface to name a few. The core functional embedded system can be provided by or as a component of a conventional security system (e.g., security system available from GE Security). These core functional units are used with components of the integrated security system as described herein. Note that portions of the touchscreen description below may include reference to a host premise security system (e.g., GE security system), but these references are included only as an example and do not limit the touchscreen to integration with any particular security system.

As an example, regarding the core functional embedded system, a reduced memory footprint version of embedded Linux forms the core operating system in an embodiment, and provides basic TCP/IP stack and memory management functions, along with a basic set of low-level graphics primitives. A set of device drivers is also provided or included that offer low-level hardware and network interfaces. In addition to the standard drivers, an interface to the RS 485 bus is included that couples or connects to the security system panel (e.g., GE Concord panel). The interface may, for example, implement the Superbus 2000 protocol, which can then be utilized by the more comprehensive transaction-level security functions implemented in PanelConnect technology (e.g SetAlarmLevel (int level, int partition, char *accessCode)). Power control drivers are also provided.

Figure 7:
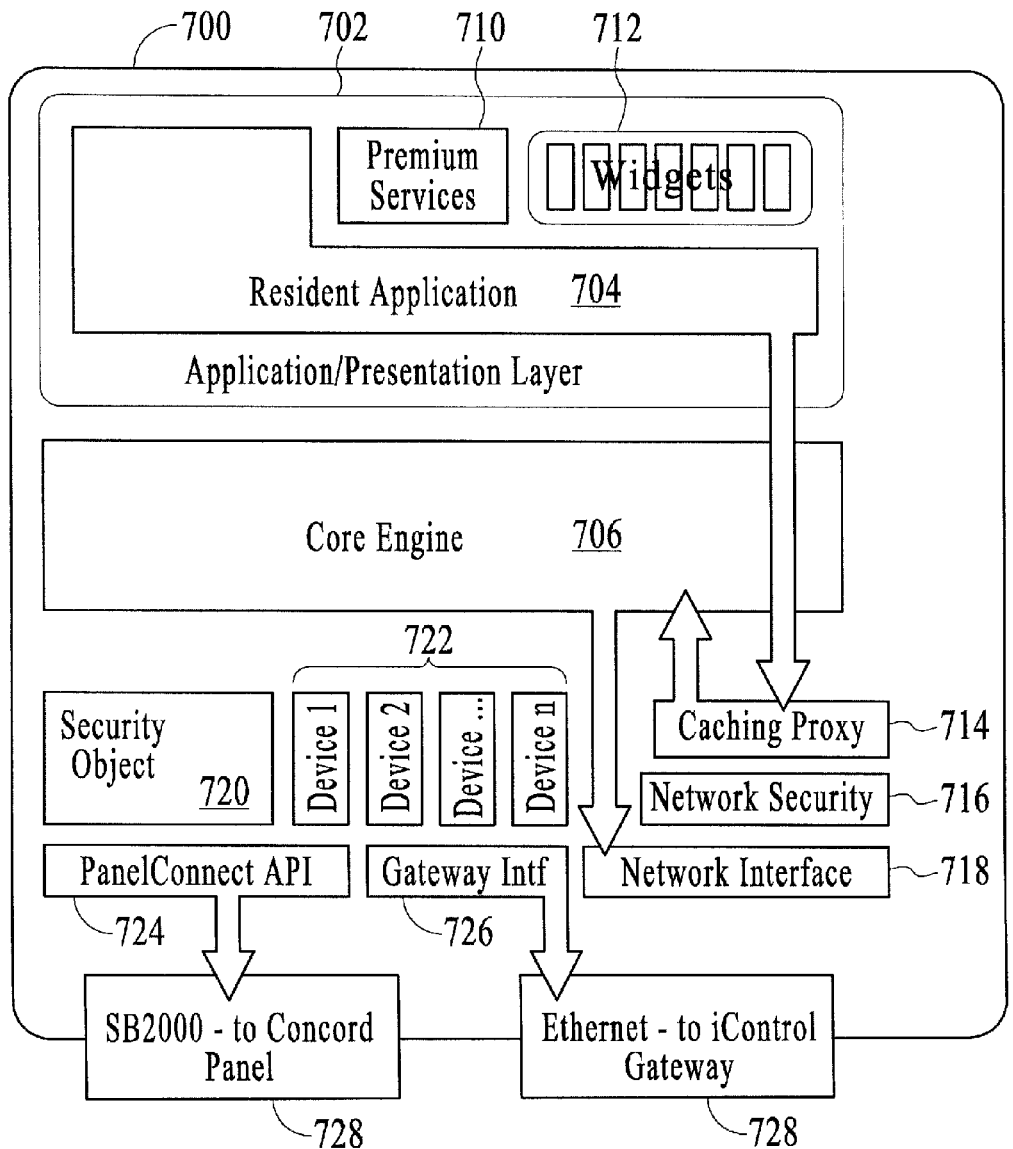
FIG. 7 is a block diagram of a touchscreen, under an embodiment.

FIG. 7 is a block diagram of a touchscreen 700 of the integrated security system, under an embodiment. The touchscreen 700 generally includes an application/presentation layer 702 with a resident application 704, and a core engine 706. The touchscreen 700 also includes one or more of the following, but is not so limited: applications of premium services 710, widgets 712, a caching proxy 714, network security 716, network interface 718, security object 720, applications supporting devices 722, PanelConnect API 724, a gateway interface 726, and one or more ports 728.

More specifically, the touchscreen, when configured as a home security device, includes but is not limited to the following application or software modules: RS 485 and/or RS-232 bus security protocols to conventional home security system panel (e.g., GE Concord panel); functional home security classes and interfaces (e.g. Panel ARM state, Sensor status, etc.); Application/Presentation layer or engine; Resident Application; Consumer Home Security Application;

installer home security application; core engine; and System bootloader/Software Updater. The core Application engine and system bootloader can also be used to support other advanced content and applications. This provides a seamless interaction between the premise security application and other optional services such as weather widgets or IP cameras.

An alternative configuration of the touchscreen includes a first Application engine for premise security and a second Application engine for all other applications. The integrated security system application engine supports content standards such as HTML, XML, Flash, etc. and enables a rich consumer experience for all 'widgets', whether security-based or not. The touchscreen thus provides service providers the ability to use web content creation and management tools to build and download any 'widgets' regardless of their functionality.

As discussed above, although the Security Applications have specific low-level functional requirements in order to interface with the premise security system, these applications make use of the same fundamental application facilities as any other 'widget', application facilities that include graphical layout, interactivity, application handoff, screen management, and network interfaces, to name a few.

Content management in the touchscreen provides the ability to leverage conventional web development tools, performance optimized for an embedded system, service provider control of accessible content, content reliability in a consumer device, and consistency between 'widgets' and seamless widget operational environment. In an embodiment of the integrated security system, widgets are created by web developers and hosted on the integrated security system Content Manager (and stored in the Content Store database). In this embodiment the server component caches the widgets and offers them to consumers through the web-based integrated security system provisioning system. The servers interact with the advanced touchscreen using HTTPS interfaces controlled by the core engine and dynamically download widgets and updates as needed to be cached on the touchscreen. In other embodiments widgets can be accessed directly over a network such as the Internet without needing to go through the iControl Content Manager Referring to FIG. 7, the touchscreen system is built on a tiered architecture, with defined interfaces between the Application/Presentation Layer (the Application Engine) on the top, the Core Engine in the middle, and the security panel and gateway APIs at the lower level. The architecture is configured to provide maximum flexibility and ease of maintenance.

Figure 8:
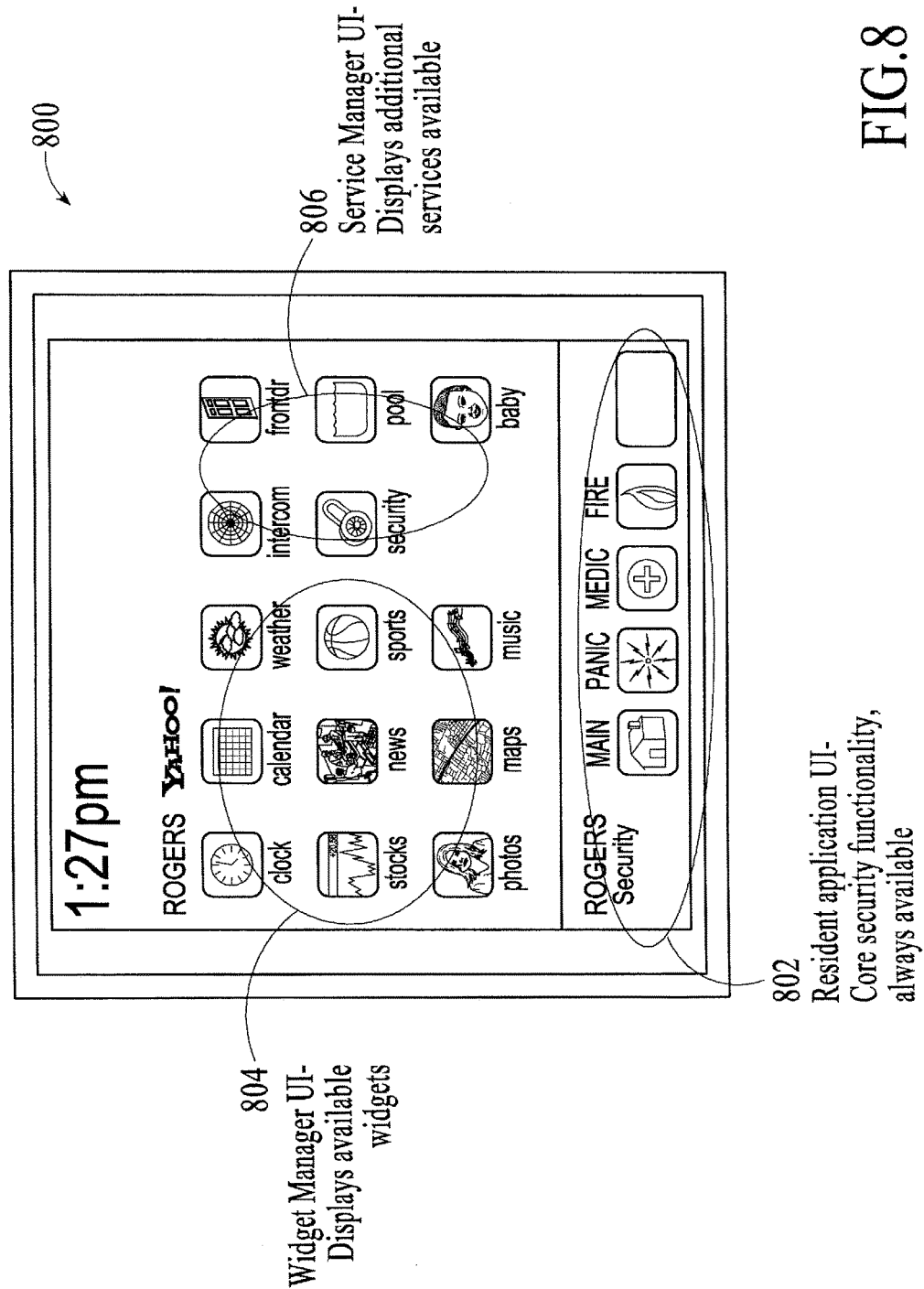
FIG. 8 is an example screenshot of a networked security touchscreen, under an embodiment.

The application engine of the touchscreen provides the presentation and interactivity capabilities for all applications (widgets) that run on the touchscreen, including both core security function widgets and third party content widgets. FIG. 8 is an example screenshot 800 of a networked security touchscreen, under an embodiment. This example screenshot 800 includes three interfaces or user interface (UI) components 802-806, but is not so limited. A first UI 802 of the touchscreen includes icons by which a user controls or accesses functions and/or components of the security system (e.g., "Main", "Panic", "Medic", "Fire", state of the premise alarm system (e.g., disarmed, armed, etc.), etc.); the first UI 802, which is also referred to herein as a security interface, is always presented on the touchscreen. A second UI 804 of the touchscreen includes icons by which a user selects or interacts with services and other network content (e.g., clock, calendar, weather, stocks, news, sports, photos, maps, music, etc.) that is accessible via the touchscreen. The second UI 804 is also referred to herein as a network interface or content interface. A third UI 806 of the touchscreen includes icons by which a user selects or interacts with additional services or components (e.g., intercom control, security, cameras coupled to the system in particular regions (e.g., front door, baby, etc.) available via the touchscreen.

A component of the application engine is the Presentation Engine, which includes a set of libraries that implement the standards-based widget content (e.g., XML, HTML, JavaScript, Flash) layout and interactivity. This engine provides the widget with interfaces to dynamically load both graphics and application logic from third parties, support high level data description language as well as standard graphic formats. The set of web content-based functionality available to a widget developer is extended by specific touchscreen functions implemented as local web services by the Core Engine.

The resident application of the touchscreen is the master service that controls the interaction of all widgets in the system, and enforces the business and security rules required by the service provider. For example, the resident application determines the priority of widgets, thereby enabling a home security widget to override resource requests from a less critical widget (e.g. a weather widget). The resident application also monitors widget behavior, and responds to client or server requests for cache updates.

The core engine of the touchscreen manages interaction with other components of the integrated security system, and provides an interface through which the resident application and authorized widgets can get information about the home security system, set alarms, install sensors, etc. At the lower level, the Core Engine's main interactions are through the PanelConnect API, which handles all communication with the security panel, and the gateway Interface, which handles communication with the gateway. In an embodiment, both the iHub Interface and PanelConnect API are resident and operating on the touchscreen. In another embodiment, the PanelConnect API runs on the gateway or other device that provides security system interaction and is accessed by the touchscreen through a web services interface.

The Core Engine also handles application and service level persistent and cached memory functions, as well as the dynamic provisioning of content and widgets, including but not limited to: flash memory management, local widget and content caching, widget version management (download, cache flush new/old content versions), as well as the caching and synchronization of user preferences. As a portion of these services the Core engine incorporates the bootloader functionality that is responsible for maintaining a consistent software image on the touchscreen, and acts as the client agent for all software updates. The bootloader is configured to ensure full update redundancy so that unsuccessful downloads cannot corrupt the integrated security system.

Video management is provided as a set of web services by the Core Engine. Video management includes the retrieval and playback of local video feeds as well as remote control and management of cameras (all through iControl Camera-Connect technology).

Both the high level application layer and the mid-level core engine of the touchscreen can make calls to the network. Any call to the network made by the application layer is automatically handed off to a local caching proxy, which determines whether the request should be handled locally. Many of the requests from the application layer are web services API requests, although such requests could be satisfied by the iControl servers, they are handled directly by the touchscreen and the gateway. Requests that get through the caching proxy are checked against a white list of acceptable sites, and, if they match, are sent off through the network interface to the gateway. Included in the Network Subsystem is a set of network services including HTTP, HTTPS, and server-level authentication functions to manage the secure client-server interface. Storage and management of certificates is incorporated as a part of the network services layer.

Server components of the integrated security system servers support interactive content services on the touchscreen. These server components include, but are not limited to the content manager, registry manager, network manager, and global registry, each of which is described herein.

The Content Manager oversees aspects of handling widget data and raw content on the touchscreen. Once created and validated by the service provider, widgets are 'ingested' to the Content Manager, and then become available as downloadable services through the integrated security system Content Management APIs. The Content manager maintains versions and timestamp information, and connects to the raw data contained in the backend Content Store database. When a widget is updated (or new content becomes available) all clients registering interest in a widget are systematically updated as needed (a process that can be configured at an account, locale, or system-wide level).

The Registry Manager handles user data, and provisioning accounts, including information about widgets the user has decided to install, and the user preferences for these widgets.

The Network Manager handles getting and setting state for all devices on the integrated security system network (e.g., sensors, panels, cameras, etc.). The Network manager synchronizes with the gateway, the advanced touchscreen, and the subscriber database.

The Global Registry is a primary starting point server for all client services, and is a logical referral service that abstracts specific server locations/addresses from clients (touchscreen, gateway 102, desktop widgets, etc.). This approach enables easy scaling/migration of server farms.

The touchscreen of an embodiment operates wirelessly with a premise security system. The touchscreen of an embodiment incorporates an RF transceiver component that either communicates directly with the sensors and/or security panel over the panel's proprietary RF frequency, or the touchscreen communicates wirelessly to the gateway over 802.11, Ethernet, or other IP-based communications channel, as described in detail herein. In the latter case the gateway implements the PanelConnect interface and communicates directly to the security panel and/or sensors over wireless or wired networks as described in detail above.

The touchscreen of an embodiment is configured to operate with multiple security systems through the use of an abstracted security system interface. In this embodiment, the PanelConnect API can be configured to support a plurality of proprietary security system interfaces, either simultaneously or individually as described herein. In one embodiment of this approach, the touchscreen incorporates multiple physical interfaces to security panels (e.g. GE Security RS-485, Honeywell RF, etc.) in addition to the PanelConnect API implemented to support multiple security interfaces. The change needed to support this in PanelConnect is a configuration parameter specifying the panel type connection that is being utilized.

So for example, the setARMState( ) function is called with an additional parameter (e.g., Armstate=setARMState(type="ARM STAY|ARM AWAY|DISARM", Parameters="ExitDelay=30|Lights=OFF", panelType="GE Concord4 RS485")). The 'panelType' parameter is used by the setARMState function (and in practice by all of the PanelConnect functions) to select an algorithm appropriate to the specific panel out of a plurality of algorithms.

The touchscreen of an embodiment is self-installable. Consequently, the touchscreen provides a 'wizard' approach similar to that used in traditional computer installations (e.g. InstallShield). The wizard can be resident on the touchscreen, accessible through a web interface, or both. In one embodiment of a touchscreen self-installation process, the service provider can associate devices (sensors, touchscreens, security panels, lighting controls, etc.) remotely using a web-based administrator interface.

The touchscreen of an embodiment includes a battery backup system for a security touchscreen. The touchscreen incorporates a standard Li-ion or other battery and charging circuitry to allow continued operation in the event of a power outage. In an embodiment the battery is physically located and connected within the touchscreen enclosure. In another embodiment the battery is located as a part of the power transformer, or in between the power transformer and the touchscreen.

The example configurations of the integrated security system described above with reference to FIGS. 5 and 6 include a gateway that is a separate device, and the touchscreen couples to the gateway. However, in an alternative embodiment, the gateway device and its functionality can be incorporated into the touchscreen so that the device management module, which is now a component of or included in the touchscreen, is in charge of the discovery, installation and configuration of the IP devices coupled or connected to the system, as described above. The integrated security system with the integrated touchscreen/gateway uses the same "sandbox" network to discover and manage all IP devices coupled or connected as components of the system.

The touchscreen of this alternative embodiment integrates the components of the gateway with the components of the touchscreen as described herein. More specifically, the touchscreen of this alternative embodiment includes software or applications described above with reference to FIG. 3. In this alternative embodiment, the touchscreen includes the gateway application layer 302 as the main program that orchestrates the operations performed by the gateway. A Security Engine 304 of the touchscreen provides robust protection against intentional and unintentional intrusion into the integrated security system network from the outside world (both from inside the premises as well as from the WAN). The Security Engine 304 of an embodiment comprises one or more sub-modules or components that perform functions including, but not limited to, the following:

Encryption including 128-bit SSL encryption for gateway and iConnect server communication to protect user data privacy and provide secure communication.

Bi-directional authentication between the touchscreen and iConnect server in order to prevent unauthorized spoofing and attacks. Data sent from the iConnect server to the gateway application (or vice versa) is digitally signed as an additional layer of security. Digital signing provides both authentication and validation that the data has not been altered in transit.

Camera SSL encapsulation because picture and video traffic offered by off-the-shelf networked IP cameras is not secure when traveling over the Internet. The touchscreen provides for 128-bit SSL encapsulation of the user picture and video data sent over the internet for complete user security and privacy.

802.11b/g/n with WPA-2 security to ensure that wireless camera communications always takes place using the strongest available protection.

A touchscreen-enabled device is assigned a unique activation key for activation with an iConnect server. This ensures that only valid gateway-enabled devices can be activated for use with the specific instance of iConnect server in use. Attempts to activate gateway-enabled devices by brute force are detected by the Security Engine. Partners deploying touchscreen-enabled devices have the knowledge that only a gateway with the correct serial number and activation key can be activated for use with an iConnect server. Stolen devices, devices attempting to masquerade as gateway-enabled devices, and malicious outsiders (or insiders as knowledgeable but nefarious customers) cannot effect other customers' gateway-enabled devices.

As standards evolve, and new encryption and authentication methods are proven to be useful, and older mechanisms proven to be breakable, the security manager can be upgraded "over the air" to provide new and better security for communications between the iConnect server and the gateway application, and locally at the premises to remove any risk of eavesdropping on camera communications.

A Remote Firmware Download module 306 of the touchscreen allows for seamless and secure updates to the gateway firmware through the iControl Maintenance Application on the server 104, providing a transparent, hassle-free mechanism for the service provider to deploy new features and bug fixes to the installed user base. The firmware download mechanism is tolerant of connection loss, power interruption and user interventions (both intentional and unintentional). Such robustness reduces down time and customer support issues. Touchscreen firmware can be remotely download either for one touchscreen at a time, a group of touchscreen, or in batches.

The Automations engine 308 of the touchscreen manages the user-defined rules of interaction between the different devices (e.g. when door opens turn on the light). Though the automation rules are programmed and reside at the portal/server level, they are cached at the gateway level in order to provide short latency between device triggers and actions.

DeviceConnect 310 of the touchscreen includes definitions of all supported devices (e.g., cameras, security panels, sensors, etc.) using a standardized plug-in architecture. The DeviceConnect module 310 offers an interface that can be used to quickly add support for any new device as well as enabling interoperability between devices that use different technologies/protocols. For common device types, pre-defined sub-modules have been defined, making supporting new devices of these types even easier. SensorConnect 312 is provided for adding new sensors, CameraConnect 316 for adding IP cameras, and PanelConnect 314 for adding home security panels.

The Schedules engine 318 of the touchscreen is responsible for executing the user defined schedules (e.g., take a picture every five minutes; every day at 8 am set temperature to 65 degrees Fahrenheit, etc.). Though the schedules are programmed and reside at the iConnect server level they are sent to the scheduler within the gateway application of the touchscreen. The Schedules Engine 318 then interfaces with SensorConnect 312 to ensure that scheduled events occur at precisely the desired time.

The Device Management module 320 of the touchscreen is in charge of all discovery, installation and configuration of both wired and wireless IP devices (e.g., cameras, etc.) coupled or connected to the system. Networked IP devices, such as those used in the integrated security system, require user configuration of many IP and security parameters, and the device management module of an embodiment handles the details of this configuration. The device management module also manages the video routing module described below.

The video routing engine 322 of the touchscreen is responsible for delivering seamless video streams to the user with zero-configuration. Through a multi-step, staged approach the video routing engine uses a combination of UPnP port-forwarding, relay server routing and STUN/TURN peer-to-peer routing. The video routing engine is described in detail in the Related Applications.

Figure 9:
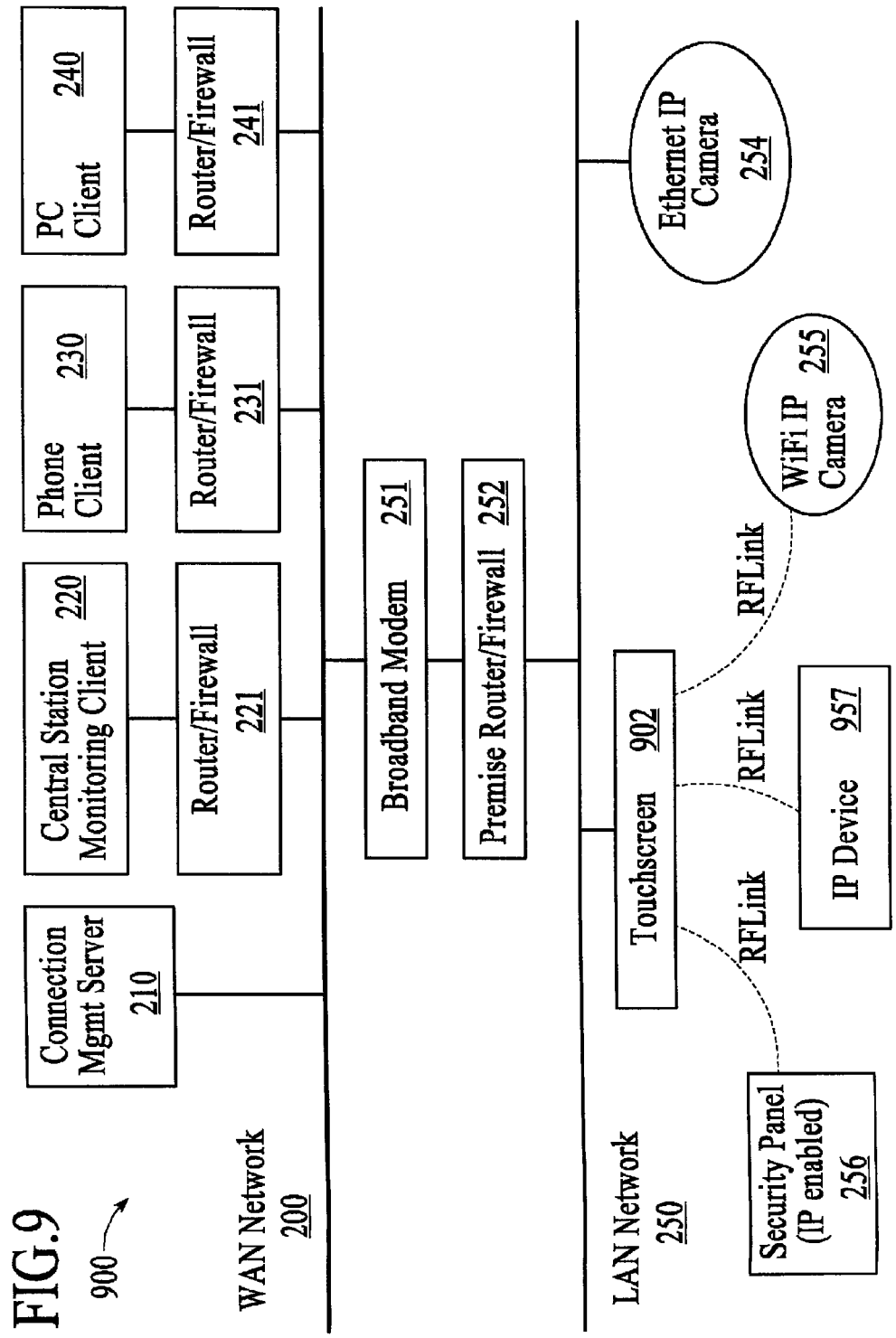
FIG. 9 is a block diagram of network or premise device integration with a premise network, under an embodiment.

FIG. 9 is a block diagram 900 of network or premise device integration with a premise network 250, under an embodiment. In an embodiment, network devices 255, 256, 957 are coupled to the touchscreen 902 using a secure network connection such as SSL over an encrypted 802.11 link (utilizing for example WPA-2 security for the wireless encryption), and the touchscreen 902 coupled to the premise router/firewall 252 via a coupling with a premise LAN 250. The premise router/firewall 252 is coupled to a broadband modem 251, and the broadband modem 251 is coupled to a WAN 200 or other network outside the premise. The touchscreen 902 thus enables or forms a separate wireless network, or sub-network, that includes some number of devices and is coupled or connected to the LAN 250 of the host premises. The touchscreen sub-network can include, but is not limited to, any number of other devices like WiFi IP cameras, security panels (e.g., IP-enabled), and IP devices, to name a few. The touchscreen 902 manages or controls the sub-network separately from the LAN 250 and transfers data and information between components of the sub-network and the LAN 250/WAN 200, but is not so limited. Additionally, other network devices 254 can be coupled to the LAN 250 without being coupled to the touchscreen 902.

Figure 10:
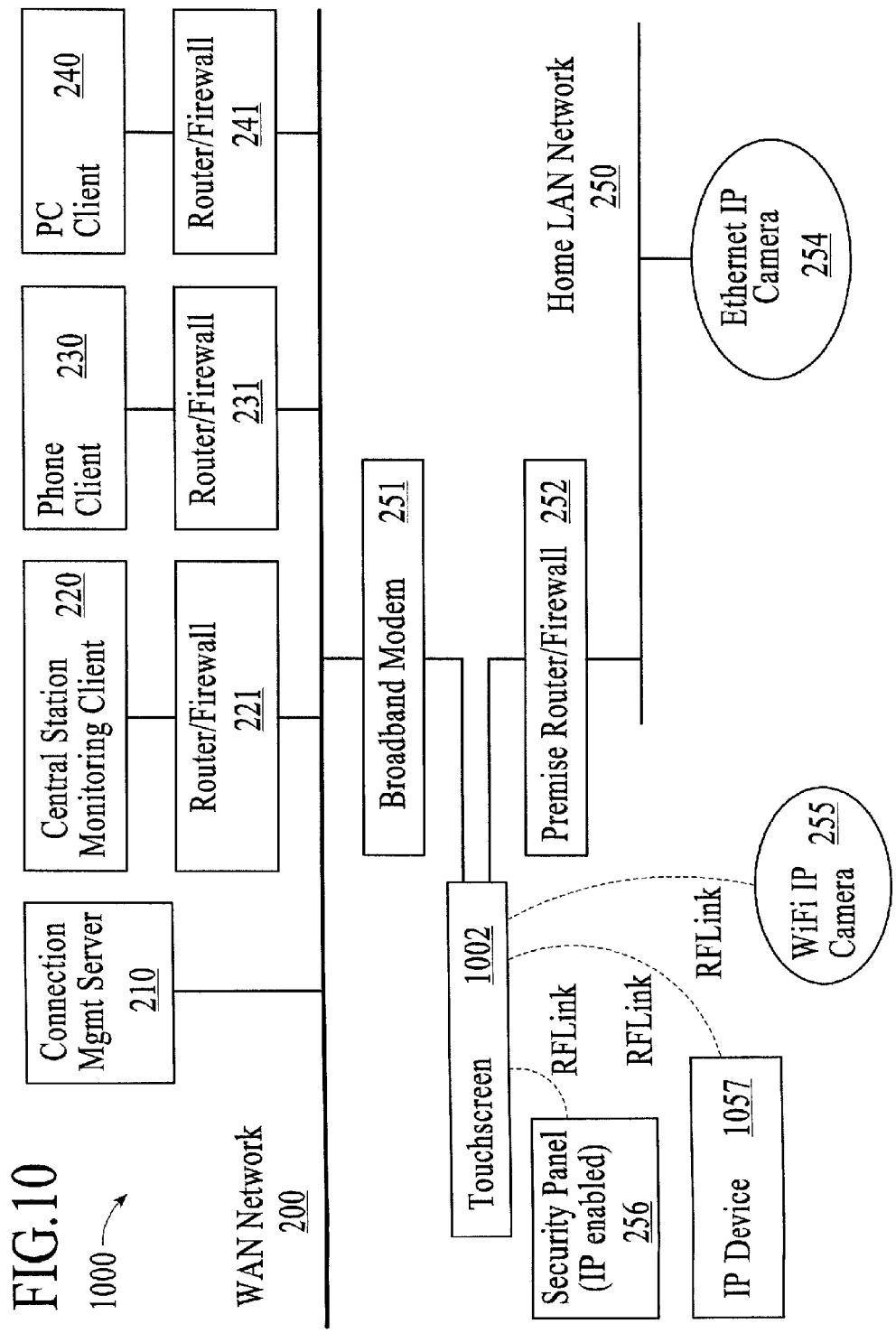
FIG. 10 is a block diagram of network or premise device integration with a premise network, under an alternative embodiment.

FIG. 10 is a block diagram 1000 of network or premise device integration with a premise network 250, under an alternative embodiment. The network or premise devices 255, 256, 1057 are coupled to the touchscreen 1002, and the touchscreen 1002 is coupled or connected between the premise router/firewall 252 and the broadband modem 251. The broadband modem 251 is coupled to a WAN 200 or other network outside the premise, while the premise router/firewall 252 is coupled to a premise LAN 250. As a result of its location between the broadband modem 251 and the premise router/firewall 252, the touchscreen 1002 can be configured or function as the premise router routing specified data between the outside network (e.g., WAN 200) and the premise router/firewall 252 of the LAN 250. As described above, the touchscreen 1002 in this configuration enables or forms a separate wireless network, or sub-network, that includes the network or premise devices 255, 156, 1057 and is coupled or connected between the LAN 250 of the host premises and the WAN 200. The touchscreen sub-network can include, but is not limited to, any number of network or premise devices 255, 256, 1057 like WiFi IP cameras, security panels (e.g., IP-enabled), and security touchscreens, to name a few. The touchscreen 1002 manages or controls the sub-network separately from the LAN 250 and transfers data and information between components of the sub-network and the LAN 250/WAN 200, but is not so limited. Additionally, other network devices 254 can be coupled to the LAN 250 without being coupled to the touchscreen 1002.

The gateway of an embodiment, whether a stand-along component or integrated with a touchscreen, enables couplings or connections and thus the flow or integration of information between various components of the host premises and various types and/or combinations of IP devices, where the components of the host premises include a network (e.g., LAN) and/or a security system or subsystem to name a few. Consequently, the gateway controls the association between and the flow of information or data between the components of the host premises. For example, the gateway of an embodiment forms a sub-network coupled to another network (e.g., WAN, LAN, etc.), with the sub-network including IP devices. The gateway further enables the association of the IP devices of the sub-network with appropriate systems on the premises (e.g., security system, etc.). Therefore, for example, the gateway can form a sub-network of IP devices configured for security functions, and associate the sub-network only with the premises security system, thereby segregating the IP devices dedicated to security from other IP devices that may be coupled to another network on the premises.

The gateway of an embodiment, as described herein, enables couplings or connections and thus the flow of information between various components of the host premises and various types and/or combinations of IP devices, where the components of the host premises include a network, a security system or subsystem to name a few. Consequently, the gateway controls the association between and the flow of information or data between the components of the host premises. For example, the gateway of an embodiment forms a sub-network coupled to another network (e.g., WAN, LAN, etc.), with the sub-network including IP devices. The gateway further enables the association of the IP devices of the sub-network with appropriate systems on the premises (e.g., security system, etc.). Therefore, for example, the gateway can form a sub-network of IP devices configured for security functions, and associate the sub-network only with the premises security system, thereby segregating the IP devices dedicated to security from other IP devices that may be coupled to another network on the premises.

Figure 11:
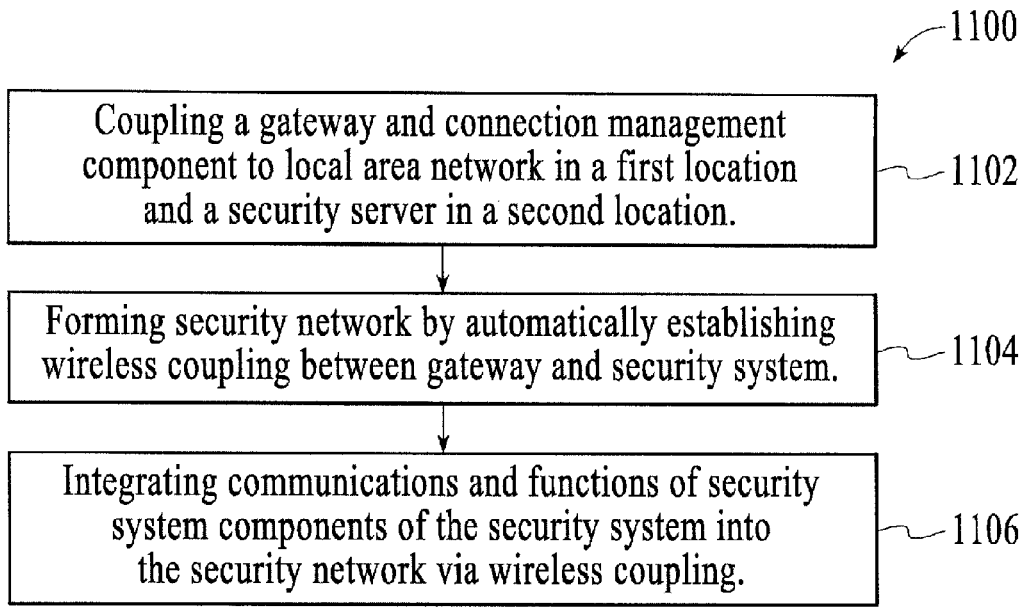
FIG. 11 is a flow diagram for a method of forming a security network including integrated security system components, under an embodiment.

FIG. 11 is a flow diagram for a method 1100 of forming a security network including integrated security system components, under an embodiment. Generally, the method comprises coupling 1102 a gateway comprising a connection management component to a local area network in a first location and a security server in a second location. The method comprises forming 1104 a security network by automatically establishing a wireless coupling between the gateway and a security system using the connection management component. The security system of an embodiment comprises security system components located at the first location. The method comprises integrating 1106 communications and functions of the security system components into the security network via the wireless coupling.

Figure 12:
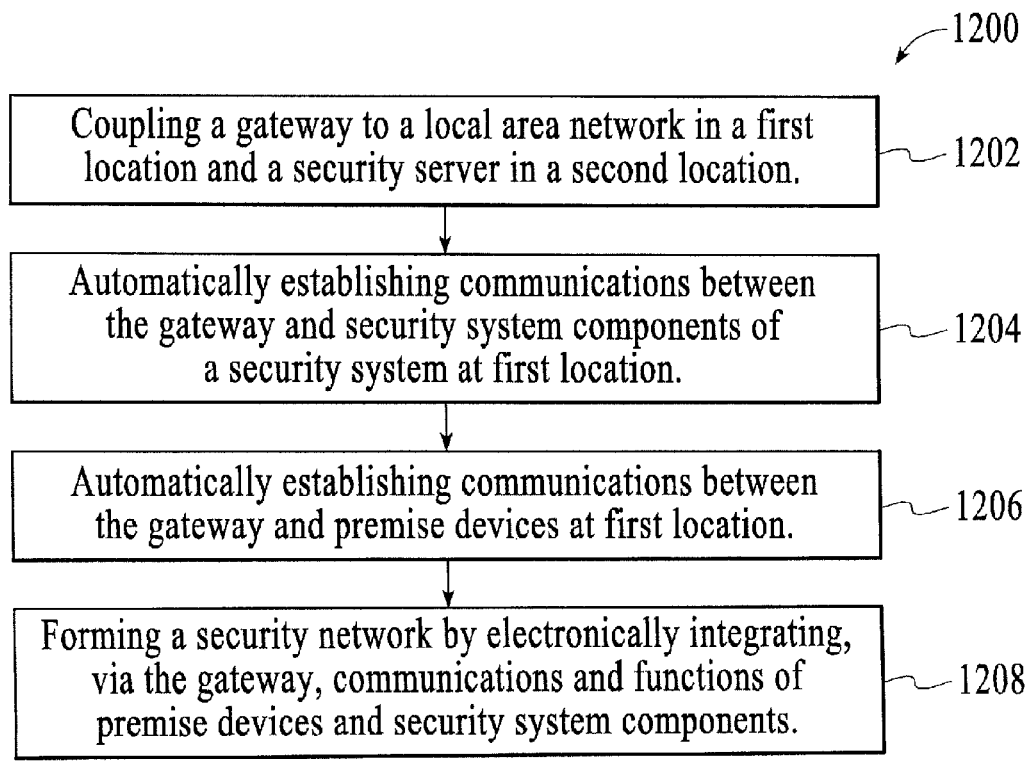
FIG. 12 is a flow diagram for a method of forming a security network including integrated security system components and network devices, under an embodiment.

FIG. 12 is a flow diagram for a method 1200 of forming a security network including integrated security system components and network devices, under an embodiment. Generally, the method comprises coupling 1202 a gateway to a local area network located in a first location and a security server in a second location. The method comprises automatically establishing 1204 communications between the gateway and security system components at the first location, the security system including the security system components. The method comprises automatically establishing 1206 communications between the gateway and premise devices at the first location. The method comprises forming 1208 a security network by electronically integrating, via the gateway, communications and functions of the premise devices and the security system components.

Figure 13:
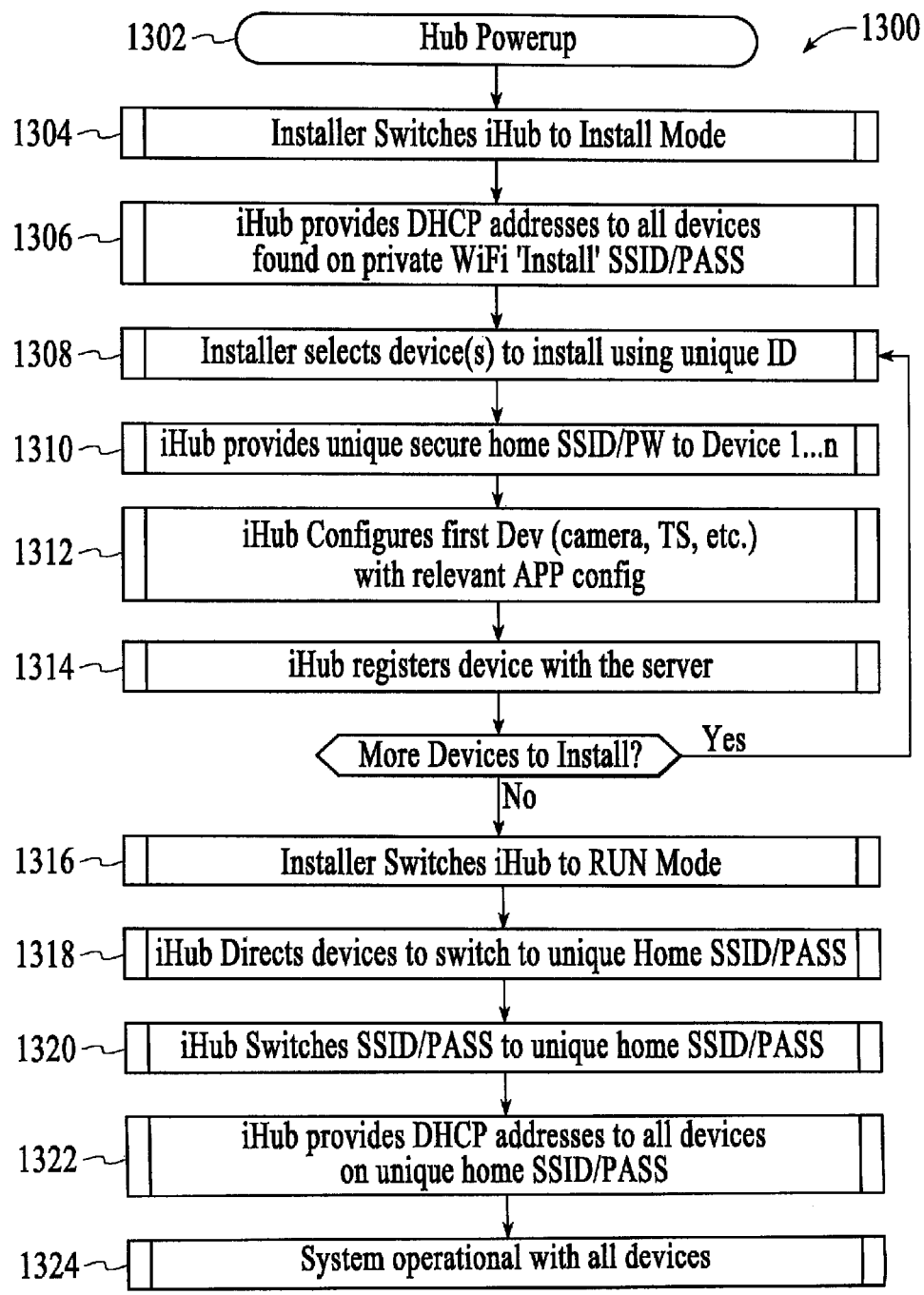
FIG. 13 is a flow diagram for installation of an IP device into a private network environment, under an embodiment.

In an example embodiment, FIG. 13 is a flow diagram 1300 for integration or installation of an IP device into a private network environment, under an embodiment. The IP device includes any IP-capable device that, for example, includes the touchscreen of an embodiment. The variables of an embodiment set at time of installation include, but are not limited to, one or more of a private SSID/Password, a gateway identifier, a security panel identifier, a user account TS, and a Central Monitoring Station account identification.

An embodiment of the IP device discovery and management begins with a user or installer activating 1302 the gateway and initiating 1304 the install mode of the system. This places the gateway in an install mode. Once in install mode, the gateway shifts to a default (Install) Wifi configuration. This setting will match the default setting for other integrated security system-enabled devices that have been pre-configured to work with the integrated security system. The gateway will then begin to provide 1306 DHCP addresses for these IP devices. Once the devices have acquired a new DHCP address from the gateway, those devices are available for configuration into a new secured Wifi network setting.

The user or installer of the system selects 1308 all devices that have been identified as available for inclusion into the integrated security system. The user may select these devices by their unique IDs via a web page, Touchscreen, or other client interface. The gateway provides 1310 data as appropriate to the devices. Once selected, the devices are configured 1312 with appropriate secured Wifi settings, including SSID and WPA/WPA-2 keys that are used once the gateway switches back to the secured sandbox configuration from the "Install" settings. Other settings are also configured as appropriate for that type of device. Once all devices have been configured, the user is notified and the user can exit install mode. At this point all devices will have been registered 1314 with the integrated security system servers.

The installer switches 1316 the gateway to an operational mode, and the gateway instructs or directs 1318 all newly configured devices to switch to the "secured" Wifi sandbox settings. The gateway then switches 1320 to the "secured" Wifi settings. Once the devices identify that the gateway is active on the "secured" network, they request new DHCP addresses from the gateway which, in response, provides 1322 the new addresses. The devices with the new addresses are then operational 1324 on the secured network.

In order to ensure the highest level of security on the secured network, the gateway can create or generate a dynamic network security configuration based on the unique ID and private key in the gateway, coupled with a randomizing factor that can be based on online time or other inputs. This guarantees the uniqueness of the gateway secured network configuration.

To enable the highest level of performance, the gateway analyzes the RF spectrum of the 802.11x network and determines which frequency band/channel it should select to run.

An alternative embodiment of the camera/IP device management process leverages the local ethernet connection of the sandbox network on the gateway. This alternative process is similar to the Wifi discovery embodiment described above, except the user connects the targeted device to the ethernet port of the sandbox network to begin the process. This alternative embodiment accommodates devices that have not been pre-configured with the default "Install" configuration for the integrated security system.

This alternative embodiment of the IP device discovery and management begins with the user/installer placing the system into install mode. The user is instructed to attach an IP device to be installed to the sandbox Ethernet port of the gateway. The IP device requests a DHCP address from the gateway which, in response to the request, provides the address. The user is presented the device and is asked if he/she wants to install the device. If yes, the system configures the device with the secured Wifi settings and other device-specific settings (e.g., camera settings for video length, image quality etc.). The user is next instructed to disconnect the device from the ethernet port. The device is now available for use on the secured sandbox network.

Figure 14:
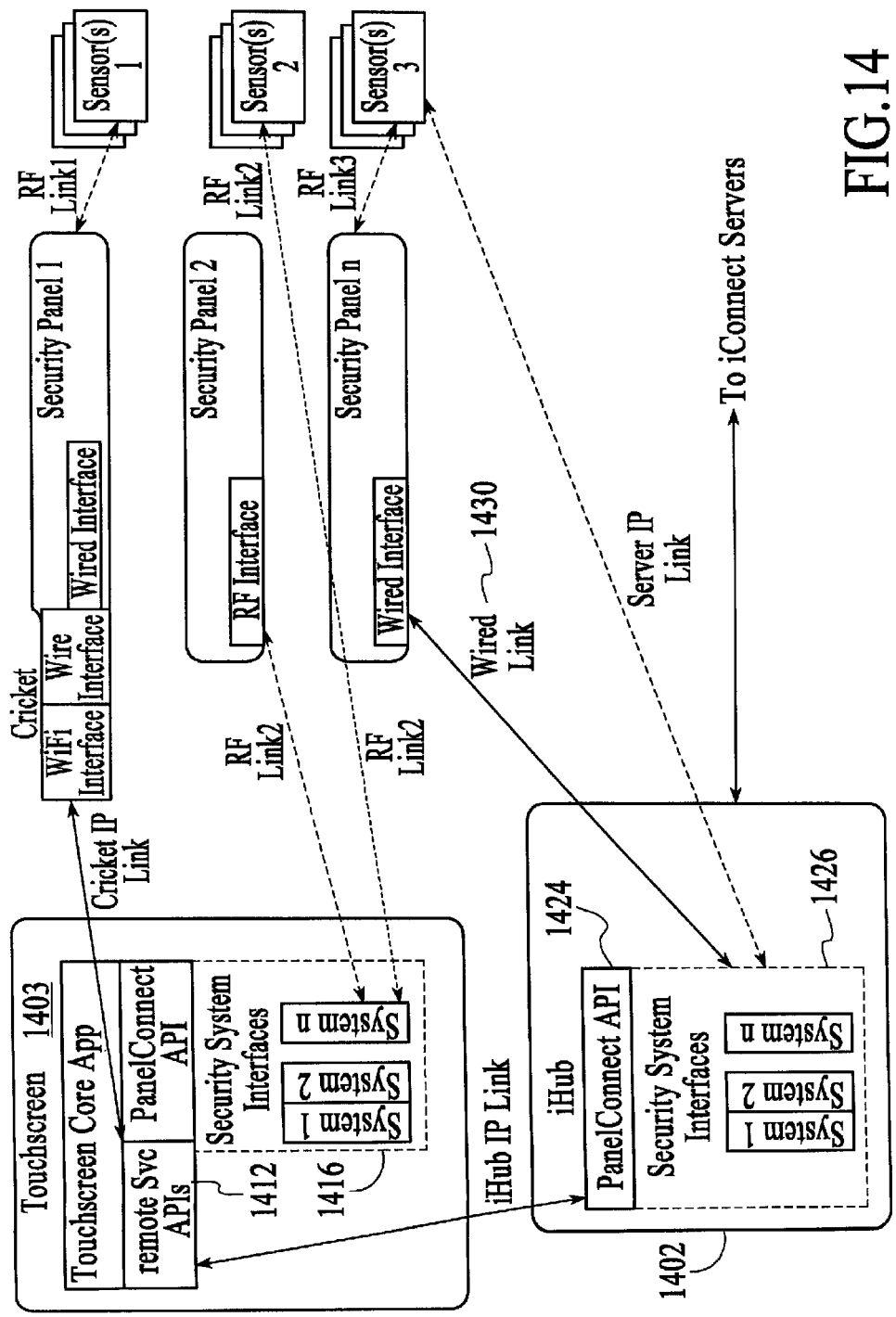
FIG. 14 is a block diagram showing communications among IP devices of the private network environment, under an embodiment.

FIG. 14 is a block diagram showing communications among integrated IP devices of the private network environment, under an embodiment. The IP devices of this example include a security touchscreen 1403, gateway 1402 (e.g., "iHub"), and security panel (e.g., "Security Panel 1", "Security Panel 2", "Security Panel n"), but the embodiment is not so limited. In alternative embodiments any number and/or combination of these three primary component types may be combined with other components including IP devices and/or security system components. For example, a single device that comprises an integrated gateway, touchscreen, and security panel is merely another embodiment of the integrated security system described herein. The description that follows includes an example configuration that includes a touchscreen hosting particular applications. However, the embodiment is not limited to the touchscreen hosting these applications, and the touchscreen should be thought of as representing any IP device.

Referring to FIG. 14, the touchscreen 1403 incorporates an application 1410 that is implemented as computer code resident on the touchscreen operating system, or as a web-based application running in a browser, or as another type of scripted application (e.g., Flash, Java, Visual Basic, etc.). The touchscreen core application 1410 represents this application, providing user interface and logic for the end user to manage their security system or to gain access to networked information or content (Widgets). The touchscreen core application 1410 in turn accesses a library or libraries of functions to control the local hardware (e.g. screen display, sound, LEDs, memory, etc.) as well as specialized librarie(s) to couple or connect to the security system.

In an embodiment of this security system connection, the touchscreen 1403 communicates to the gateway 1402, and has no direct communication with the security panel. In this embodiment, the touchscreen core application 1410 accesses the remote service APIs 1412 which provide security system functionality (e.g. ARM/DISARM panel, sensor state, get/set panel configuration parameters, initiate or get alarm events, etc.). In an embodiment, the remote service APIs 1412 implement one or more of the following functions, but the embodiment is not so limited: Armstate=setARMState (type="ARM STAY|ARM AWAY|DISARM", Parameters= "ExitDelay=30|Lights=OFF"); sensorState=getSensors (type="ALL|SensorName|SensorNameList"); result= setSensorState(SensorName, parameters="Option1, Options2, . . . Option n"); interruptHandler=SensorEvent( ); and, interruptHandler=alarmEvent( ).

Functions of the remote service APIs 1412 of an embodiment use a remote PanelConnect API 1424 which resides in memory on the gateway 1402. The touchscreen 1403 communicates with the gateway 1402 through a suitable network interface such as an Ethernet or 802.11 RF connection, for example. The remote PanelConnect API 1424 provides the underlying Security System Interfaces 1426 used to communicate with and control one or more types of security panel via wired link 1430 and/or RF link 3. The PanelConnect API 1224 provides responses and input to the remote services APIs 1426, and in turn translates function calls and data to and from the specific protocols and functions supported by a specific implementation of a Security Panel (e.g. a GE Security Simon XT or Honeywell Vista 20P). In an embodiment, the PanelConnect API 1224 uses a 345 MHz RF transceiver or receiver hardware/firmware module to communicate wirelessly to the security panel and directly to a set of 345 MHz RF-enabled sensors and devices, but the embodiment is not so limited.

The gateway of an alternative embodiment communicates over a wired physical coupling or connection to the security panel using the panel's specific wired hardware (bus) interface and the panel's bus-level protocol.

In an alternative embodiment, the Touchscreen 1403 implements the same PanelConnect API 1414 locally on the Touchscreen 1403, communicating directly with the Security Panel 2 and/or Sensors 2 over the proprietary RF link or over a wired link for that system. In this embodiment the Touchscreen 1403, instead of the gateway 1402, incorporates the 345 MHz RF transceiver to communicate directly with Security Panel 2 or Sensors 2 over the RF link 2. In the case of a wired link the Touchscreen 1403 incorporates the real-time hardware (e.g. a PIC chip and RS232-variant serial link) to physically connect to and satisfy the specific bus-level timing requirements of the SecurityPanel2.

In yet another alternative embodiment, either the gateway 1402 or the Touchscreen 1403 implements the remote service APIs. This embodiment includes a Cricket device ("Cricket") which comprises but is not limited to the following components: a processor (suitable for handling 802.11 protocols and processing, as well as the bus timing requirements of SecurityPanel1); an 802.11 (WiFi) client IP interface chip; and, a serial bus interface chip that implements variants of RS232 or RS485, depending on the specific Security Panel.

The Cricket also implements the full PanelConnect APIs such that it can perform the same functions as the case where the gateway implements the PanelConnect APIs. In this embodiment, the touchscreen core application 1410 calls functions in the remote service APIs 1412 (such as setArmState( )). These functions in turn couple or connect to the remote Cricket through a standard IP connection ("Cricket IP Link") (e.g., Ethernet, Homeplug, the gateway's proprietary Wifi network, etc.). The Cricket in turn implements the PanelConnect API, which responds to the request from the touchscreen core application, and performs the appropriate function using the proprietary panel interface. This interface uses either the wireless or wired proprietary protocol for the specific security panel and/or sensors.

Figure 15:
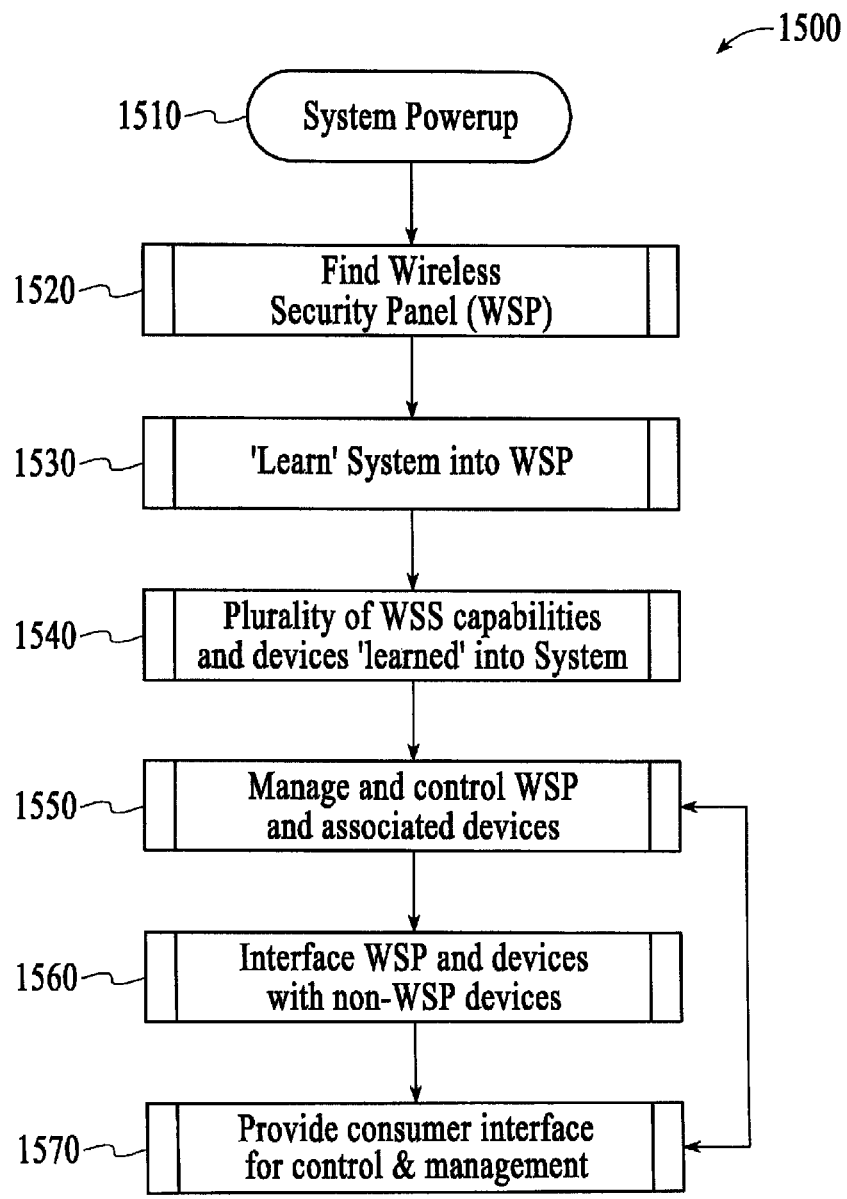
FIG. 15 is a flow diagram of a method of integrating an external control and management application system with an existing security system, under an embodiment.

FIG. 15 is a flow diagram of a method of integrating an external control and management application system with an existing security system, under an embodiment. Operations begin when the system is powered on 1510, involving at a minimum the power-on of the gateway device, and optionally the power-on of the connection between the gateway device and the remote servers. The gateway device initiates 1520 a software and RF sequence to locate the extant security system. The gateway and installer initiate and complete 1530 a sequence to 'learn' the gateway into the security system as a valid and authorized control device. The gateway initiates 1540 another software and RF sequence of instructions to discover and learn the existence and capabilities of existing RF devices within the extant security system, and store this information in the system. These operations under the system of an embodiment are described in further detail below.

Unlike conventional systems that extend an existing security system, the system of an embodiment operates utilizing the proprietary wireless protocols of the security system manufacturer. In one illustrative embodiment, the gateway is an embedded computer with an IP LAN and WAN connection and a plurality of RF transceivers and software protocol modules capable of communicating with a plurality of security systems each with a potentially different RF and software protocol interface. After the gateway has completed the discovery and learning 1540 of sensors and has been integrated 1550 as a virtual control device in the extant security system, the system becomes operational. Thus, the security system and associated sensors are presented 1550 as accessible devices to a potential plurality of user interface subsystems.

The system of an embodiment integrates 1560 the functionality of the extant security system with other non-security devices including but not limited to IP cameras, touchscreens, lighting controls, door locking mechanisms, which may be controlled via RF, wired, or powerline-based networking mechanisms supported by the gateway or servers.

The system of an embodiment provides a user interface subsystem 1570 enabling a user to monitor, manage, and control the system and associated sensors and security systems. In an embodiment of the system, a user interface subsystem is an HTML/XML/Javascript/Java/AJAX/Flash presentation of a monitoring and control application, enabling users to view the state of all sensors and controllers in the extant security system from a web browser or equivalent operating on a computer, PDA, mobile phone, or other consumer device.

In another illustrative embodiment of the system described herein, a user interface subsystem is an HTML/XML/Javascript/Java/AJAX presentation of a monitoring and control application, enabling users to combine the monitoring and control of the extant security system and sensors with the monitoring and control of non-security devices including but not limited to IP cameras, touchscreens, lighting controls, door locking mechanisms.

In another illustrative embodiment of the system described herein, a user interface subsystem is a mobile phone application enabling users to monitor and control the extant security system as well as other non-security devices.

In another illustrative embodiment of the system described herein, a user interface subsystem is an application running on a keypad or touchscreen device enabling users to monitor and control the extant security system as well as other non-security devices.

In another illustrative embodiment of the system described herein, a user interface subsystem is an application operating on a TV or set-top box connected to a TV enabling users to monitor and control the extant security system as well as other non-security devices.

Figure 16:
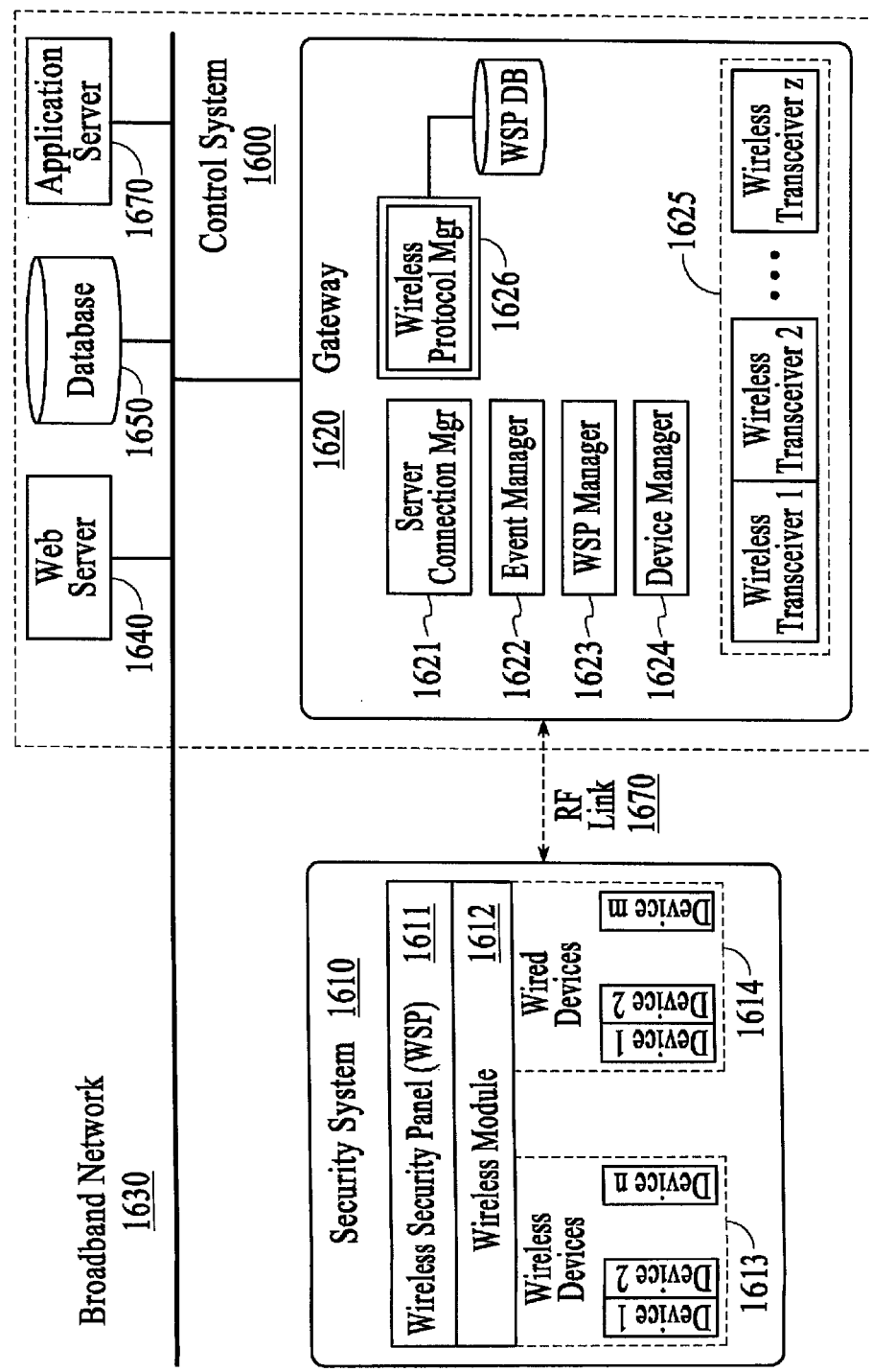
FIG. 16 is a block diagram of an integrated security system wirelessly interfacing to proprietary security systems, under an embodiment.

FIG. 16 is a block diagram of an integrated security system 1600 wirelessly interfacing to proprietary security systems, under an embodiment. A security system 1610 is coupled or connected to a Gateway 1620, and from Gateway 1620 coupled or connected to a plurality of information and content sources across a network 1630 including one or more web servers 1640, system databases 1650, and applications servers 1660. While in one embodiment network 1630 is the Internet, including the World Wide Web, those of skill in the art will appreciate that network 1630 may be any type of network, such as an intranet, an extranet, a virtual private network (VPN), a mobile network, or a non-TCP/IP based network.

Moreover, other elements of the system of an embodiment may be conventional, well-known elements that need not be explained in detail herein. For example, security system 1610 could be any type home or business security system, such devices including but not limited to a standalone RF home security system or a non-RF-capable wired home security system with an add-on RF interface module. In the integrated security system 1600 of this example, security system 1610 includes an RF-capable wireless security panel (WSP) 1611 that acts as the master controller for security system 1610. Well-known examples of such a WSP include the GE Security Concord, Networx, and Simon panels, the Honeywell Vista and Lynx panels, and similar panels from DSC and Napco, to name a few. A wireless module 1614 includes the RF hardware and protocol software necessary to enable communication with and control of a plurality of wireless devices 1613. WSP 1611 may also manage wired devices 1614 physically connected to WSP 1611 with an RS232 or RS485 or Ethernet connection or similar such wired interface.

In an implementation consistent with the systems and methods described herein, Gateway 1620 provides the interface between security system 1610 and LAN and/or WAN for purposes of remote control, monitoring, and management. Gateway 1620 communicates with an external web server 1640, database 1650, and application server 1660 over network 1630 (which may comprise WAN, LAN, or a combination thereof). In this example system, application logic, remote user interface functionality, as well as user state and account are managed by the combination of these remote servers. Gateway 1620 includes server connection manager 1621, a software interface module responsible for all server communication over network 1630. Event manager 1622 implements the main event loop for Gateway 1620, processing events received from device manager 1624 (communicating with non-security system devices including but not limited to IP cameras, wireless thermostats, or remote door locks). Event manager 1622 further processes events and control messages from and to security system 1610 by utilizing WSP manager 1623.

WSP manager 1623 and device manager 1624 both rely upon wireless protocol manager 1626 which receives and stores the proprietary or standards-based protocols required to support security system 1610 as well as any other devices interfacing with gateway 1620. WSP manager 1623 further utilizes the comprehensive protocols and interface algorithms for a plurality of security systems 1610 stored in the WSP DB client database associated with wireless protocol manager 1626. These various components implement the software logic and protocols necessary to communicate with and manager devices and security systems 1610. Wireless Transceiver hardware modules 1625 are then used to implement the physical RF communications link to such devices and security systems 1610. An illustrative wireless transceiver 1625 is the GE Security Dialog circuit board, implementing a 319.5 MHz two-way RF transceiver module. In this example, RF Link 1670 represents the 319.5 MHz RF communication link, enabling gateway 1620 to monitor and control WSP 1611 and associated wireless and wired devices 1613 and 1614, respectively.

In one embodiment, server connection manager 1621 requests and receives a set of wireless protocols for a specific security system 1610 (an illustrative example being that of the GE Security Concord panel and sensors) and stores them in the WSP DB portion of the wireless protocol manager 1626. WSP manager 1623 then utilizes such protocols from wireless protocol manager 1626 to initiate the sequence of processes detailed in FIG. 15 and FIG. 16 for learning gateway 1620 into security system 1610 as an authorized control device. Once learned in, as described with reference to FIG. 16 (and above), event manager 1622 processes all events and messages detected by the combination of WSP manager 1623 and the GE Security wireless transceiver module 1625.

In another embodiment, gateway 1620 incorporates a plurality of wireless transceivers 1625 and associated protocols managed by wireless protocol manager 1626. In this embodiment events and control of multiple heterogeneous devices may be coordinated with WSP 1611, wireless devices 1613, and wired devices 1614. For example a wireless sensor from one manufacturer may be utilized to control a device using a different protocol from a different manufacturer.

In another embodiment, gateway 1620 incorporates a wired interface to security system 1610, and incorporates a plurality of wireless transceivers 1625 and associated protocols managed by wireless protocol manager 1626. In this embodiment events and control of multiple heterogeneous devices may be coordinated with WSP 1611, wireless devices 1613, and wired devices 1614.

Of course, while an illustrative embodiment of an architecture of the system of an embodiment is described in detail herein with respect to FIG. 16, one of skill in the art will understand that modifications to this architecture may be made without departing from the scope of the description presented herein. For example, the functionality described herein may be allocated differently between client and server, or amongst different server or processor-based components. Likewise, the entire functionality of the gateway 1620 described herein could be integrated completely within an existing security system 1610. In such an embodiment, the architecture could be directly integrated with a security system 1610 in a manner consistent with the currently described embodiments.

Figure 17:
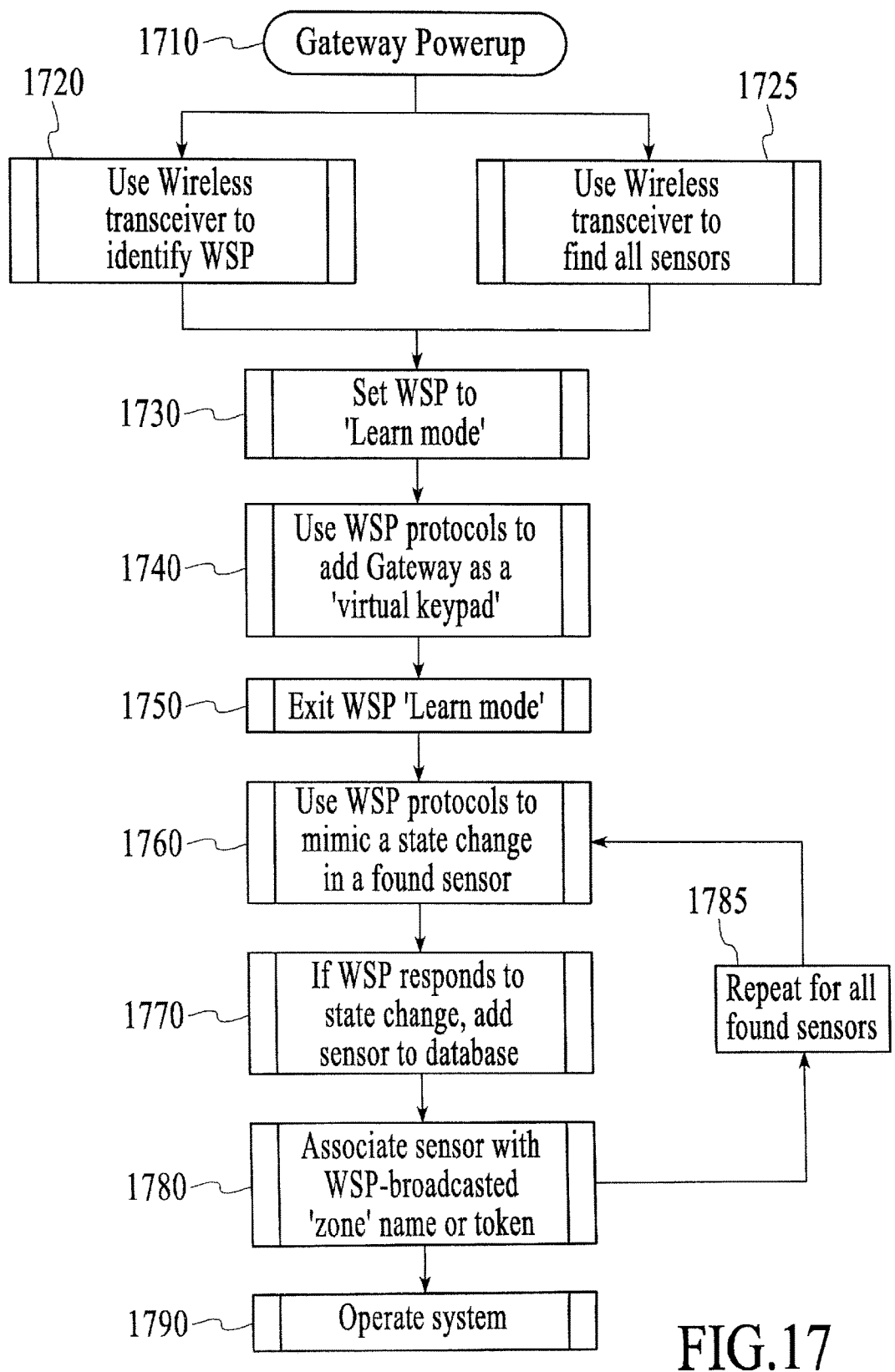
FIG. 17 is a flow diagram for wirelessly 'learning' the gateway into an existing security system and discovering extant sensors, under an embodiment.

FIG. 17 is a flow diagram for wirelessly 'learning' the Gateway into an existing security system and discovering extant sensors, under an embodiment. The learning interfaces gateway 1620 with security system 1610. Gateway 1620 powers up 1710 and initiates software sequences 1720 and 1725 to identify accessible WSPs 1611 and wireless devices 1613, respectively (e.g., one or more WSPs and/or devices within range of gateway 1620). Once identified, WSP 1611 is manually or automatically set into 'learn mode' 1730, and gateway 1620 utilizes available protocols to add 1740 itself as an authorized control device in security system 1610. Upon successful completion of this task, WSP 1611 is manually or automatically removed from 'learn mode' 1750.

Gateway 1620 utilizes the appropriate protocols to mimic 1760 the first identified device 1614. In this operation gateway 1620 identifies itself using the unique or pseudo-unique identifier of the first found device 1614, and sends an appropriate change of state message over RF Link 1670. In the event that WSP 1611 responds to this change of state message, the device 1614 is then added 1770 to the system in database 1650. Gateway 1620 associates 1780 any other information (such as zone name or token-based identifier) with this device 1614 in database 1650, enabling gateway 1620, user interface modules, or any application to retrieve this associated information.

In the event that WSP 1611 does not respond to the change of state message, the device 1614 is not added 1770 to the system in database 1650, and this device 1614 is identified as not being a part of security system 1610 with a flag, and is either ignored or added as an independent device, at the discretion of the system provisioning rules. Operations hereunder repeat 1785 operations 1760, 1770, 1780 for all devices 1614 if applicable. Once all devices 1614 have been tested in this way, the system begins operation 1790.

In another embodiment, gateway 1620 utilizes a wired connection to WSP 1611, but also incorporates a wireless transceiver 1625 to communicate directly with devices 1614. In this embodiment, operations under 1720 above are removed, and operations under 1740 above are modified so the system of this embodiment utilizes wireline protocols to add itself as an authorized control device in security system 1610.

A description of an example embodiment follows in which the Gateway (FIG. 16, element 1620) is the iHub available from iControl Networks, Palo Alto, Calif., and described in detail herein. In this example the gateway is "automatically" installed with a security system.

The automatic security system installation begins with the assignment of an authorization key to components of the security system (e.g., gateway, kit including the gateway, etc.). The assignment of an authorization key is done in lieu of creating a user account. An installer later places the gateway in a user's premises along with the premises security system. The installer uses a computer to navigate to a web portal (e.g., integrated security system web interface), logs in to the portal, and enters the authorization key of the installed gateway into the web portal for authentication. Once authenticated, the gateway automatically discovers devices at the premises (e.g., sensors, cameras, light controls, etc.) and adds the discovered devices to the system or "network". The installer assigns names to the devices, and tests operation of the devices back to the server (e.g., did the door open, did the camera take a picture, etc.). The security device information is optionally pushed or otherwise propagated to a security panel and/or to the server network database. The installer finishes the installation, and instructs the end user on how to create an account, username, and password. At this time the user enters the authorization key which validates the account creation (uses a valid authorization key to associate the network with the user's account). New devices may subsequently be added to the security network in a variety of ways (e.g., user first enters a unique ID for each device/sensor and names it in the server, after which the gateway can automatically discover and configure the device).

A description of another example embodiment follows in which the security system (FIG. 16, element 1610) is a Dialog system and the WSP (FIG. 16, element 1611) is a SimonXT available from General Electric Security, and the Gateway (FIG. 16, element 1620) is the iHub available from iControl Networks, Palo Alto, Calif., and described in detail herein. Descriptions of the install process for the SimonXT and iHub are also provided below.

GE Security's Dialog network is one of the most widely deployed and tested wireless security systems in the world. The physical RF network is based on a 319.5 MHz unlicensed spectrum, with a bandwidth supporting up to 19 Kbps communications. Typical use of this bandwidth—even in conjunction with the integrated security system—is far less than that. Devices on this network can support either one-way communication (either a transmitter or a receiver) or two-way communication (a transceiver). Certain GE Simon, Simon XT, and Concord security control panels incorporate a two-way transceiver as a standard component. The gateway also incorporates the same two-way transceiver card. The physical link layer of the network is managed by the transceiver module hardware and firmware, while the coded payload bitstreams are made available to the application layer for processing.

Sensors in the Dialog network typically use a 60-bit protocol for communicating with the security panel transceiver, while security system keypads and the gateway use the encrypted 80-bit protocol. The Dialog network is configured for reliability, as well as low-power usage. Many devices are supervised, i.e. they are regularly monitored by the system 'master' (typically a GE security panel), while still maintaining excellent power usage characteristics. A typical door window sensor has a battery life in excess of 5-7 years.

The gateway has two modes of operation in the Dialog network: a first mode of operation is when the gateway is configured or operates as a 'slave' to the GE security panel; a second mode of operation is when the gateway is configured or operates as a 'master' to the system in the event a security panel is not present. In both configurations, the gateway has the ability to 'listen' to network traffic, enabling the gateway to continually keep track of the status of all devices in the system. Similarly, in both situations the gateway can address and control devices that support setting adjustments (such as the GE wireless thermostat).

In the configuration in which the gateway acts as a 'slave' to the security panel, the gateway is 'learned into' the system as a GE wireless keypad. In this mode of operation, the gateway emulates a security system keypad when managing the security panel, and can query the security panel for status and 'listen' to security panel events (such as alarm events).

The gateway incorporates an RF Transceiver manufactured by GE Security, but is not so limited. This transceiver implements the Dialog protocols and handles all network message transmissions, receptions, and timing. As such, the physical, link, and protocol layers of the communications between the gateway and any GE device in the Dialog network are totally compliant with GE Security specifications.

At the application level, the gateway emulates the behavior of a GE wireless keypad utilizing the GE Security 80-bit encrypted protocol, and only supported protocols and network traffic are generated by the gateway. Extensions to the Dialog RF protocol of an embodiment enable full control and configuration of the panel, and iControl can both automate installation and sensor enrollment as well as direct configuration downloads for the panel under these protocol extensions.

As described above, the gateway participates in the GE Security network at the customer premises. Because the gateway has intelligence and a two-way transceiver, it can 'hear' all of the traffic on that network. The gateway makes use of the periodic sensor updates, state changes, and supervisory signals of the network to maintain a current state of the premises. This data is relayed to the integrated security system server (e.g., FIG. 2, element 260) and stored in the event repository for use by other server components. This usage of the GE Security RF network is completely non-invasive; there is no new data traffic created to support this activity.

The gateway can directly (or indirectly through the Simon XT panel) control two-way devices on the network. For example, the gateway can direct a GE Security Thermostat to change its setting to 'Cool' from 'Off', as well as request an update on the current temperature of the room. The gateway performs these functions using the existing GE Dialog protocols, with little to no impact on the network; a gateway device control or data request takes only a few dozen bytes of data in a network that can support 19 Kbps.

By enrolling with the Simon XT as a wireless keypad, as described herein, the gateway includes data or information of all alarm events, as well as state changes relevant to the security panel. This information is transferred to the gateway as encrypted packets in the same way that the information is transferred to all other wireless keypads on the network.

Because of its status as an authorized keypad, the gateway can also initiate the same panel commands that a keypad can initiate. For example, the gateway can arm or disarm the panel using the standard Dialog protocol for this activity. Other than the monitoring of standard alarm events like other network keypads, the only incremental data traffic on the network as a result of the gateway is the infrequent remote arm/disarm events that the gateway initiates, or infrequent queries on the state of the panel.

The gateway is enrolled into the Simon XT panel as a 'slave' device which, in an embodiment, is a wireless keypad. This enables the gateway for all necessary functionality for operating the Simon XT system remotely, as well as combining the actions and information of non-security devices such as lighting or door locks with GE Security devices. The only resource taken up by the gateway in this scenario is one wireless zone (sensor ID).

The gateway of an embodiment supports three forms of sensor and panel enrollment/installation into the integrated security system, but is not limited to this number of enrollment/installation options. The enrollment/installation options of an embodiment include installer installation, kitting, and panel, each of which is described below.

Under the installer option, the installer enters the sensor IDs at time of installation into the integrated security system web portal or iScreen. This technique is supported in all configurations and installations.

Kits can be pre-provisioned using integrated security system provisioning applications when using the kitting option. At kitting time, multiple sensors are automatically associated with an account, and at install time there is no additional work required.

In the case where a panel is installed with sensors already enrolled (i.e. using the GE Simon XT enrollment process), the gateway has the capability to automatically extract the sensor information from the system and incorporate it into the user account on the integrated security system server.

The gateway and integrated security system of an embodiment uses an auto-learn process for sensor and panel enrollment in an embodiment. The deployment approach of an embodiment can use additional interfaces that GE Security is adding to the Simon XT panel. With these interfaces, the gateway has the capability to remotely enroll sensors in the panel automatically. The interfaces include, but are not limited to, the following: EnrollDevice(ID, type, name, zone, group); SetDeviceParameters(ID, type, Name, zone, group), GetDeviceParameters(zone); and RemoveDevice (zone).

The integrated security system incorporates these new interfaces into the system, providing the following install process. The install process can include integrated security system logistics to handle kitting and pre-provisioning. Pre-kitting and logistics can include a pre-provisioning kitting tool provided by integrated security system that enables a security system vendor or provider ("provider") to offer pre-packaged initial 'kits'. This is not required but is recommended for simplifying the install process. This example assumes a 'Basic' kit is preassembled and includes one (1) Simon XT, three (3) Door/window sensors, one (1) motion sensor, one (1) gateway, one (1) keyfob, two (2) cameras, and ethernet cables. The kit also includes a sticker page with all Zones (1-24) and Names (full name list).

The provider uses the integrated security system kitting tool to assemble 'Basic' kit packages. The contents of different types of starter kits may be defined by the provider. At the distribution warehouse, a worker uses a bar code scanner to scan each sensor and the gateway as it is packed into the box. An ID label is created that is attached to the box. The scanning process automatically associates all the devices with one kit, and the new ID label is the unique identifier of the kit. These boxes are then sent to the provider for distribution to installer warehouses. Individual sensors, cameras, etc. are also sent to the provider installer warehouse. Each is labeled with its own barcode/ID.

An installation and enrollment procedure of a security system including a gateway is described below as one example of the installation process.

1. Order and Physical Install Process
    a. Once an order is generated in the iControl system, an account is created and an install ticket is created and sent electronically to the provider for assignment to an installer.
    b. The assigned installer picks up his/her ticket(s) and fills his/her truck with Basic and/or Advanced starter kits. He/she also keeps a stock of individual sensors, cameras, iHubs, Simon XTs, etc. Optionally, the installer can also stock homeplug adapters for problematic installations.
    c. The installer arrives at the address on the ticket, and pulls out the Basic kit. The installer determines sensor locations from a tour of the premises and discussion with the homeowner. At this point assume the homeowner requests additional equipment including an extra camera, two (2) additional door/window sensors, one (1) glass break detector, and one (1) smoke detector.
    d. Installer mounts SimonXT in the kitchen or other location in the home as directed by the homeowner, and routes the phone line to Simon XT if available. GPRS and Phone numbers pre-programmed in SimonXT to point to the provider Central Monitoring Station (CMS).
    e. Installer places gateway in the home in the vicinity of a router and cable modem. Installer installs an ethernet line from gateway to router and plugs gateway into an electrical outlet.
2. Associate and Enroll gateway into SimonXT
    a. Installer uses either his/her own laptop plugged into router, or homeowners computer to go to the integrated security system web interface and log in with installer ID/pass.
    b. Installer enters ticket number into admin interface, and clicks 'New Install' button. Screen prompts installer for kit ID (on box's barcode label).
    c. Installer clicks 'Add SimonXT'. Instructions prompt installer to put Simon XT into install mode, and add gateway as a wireless keypad. It is noted that this step is for security only and can be automated in an embodiment.
    d. Installer enters the installer code into the Simon XT. Installer Learns 'gateway' into the panel as a wireless keypad as a group 1 device.
    e. Installer goes back to Web portal, and clicks the 'Finished Adding SimonXT' button.
3. Enroll Sensors into SimonXT via iControl
    a. All devices in the Basic kit are already associated with the user's account.
    b. For additional devices, Installer clicks 'Add Device' and adds the additional camera to the user's account (by typing in the camera ID/Serial #).
    c. Installer clicks 'Add Device' and adds other sensors (two (2) door/window sensors, one (1) glass break sensor, and one (1) smoke sensor) to the account (e.g., by typing in IDs).
    d. As part of Add Device, Installer assigns zone, name, and group to the sensor. Installer puts appropriate Zone and Name sticker on the sensor temporarily.
    e. All sensor information for the account is pushed or otherwise propagated to the iConnect server, and is available to propagate to CMS automation software through the CMS application programming interface (API).
    f. Web interface displays 'Installing Sensors in System . . . ' and automatically adds all of the sensors to the Simon XT panel through the GE RF link.
    g. Web interface displays 'Done Installing'→all sensors show green.
4. Place and Tests Sensors in Home
    a. Installer physically mounts each sensor in its desired location, and removes the stickers.
    b. Installer physically mounts WiFi cameras in their location and plugs into AC power. Optional fishing of low voltage wire through wall to remove dangling wires. Camera transformer is still plugged into outlet but wire is now inside the wall.
    c. Installer goes to Web interface and is prompted for automatic camera install. Each camera is provisioned as a private, encrypted Wifi device on the gateway secured sandbox network, and firewall NAT traversal is initiated. Upon completion the customer is prompted to test the security system.
    d. Installer selects the 'Test System' button on the web portal—the SimonXT is put into Test mode by the gateway over GE RF.
    e. Installer manually tests the operation of each sensor, receiving an audible confirmation from SimonXT.
    f. gateway sends test data directly to CMS over broadband link, as well as storing the test data in the user's account for subsequent report generation.
    g. Installer exits test mode from the Web portal.
5. Installer instructs customer on use of the Simon XT, and shows customer how to log into the iControl web and mobile portals. Customer creates a username/password at this time.
6. Installer instructs customer how to change Simon XT user code from the Web interface. Customer changes user code which is pushed to SimonXT automatically over GE RF.

An installation and enrollment procedure of a security system including a gateway is described below as an alternative example of the installation process. This installation process is for use for enrolling sensors into the SimonXT and integrated security system and is compatible with all existing GE Simon panels.

The integrated security system supports all pre-kitting functionality described in the installation process above. However, for the purpose of the following example, no kitting is used.

1. Order and Physical Install Process
    a. Once an order is generated in the iControl system, an account is created and an install ticket is created and sent electronically to the security system provider for assignment to an installer.
   b. The assigned installer picks up his/her ticket(s) and fills his/her truck with individual sensors, cameras, iHubs, Simon XTs, etc. Optionally, the installer can also stock homeplug adapters for problematic installations.
   c. The installer arrives at the address on the ticket, and analyzes the house and talks with the homeowner to determine sensor locations. At this point assume the homeowner requests three (3) cameras, five (5) door/window sensors, one (1) glass break detector, one (1) smoke detector, and one (1) keyfob.
   d. Installer mounts SimonXT in the kitchen or other location in the home. The installer routes a phone line to Simon XT if available. GPRS and Phone numbers are pre-programmed in SimonXT to point to the provider CMS.
   e. Installer places gateway in home in the vicinity of a router and cable modem, and installs an ethernet line from gateway to the router, and plugs gateway into an electrical outlet.
2. Associate and Enroll gateway into SimonXT
   a. Installer uses either his/her own laptop plugged into router, or homeowners computer to go to the integrated security system web interface and log in with an installer ID/pass.
   b. Installer enters ticket number into admin interface, and clicks 'New Install' button. Screen prompts installer to add devices.
   c. Installer types in ID of gateway, and it is associated with the user's account.
   d. Installer clicks 'Add Device' and adds the cameras to the user's account (by typing in the camera ID/Serial #).
   e. Installer clicks 'Add SimonXT'. Instructions prompt installer to put Simon XT into install mode, and add gateway as a wireless keypad.
   f. Installer goes to Simon XT and enters the installer code into the Simon XT. Learns 'gateway' into the panel as a wireless keypad as group 1 type sensor.
   g. Installer returns to Web portal, and clicks the 'Finished Adding SimonXT' button.
   h. Gateway now is alerted to all subsequent installs over the security system RF.
3. Enroll Sensors into SimonXT via iControl
   a. Installer clicks 'Add Simon XT Sensors'—Displays instructions for adding sensors to Simon XT.
   b. Installer goes to Simon XT and uses Simon XT install process to add each sensor, assigning zone, name, group. These assignments are recorded for later use.
   c. The gateway automatically detects each sensor addition and adds the new sensor to the integrated security system.
   d. Installer exits install mode on the Simon XT, and returns to the Web portal.
   e. Installer clicks 'Done Adding Devices'.
   f. Installer enters zone/sensor naming from recorded notes into integrated security system to associate sensors to friendly names.
   g. All sensor information for the account is pushed to the iConnect server, and is available to propagate to CMS automation software through the CMS API.
4. Place and Tests Sensors in Home
   a. Installer physically mounts each sensor in its desired location.
   b. Installer physically mounts Wifi cameras in their location and plugs into AC power. Optional fishing of low voltage wire through wall to remove dangling wires. Camera transformer is still plugged into outlet but wire is now inside the wall.
   c. Installer puts SimonXT into Test mode from the keypad.
   d. Installer manually tests the operation of each sensor, receiving an audible confirmation from SimonXT.
   e. Installer exits test mode from the Simon XT keypad.
   f. Installer returns to web interface and is prompted to automatically set up cameras. After waiting for completion cameras are now provisioned and operational.
5. Installer instructs customer on use of the Simon XT, and shows customer how to log into the integrated security system web and mobile portals. Customer creates a username/password at this time.
6. Customer and Installer observe that all sensors/cameras are green.
7. Installer instructs customer how to change Simon XT user code from the keypad. Customer changes user code and stores in SimonXT.
8. The first time the customer uses the web portal to Arm/Disarm system the web interface prompts the customer for the user code, which is then stored securely on the server. In the event the user code is changed on the panel the web interface once again prompts the customer.

The panel of an embodiment can be programmed remotely. The CMS pushes new programming to SimonXT over a telephone or GPRS link. Optionally, iControl and GE provide a broadband link or coupling to the gateway and then a link from the gateway to the Simon XT over GE RF.

In addition to the configurations described above, the gateway of an embodiment supports takeover configurations in which it is introduced or added into a legacy security system. A description of example takeover configurations follow in which the security system (FIG. 2, element 210) is a Dialog system and the WSP (FIG. 2, element 211) is a GE Concord panel (e.g., equipped with POTS, GE RF, and Superbus 2000 RS485 interface (in the case of a Lynx takeover the Simon XT is used) available from General Electric Security. The gateway (FIG. 2, element 220) in the takeover configurations is an iHub (e.g., equipped with built-in 802.11b/g router, Ethernet Hub, GSM/GPRS card, RS485 interface, and iControl Honeywell-compatible RF card) available from iControl Networks, Palo Alto, Calif. While components of particular manufacturers are used in this example, the embodiments are not limited to these components or to components from these vendors.

The security system can optionally include RF wireless sensors (e.g., GE wireless sensors utilizing the GE Dialog RF technology), IP cameras, a GE-iControl Touchscreen (the touchscreen is assumed to be an optional component in the configurations described herein, and is thus treated separately from the iHub; in systems in which the touchscreen is a component of the base security package, the integrated iScreen (available from iControl Networks, Palo Alto, Calif.) can be used to combine iHub technology with the touchscreen in a single unit), and Z-Wave devices to name a few.

The takeover configurations described below assume takeover by a "new" system of an embodiment of a security system provided by another third party vendor, referred to herein as an "original" or "legacy" system. Generally, the takeover begins with removal of the control panel and keypad of the legacy system. A GE Concord panel is installed to replace the control panel of the legacy system along with an iHub with GPRS Modem. The legacy system sensors are then connected or wired to the Concord panel, and a GE keypad or touchscreen is installed to replace the control panel of the legacy system. The iHub includes the iControl RF card, which is compatible with the legacy system. The iHub finds and manages the wireless sensors of the legacy system, and learns the sensors into the Concord by emulating the corresponding GE sensors. The iHub effectively acts as a relay for legacy wireless sensors.

Once takeover is complete, the new security system provides a homogeneous system that removes the compromises inherent in taking over or replacing a legacy system. For example, the new system provides a modern touchscreen that may include additional functionality, new services, and supports integration of sensors from various manufacturers. Furthermore, lower support costs can be realized because call centers, installers, etc. are only required to support one architecture. Additionally, there is minimal install cost because only the panel is required to be replaced as a result of the configuration flexibility offered by the iHub.

The system takeover configurations described below include but are not limited to a dedicated wireless configuration, a dedicated wireless configuration that includes a touchscreen, and a fished Ethernet configuration. Each of these configurations is described in detail below.

Figure 18:
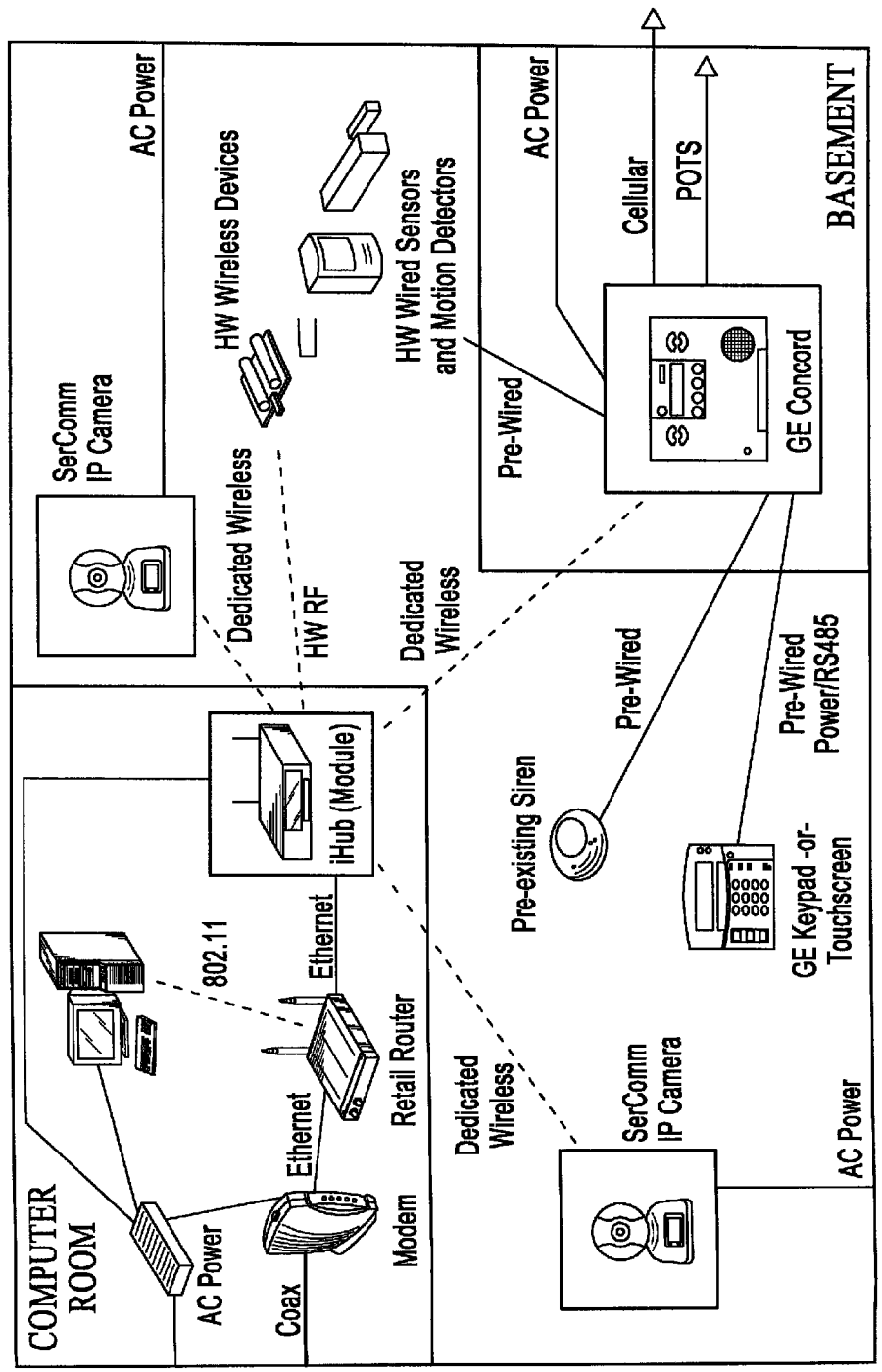
FIG. 18 is a block diagram of a security system in which the legacy panel is replaced with a wireless security panel wirelessly coupled to a gateway, under an embodiment.

FIG. 18 is a block diagram of a security system in which the legacy panel is replaced with a GE Concord panel wirelessly coupled to an iHub, under an embodiment. All existing wired and RF sensors remain in place. The iHub is located near the Concord panel, and communicates with the panel via the 802.11 link, but is not so limited. The iHub manages cameras through a built-in 802.11 router. The iHub listens to the existing RF HW sensors, and relays sensor information to the Concord panel (emulating the equivalent GE sensor). The wired sensors of the legacy system are connected to the wired zones on the control panel.

Figure 19:
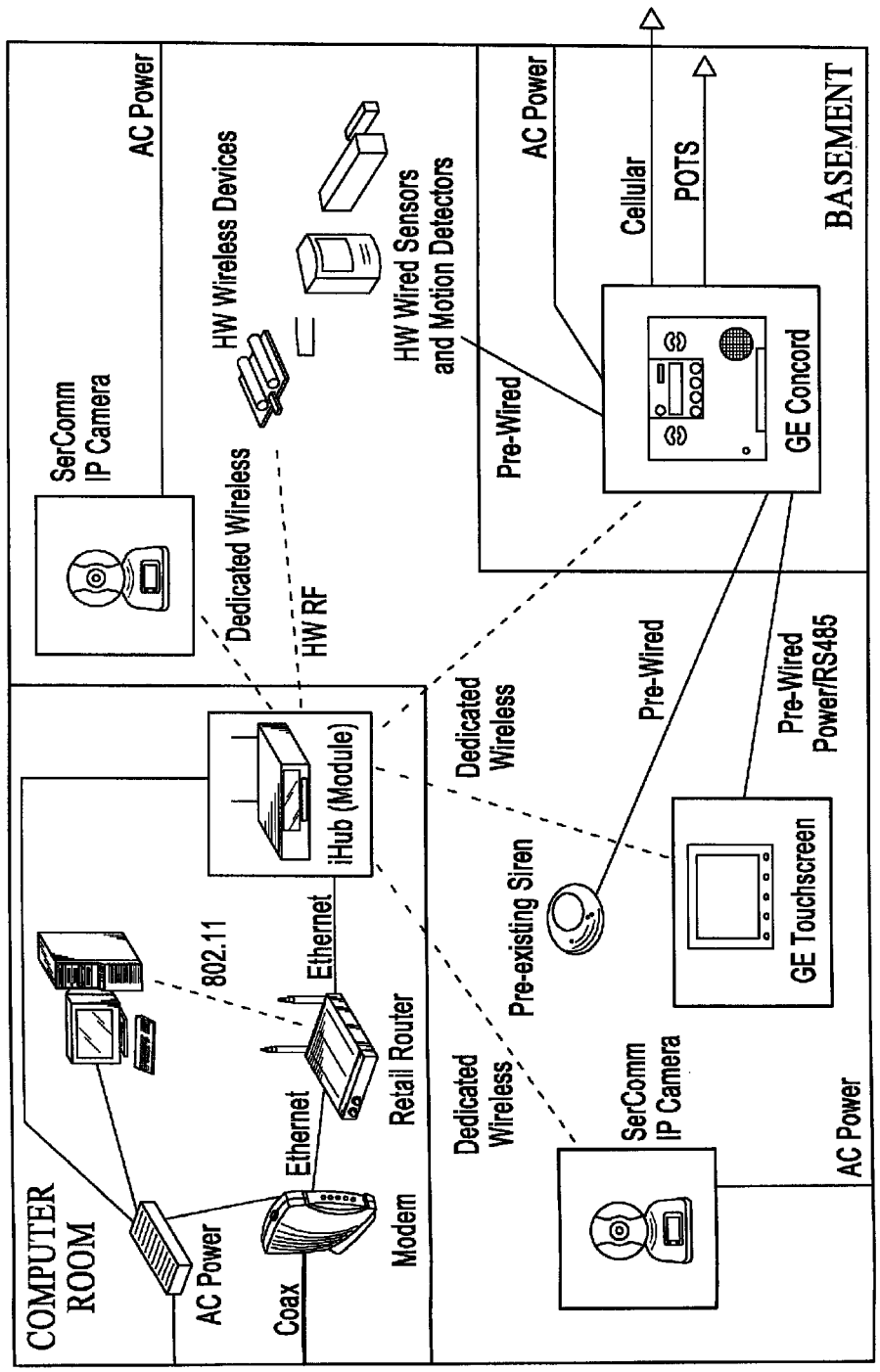
FIG. 19 is a block diagram of a security system in which the legacy panel is replaced with a wireless security panel wirelessly coupled to a gateway, and a touchscreen, under an alternative embodiment.

FIG. 19 is a block diagram of a security system in which the legacy panel is replaced with a GE Concord panel wirelessly coupled to an iHub, and a GE-iControl Touchscreen, under an embodiment. All existing wired and RF sensors remain in place. The iHub is located near the Concord panel, and communicates with the panel via the 802.11 link, but is not so limited. The iHub manages cameras through a built-in 802.11 router. The iHub listens to the existing RF HW sensors, and relays sensor information to the Concord panel (emulating the equivalent GE sensor). The wired sensors of the legacy system are connected to the wired zones on the control panel.

The GE-iControl Touchscreen can be used with either of an 802.11 connection or Ethernet connection with the iHub. Because the takeover involves a GE Concord panel (or Simon XT), the touchscreen is always an option. No extra wiring is required for the touchscreen as it can use the 4-wire set from the replaced keypad of the legacy system. This provides power, battery backup (through Concord), and data link (RS485 Superbus 2000) between Concord and touchscreen. The touchscreen receives its broadband connectivity through the dedicated 802.11 link to the iHub.

Figure 20:
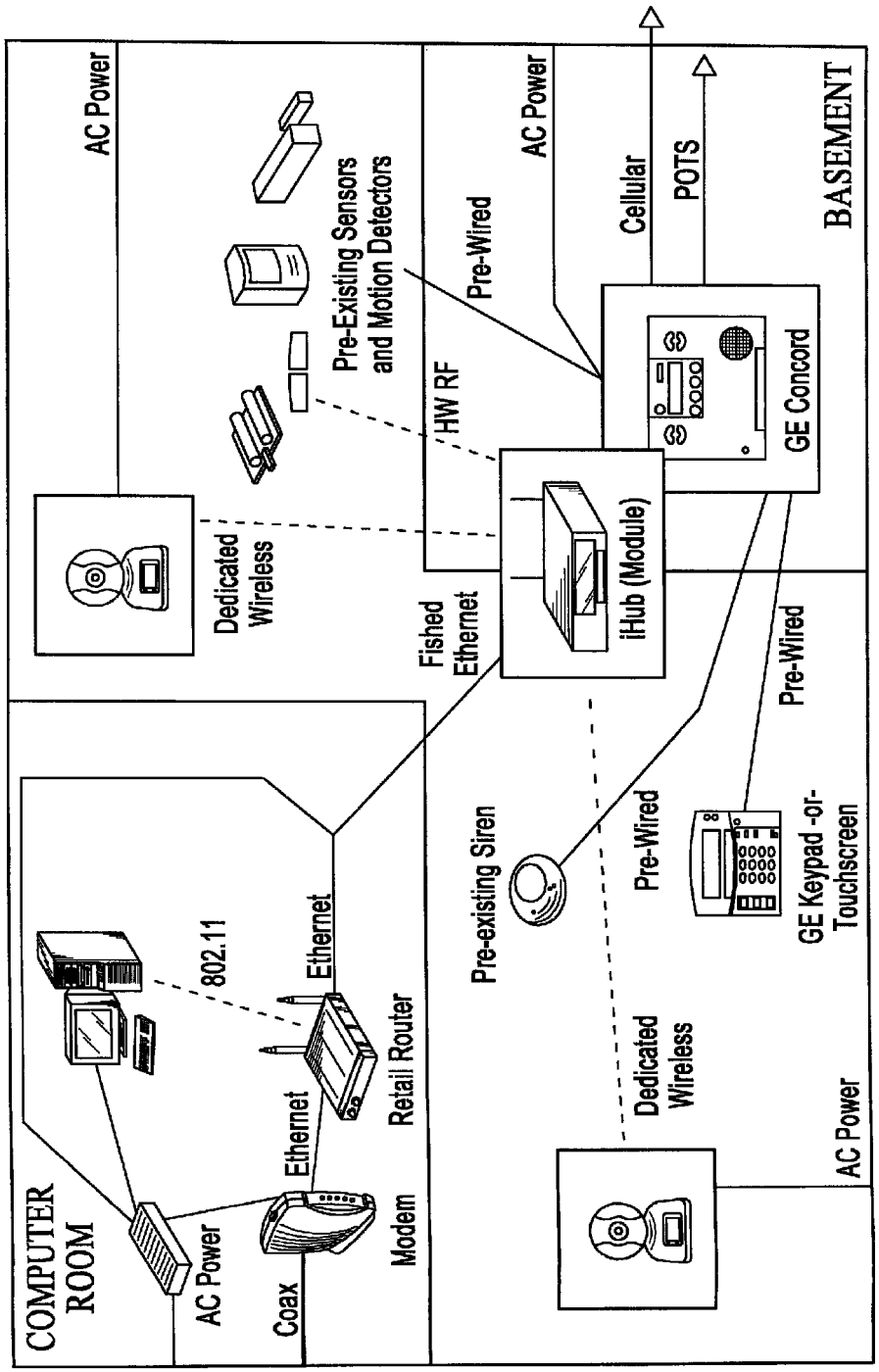
FIG. 20 is a block diagram of a security system in which the legacy panel is replaced with a wireless security panel connected to a gateway via an Ethernet coupling, under another alternative embodiment.

FIG. 20 is a block diagram of a security system in which the legacy panel is replaced with a GE Concord panel connected to an iHub via an Ethernet coupling, under an embodiment. All existing wired and RF sensors remain in place. The iHub is located near the Concord panel, and wired to the panel using a 4-wire SUperbus 2000 (RS485) interface, but is not so limited. The iHub manages cameras through a built-in 802.11 router. The iHub listens to the existing RF HW sensors, and relays sensor information to the Concord panel (emulating the equivalent GE sensor). The wired sensors of the legacy system are connected to the wired zones on the control panel.

The takeover installation process is similar to the installation process described above, except the control panel of the legacy system is replaced; therefore, only the differences with the installation described above are provided here. The takeover approach of an embodiment uses the existing RS485 control interfaces that GE Security and iControl support with the iHub, touchscreen, and Concord panel. With these interfaces, the iHub is capable of automatically enrolling sensors in the panel. The exception is the leverage of an iControl RF card compatible with legacy systems to 'takeover' existing RF sensors. A description of the takeover installation process follows.

During the installation process, the iHub uses an RF Takeover Card to automatically extract all sensor IDs, zones, and names from the legacy panel. The installer removes connections at the legacy panel from hardwired wired sensors and labels each with the zone. The installer pulls the legacy panel and replaces it with the GE Concord panel. The installer also pulls the existing legacy keypad and replaces it with either a GE keypad or a GE-iControl touchscreen. The installer connects legacy hardwired sensors to appropriate wired zone (from labels) on the Concord. The installer connects the iHub to the local network and connects the iHub RS485 interface to the Concord panel. The iHub automatically 'enrolls' legacy RF sensors into the Concord panel as GE sensors (maps IDs), and pushes or otherwise propagates other information gathered from HW panel (zone, name, group). The installer performs a test of all sensors back to CMS. In operation, the iHub relays legacy sensor data to the Concord panel, emulating equivalent GE sensor behavior and protocols.

The areas of the installation process particular to the legacy takeover include how the iHub extracts sensor info from the legacy panel and how the iHub automatically enrolls legacy RF sensors and populates Concord with wired zone information. Each of these areas is described below.

In having the iHub extract sensor information from the legacy panel, the installer 'enrolls' iHub into the legacy panel as a wireless keypad (use install code and house ID—available from panel). The iHub legacy RF Takeover Card is a compatible legacy RF transceiver. The installer uses the web portal to place iHub into 'Takeover Mode', and the web portal the automatically instructs the iHub to begin extraction. The iHub queries the panel over the RF link (to get all zone information for all sensors, wired and RF). The iHub then stores the legacy sensor information received during the queries on the iConnect server.

The iHub also automatically enrolls legacy RF sensors and populates Concord with wired zone information. In so doing, the installer selects 'Enroll legacy Sensors into Concord' (next step in 'Takeover' process on web portal). The iHub automatically queries the iConnect server, and downloads legacy sensor information previously extracted. The downloaded information includes an ID mapping from legacy ID to 'spoofed' GE ID. This mapping is stored on the server as part of the sensor information (e.g., the iConnect server knows that the sensor is a legacy sensor acting in GE mode). The iHub instructs Concord to go into install mode, and sends appropriate Superbus 2000 commands for sensor learning to the panel. For each sensor, the 'spoofed' GE ID is loaded, and zone, name, and group are set based on information extracted from legacy panel. Upon completion, the iHub notifies the server, and the web portal is updated to reflect next phase of Takeover (e.g., 'Test Sensors').

Sensors are tested in the same manner as described above. When a HW sensor is triggered, the signal is captured by the iHub legacy RF Takeover Card, translated to the equivalent GE RF sensor signal, and pushed to the panel as a sensor event on the SuperBus 2000 wires.

In support of remote programming of the panel, CMS pushes new programming to Concord over a phone line, or to the iConnect CMS/Alarm Server API, which in turn pushes the programming to the iHub. The iHub uses the Concord Superbus 2000 RS485 link to push the programming to the Concord panel.

Figure 21:
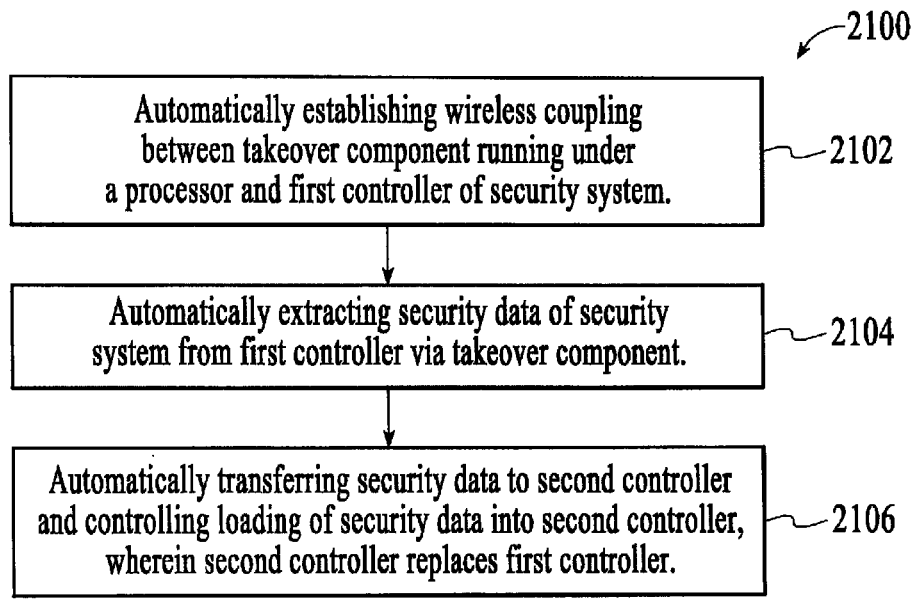
FIG. 21 is a flow diagram for automatic takeover of a security system, under an embodiment.

FIG. 21 is a flow diagram for automatic takeover 2100 of a security system, under an embodiment. Automatic takeover includes establishing 2102 a wireless coupling between a takeover component running under a processor and a first controller of a security system installed at a first location. The security system includes some number of security system components coupled to the first controller. The automatic takeover includes automatically extracting 2104 security data of the security system from the first controller via the takeover component. The automatic takeover includes automatically transferring 2106 the security data to a second controller and controlling loading of the security data into the second controller. The second controller is coupled to the security system components and replaces the first controller.

Figure 22:
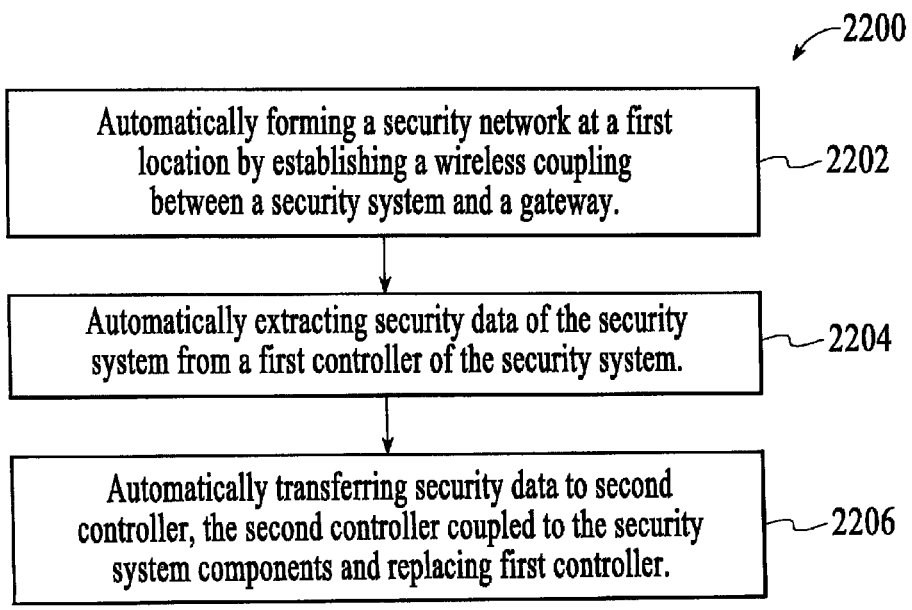
FIG. 22 is a flow diagram for automatic takeover of a security system, under an alternative embodiment.

FIG. 22 is a flow diagram for automatic takeover 2200 of a security system, under an alternative embodiment. Automatic takeover includes automatically forming 2202 a security network at a first location by establishing a wireless coupling between a security system and a gateway. The gateway of an embodiment includes a takeover component. The security system of an embodiment includes security system components. The automatic takeover includes automatically extracting 2204 security data of the security system from a first controller of the security system. The automatic takeover includes automatically transferring 2206 the security data to a second controller. The second controller of an embodiment is coupled to the security system components and replaces the first controller.

Components of the gateway of the integrated security system described herein control discovery, installation and configuration of both wired and wireless IP devices (e.g., cameras, etc.) coupled or connected to the system, as described herein with reference to FIGS. 1-4, as well as management of video routing using a video routing module or engine. The video routing engine initiates communication paths for the transfer of video from a streaming source device to a requesting client device, and delivers seamless video streams to the user via the communication paths using one or more of UPnP port-forwarding, relay server routing and STUN/TURN peer-to-peer routing, each of which is described below.

By way of reference, conventional video cameras have the ability to stream digital video in a variety of formats and over a variety of networks. Internet protocol (IP) video cameras, which include video cameras using an IP transport network (e.g., Ethernet, WiFi (IEEE 802.11 standards), etc.) are prevalent and increasingly being utilized in home monitoring and security system applications. With the proliferation of the internet, Ethernet and WiFi local area networks (LANs) and advanced wide area networks (WANs) that offer high bandwidth, low latency connections (broadband), as well as more advanced wireless WAN data networks (e.g. GPRS or CDMA 1xRTT), there increasingly exists the networking capability to extend traditional security systems to offer IP-based video. However, a fundamental reason for such IP video in a security system is to enable a user or security provider to monitor live or otherwise streamed video from outside the host premises (and the associated LAN).

The conventional solution to this problem has involved a technique known as 'port fowarding', whereby a 'port' on the LAN's router/firewall is assigned to the specific LAN IP address for an IP camera, or a proxy to that camera. Once a port has been 'forwarded' in this manner, a computer external to the LAN can address the LAN's router directly, and request access to that port. This access request is then forwarded by the router directly to the IP address specified, the IP camera or proxy. In this way an external device can directly access an IP camera within the LAN and view or control the streamed video.

The issues with this conventional approach include the following: port forwarding is highly technical and most users do not know how/why to do it; automatic port forwarding is difficult and problematic using emerging standards like UPnP; the camera IP address is often reset in response to a power outage/router reboot event; there are many different routers with different ways/capabilities for port forwarding. In short, although port forwarding can work, it is frequently less than adequate to support a broadly deployed security solution utilizing IP cameras.

Another approach to accessing streaming video externally to a LAN utilizes peer-to-peer networking technology. So-called peer-to-peer networks, which includes networks in which a device or client is connected directly to another device or client, typically over a Wide Area Network (WAN) and without a persistent server connection, are increasingly common. In addition to being used for the sharing of files between computers (e.g., Napster and KaZaa), peer-to-peer networks have also been more recently utilized to facilitate direct audio and media streaming in applications such as Skype. In these cases, the peer-to-peer communications have been utilized to enable telephony-style voice communications and video conferencing between two computers, each enabled with an IP-based microphone, speaker, and video camera. A fundamental reason for adopting such peer-to-peer technology is the ability to transparently 'punch through' LAN firewalls to enable external access to the streaming voice and video content, and to do so in a way that scales to tens of millions of users without creating an untenable server load.

A limitation of the conventional peer-to-peer video transport lies in the personal computer (PC)-centric nature of the solution. Each of the conventional solutions uses a highly capable PC connected to the video camera, with the PC providing the advanced software functionality required to initiate and manage the peer-to-peer connection with the remote client. A typical security or remote home monitoring system requires multiple cameras, each with its own unique IP address, and only a limited amount of processing capability in each camera such that the conventional PC-centric approach cannot easily solve the need. Instead of a typical PC-centric architecture with three components (a "3-way IP Video System") that include a computer device with video camera, a mediating server, and a PC client with video display capability, the conventional security system adds a plurality of fourth components that are standalone IP video cameras (requiring a "4-way IP Video System"), another less-than-ideal solution.

In accordance with the embodiments described herein, IP camera management systems and methods are provided that enable, a consumer or security provider to easily and automatically configure and manage IP cameras located at a customer premise. Using this system IP camera management may be extended to remote control and monitoring from outside the firewall and router of the customer premise.

With reference to FIGS. 5 and 6, the system includes a gateway 253 having a video routing component so that the gateway 253 can manage and control, or assist in management and control, or video routing. The system also includes one or more cameras (e.g., WiFi IP camera 254, Ethernet IP camera 255, etc.) that communicate over the LAN 250 using an IP format, as well as a connection management server 210 located outside the premise firewall 252 and connected to the gateway 253 by a Wide Area Network (WAN) 200. The system further includes one or more devices 220, 230, 240 located outside the premise and behind other firewalls 221, 231, 241 and connected to the WAN 200. The other devices 220, 230, 240 are configured to access video or audio content from the IP cameras within the premise, as described above.

Alternatively, with reference to FIGS. 9 and 10, the system includes a touchscreen 902 or 1002 having a video routing component so that the touchscreen 902 or 1002 can manage and control, or assist in management and control, or video routing. The system also includes one or more cameras (e.g., WiFi IP camera 254, Ethernet IP camera 255, etc.) that communicate over the LAN 250 using an IP format, as well as a connection management server 210 located outside the premise firewall 252 and connected to the gateway 253 by a Wide Area Network (WAN) 200. The system further includes one or more devices 220, 230, 240 located outside the premise and behind other firewalls 221, 231, 241 and connected to the WAN 200. The other devices 220, 230, 240 are configured to access video or audio content from the IP cameras within the premise, as described above.

Figure 23:
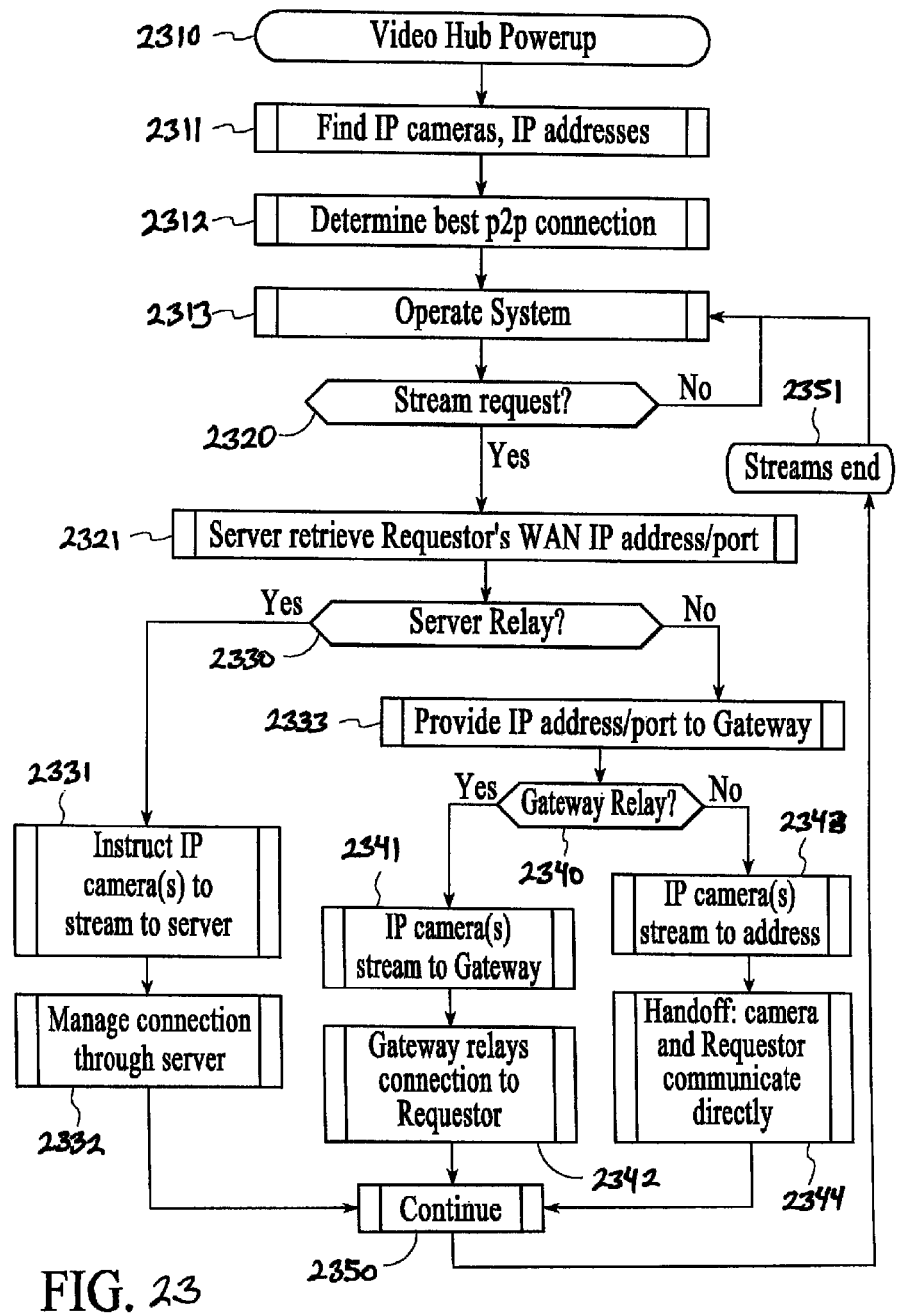
FIG. 23 is a general flow diagram for IP video control, under an embodiment.

FIG. 23 is a general flow diagram for IP video control, under an embodiment. The IP video control interfaces, manages, and provides WAN-based remote access to a plurality of IP cameras in conjunction with a home security or remote home monitoring system. The IP video control allows for monitoring and controlling of IP video cameras from a location remote to the customer premise, outside the customer premise firewall, and protected by another firewall. Operations begin when the system is powered on 2310, involving at a minimum the power-on of the gateway, as well as the power-on of at least one IP camera coupled or connected to the premise LAN. The gateway searches 2311 for available IP cameras and associated IP addresses. The gateway selects 2312 from one or more possible approaches to create connections between the IP camera and a device external to the firewall. Once an appropriate connection path is selected, the gateway begins operation 2313, and awaits 2320 a request for a stream from one of the plurality of IP video cameras available on the LAN. When a stream request is present the server retrieves 2321 the requestor's WAN IP address/port.

When a server relay is present 2330, the IP camera is instructed 2331 to stream to the server, and the connection is managed 2332 through the server. In response to the stream terminating 2351, operations return to gateway operation 2313, and waits to receive another request 2320 for a stream from one of the plurality of IP video cameras available on the LAN.

When a server relay is not present 2330, the requestor's WAN IP address/port is provided 2333 to the gateway or gateway relay. When a gateway relay is present 2340, the IP camera is instructed 2341 to stream to the gateway, and the gateway relays 2342 the connection to the requestor. In response to the stream terminating 2351, operations return to gateway operation 2313, and waits to receive another request 2320 for a stream from one of the plurality of IP video cameras available on the LAN. When a gateway relay is not present 2340, the IP camera is instructed 2343 to stream to an address, and a handoff 2344 is made resulting in direct communication between the camera and the requestor. In response to the stream terminating 2351, operations return to gateway operation 2313, and waits to receive another request 2320 from one of the plurality of IP video cameras available on the LAN.

The integrated security system of an embodiment supports numerous video stream formats or types of video streams. Supported video streams include, but are not limited to, Motion Picture Experts Group (MPEG)-4 (MPEG-4)/Real-Time Streaming Protocol (RTSP), MPEG-4 over Hypertext Transfer Protocol (HTTP), and Motion Joint Photographic Experts Group (JPEG) (MJPEG).

The integrated security system of an embodiment supports the MPEG-4/RTSP video streaming method (supported by video servers and clients) which uses RTSP for the control channel and Real-time Transport Protocol (RTP) for the data channel. Here the RTSP channel is over Transmission Control Protocol (TCP) while the data channel uses User Datagram Protocol (UDP). This method is widely supported by both streaming sources (e.g., cameras) and stream clients (e.g., remote client devices, Apple Quicktime, VideoLAN, IPTV mobile phones, etc).

Encryption can be added to the two channels under MPEG-4/RTSP. For example, the RTSP control channel can be encrypted using SSL/TLS. The data channel can also be encrypted.

If the camera or video stream source inside the home does not support encryption for either RTSP or RTP channels, the gateway located on the LAN can facilitate the encrypted RTSP method by maintaining separate TCP sessions with the video stream source device and with the encrypted RTSP client outside the LAN, and relay all communication between the two sessions. In this situation, any communication between the gateway and the video stream source that is not encrypted could be encrypted by the gateway before being relayed to the RTSP client outside the LAN. In many cases the gateway is an access point for the encrypted and private Wifi network on which the video stream source device is located. This means that communication between the gateway and the video stream source device is encrypted at the network level, and communication between the gateway and the RTSP client is encrypted at the transport level. In this fashion the gateway can compensate for a device that does not support encrypted RTSP.

The integrated security system of an embodiment also supports reverse RTSP. Reverse RTSP includes taking a TCP-based protocol like RTSP, and reversing the roles of client and server (references to "server" include the iControl server, also referred to as the iConnect server) when it comes to TCP session establishment. For example, in standard RTSP the RTSP client is the one that establishes the TCP connection with the stream source server (the server listens on a port for incoming connections). In Reverse RTSP, the RTSP client listens on a port for incoming connections from the stream source server. Once the TCP connection is established, the RTSP client begins sending commands to the server over the TCP connection just as it would in standard RTSP.

When using Reverse RTSP, the video stream source is generally on a LAN, protected by a firewall. Having a device on the LAN initiate the connection to the RTSP client outside the firewall enables easy network traversal.

If the camera or video stream source inside the LAN does not support Reverse RTSP, then the gateway facilitates the Reverse RTSP method by initiating separate TCP sessions with the video stream source device and with the Reverse RTSP client outside the LAN, and then relays all communication between the two sessions. In this fashion the gateway compensates for a stream source device that does not support Reverse RTSP.

As described in the encryption description above, the gateway can further compensate for missing functionalities on the device such as encryption. If the device does not support encryption for either RTSP or RTP channels, the gateway can communicate with the device using these un-encrypted streams, and then encrypt the streams before relaying them out of the LAN to the RTSP Reverse client.

Servers of the integrated security system can compensate for RTSP clients that do not support Reverse RTSP. In this situation, the server accepts TCP connections from both the RTSP client and the Reverse RTSP video stream source (which could be a gateway acting on behalf of a stream source device that does not support Reverse RTSP). The server then relays the control and video streams from the Reverse RTSP video stream source to the RTSP client. The server can further compensate for the encryption capabilities of the RTSP client; if the RTSP client does not support encryption then the server can provide an unencrypted stream to the RTSP client even though an encrypted stream was received from the Reverse RTSP streaming video source.

The integrated security system of an embodiment also supports Simple Traversal of User Datagram Protocol (UDP) through Network Address Translators (NAT) (STUN)/Traversal Using Relay NAT (TURN) peer-to-peer routing. STUN and Turn are techniques for using a server to help establish a peer-to-peer UDP data stream (it does not apply to TCP streams). The bandwidth consumed by the data channel of a video stream is usually many thousands of times larger than that used by the control channel. Consequently, when a peer-to-peer connection for both the RTSP and RTP channels is not possible, there is still a great incentive to use STUN/TURN techniques in order to achieve a peer-to-peer connection for the RTP data channel.

Here, a method referred to herein as RTSP with STUN/TURN is used by the integrated security system. The RTSP with STUN/TURN is a method in which the video streaming device is instructed over the control channel to stream its UDP data channel to a different network address than that of the other end of the control TCP connection (usually the UDP data is simply streamed to the IP address of the RTSP client). The result is that the RTSP or Reverse RTSP TCP channel can be relayed using the gateway and/or the server, while the RTP UDP data channel can flow directly from the video stream source device to the video stream client.

If a video stream source device does not support RTSP with STUN/TURN, the gateway can compensate for the device by relaying the RTSP control channel via the server to the RTSP client, and receiving the RTP data channel and then forwarding it directly to the RTSP with STUN/TURN enabled client. Encryption can also be added here by the gateway.

The integrated security system of an embodiment supports MPEG-4 over HTTP. MPEG-4 over HTTP is similar to MPEG-4 over RTSP except that both the RTSP control channel and the RTP data channel are passed over an HTTP TCP session. Here a single TCP session can be used, splitting it into multiple channels using common HTTP techniques like chunked transfer encoding.

The MPEG-4 over HTTP is generally supported by many video stream clients and server devices, and encryption can easily be added to it using SSL/TLS. Because it uses TCP for both channels, STUN/TURN techniques may not apply in the event that a direct peer-to-peer TCP session between client and server cannot be established.

As described above, encryption can be provided using SSL/TLS taking the form of HTTPS. And as with MPEG-4 over RTSP, a gateway can compensate for a stream source device that does not support encryption by relaying the TCP streams and encrypting the TCP stream between the gateway and the stream client. In many cases the gateway is an access point for the encrypted and private Wifi network on which the video stream source device is located. This means that communication between the gateway and the video stream source device is encrypted at the network level, and communication between the gateway and the video stream client is encrypted at the transport level. In this fashion the gateway can compensate for a device that does not support HTTPS.

As with Reverse RTSP, the integrated security system of an embodiment supports Reverse HTTP. Reverse HTTP includes taking a TCP-based protocol like HTTP, and reversing the roles of client and server when it comes to TCP session establishment. For example, in conventional HTTP the HTTP client is the one that establishes the TCP connection with the server (the server listens on a port for incoming connections). In Reverse HTTP, the HTTP client listens on a port for incoming connections from the server. Once the TCP connection is established, the HTTP client begins sending commands to the server over the TCP connection just as it would in standard HTTP.

When using Reverse HTTP, the video stream source is generally on a LAN, protected by a firewall. Having a device on the LAN initiate the connection to the HTTP client outside the firewall enables easy network traversal.

If the camera or video stream source inside the LAN does not support Reverse HTTP, then the gateway can facilitate the Reverse HTTP method by initiating separate TCP sessions with the video stream source device and with the Reverse HTTP client outside the LAN, and then relay all communication between the two sessions. In this fashion the gateway can compensate for a stream source device that does not support Reverse HTTP.

As described in the encryption description above, the gateway can further compensate for missing functionalities on the device such as encryption. If the device does not support encrypted HTTP (e.g., HTTPS), then the gateway can communicate with the device using HTTP, and then encrypt the TCP stream(s) before relaying out of the LAN to the Reverse HTTP client.

The servers of an embodiment can compensate for HTTP clients that do not support Reverse HTTP. In this situation, the server accepts TCP connections from both the HTTP client and the Reverse HTTP video stream source (which could be a gateway acting on behalf of a stream source device that does not support Reverse HTTP). The server then relays the TCP streams from the Reverse HTTP video stream source to the HTTP client. The server can further compensate for the encryption capabilities of the HTTP client; if the HTTP client does not support encryption then the server can provide an unencrypted stream to the HTTP client even though an encrypted stream was received from the Reverse HTTP streaming video source.

The integrated security system of an embodiment supports MJPEG as described above. MJPEG is a streaming technique in which a series of JPG images are sent as the result of an HTTP request. Because MJPEG streams are transmitted over HTTP, HTTPS can be employed for encryption and most MJPEG clients support the resulting encrypted stream. And as with MPEG-4 over HTTP, a gateway can compensate for a stream source device that does not support encryption by relaying the TCP streams and encrypting the TCP stream between the gateway and the stream client. In many cases the gateway is an access point for the encrypted and private Wifi network on which the video stream source device is located. This means that communication between the gateway and the video stream source device is encrypted at the network level, and communication between the gateway and the video stream client is encrypted at the transport level. In this fashion the gateway can compensate for a device that does not support HTTPS.

The integrated system of an embodiment supports Reverse HTTP. Reverse HTTP includes taking a TCP-based protocol like HTTP, and reversal of the roles of client and server when it comes to TCP session establishment can be employed for MJPEG streams. For example, in standard HTTP the HTTP client is the one who establishes the TCP connection with the server (the server listens on a port for incoming connections). In Reverse HTTP, the HTTP client listens on a port for incoming connections from the server. Once the TCP connection is established, the HTTP client begins sending commands to the server over the TCP connection just as it would in standard HTTP.

When using Reverse HTTP, the video stream source is generally on a LAN, protected by a firewall. Having a device on the LAN initiate the connection to the HTTP client outside the firewall enables network traversal.

If the camera or video stream source inside the LAN does not support Reverse HTTP, then the gateway can facilitate the Reverse HTTP method by initiating separate TCP sessions with the video stream source device and with the Reverse HTTP client outside the LAN, and then relay all communication between the two sessions. In this fashion the gateway can compensate for a stream source device that does not support Reverse HTTP.

As described in the encryption description above, the gateway can further compensate for missing functionalities on the device such as encryption. If the device does not support encrypted HTTP (e.g., HTTPS), then the gateway can communicate with the device using HTTP, and then encrypt the TCP stream(s) before relaying out of the LAN to the Reverse HTTP client.

The servers can compensate for HTTP clients that do not support Reverse HTTP. In this situation, the server accepts TCP connections from both the HTTP client and the Reverse HTTP video stream source (which could be a gateway acting on behalf of a stream source device that does not support Reverse HTTP). The server then relays the TCP streams from the Reverse HTTP video stream source to the HTTP client. The server can further compensate for the encryption capabilities of the HTTP client; if the HTTP client does not support encryption then the server can provide an unencrypted stream to the HTTP client even though an encrypted stream was received from the Reverse HTTP streaming video source.

The integrated security system of an embodiment considers numerous parameters in determining or selecting one of the streaming formats described above for use in transferring video streams. The parameters considered in selecting a streaming format include, but are not limited to, security requirements, client capabilities, device capabilities, and network/system capabilities.

The security requirements for a video stream are considered in determining an applicable streaming format in an embodiment. Security requirements fall into two categories, authentication and privacy, each of which is described below.

Authentication as a security requirement means that stream clients must present credentials in order to obtain a stream. Furthermore, this presentation of credentials should be done in a way that is secure from network snooping and replays. An example of secure authentication is Basic Authentication over HTTPS. Here a username and password are presented over an encrypted HTTPS channel so snooping and replays are prevented. Basic Authentication alone, however, is generally not sufficient for secure authentication.

Because not all streaming clients support SSL/TLS, authentication methods that do not require it are desirable. Such methods include Digest Authentication and one-time requests. A one-time request is a request that can only be made by a client one time, and the server prevents a reuse of the same request. One-time requests are used to control access to a stream source device by stream clients that do not support SSL/TLS. An example here is providing video access to a mobile phone. Typical mobile phone MPEG-4 viewers do not support encryption. In this case, one of the MPEG-4 over RTSP methods described above can be employed to get the video stream relayed to an server. The server can then provide the mobile phone with a one-time request Universal Resource Locator (URL) for the relayed video stream source (via a Wireless Application Protocol (WAP) page). Once the stream ends, the mobile phone would need to obtain another one-time request URL from the server (via WAP, for example) in order to view the stream again.

Privacy as a security requirement means that the contents of the video stream must be encrypted. This is a requirement that may be impossible to satisfy on clients that do not support video stream encryption, for example many mobile phones. If a client supports encryption for some video stream format(s), then the "best" of those formats should be selected. Here "best" is determined by the stream type priority algorithm.

The client capabilities are considered in determining an applicable streaming format in an embodiment. In considering client capabilities, the selection depends upon the supported video stream formats that include encryption, and the supported video stream formats that do not support encryption.

The device capabilities are considered in determining an applicable streaming format in an embodiment. In considering device capabilities, the selection depends upon the supported video stream formats that include encryption, the supported video stream formats that do not support encryption, and whether the device is on an encrypted private Wifi network managed by the gateway (in which case encryption at the network level is not required).

The network/system capabilities are considered in determining an applicable streaming format in an embodiment. In considering network/system capabilities, the selection depends upon characteristics of the network or system across which the stream must travel. The characteristics considered include, for example, the following: whether there is a gateway and/or server on the network to facilitate some of the fancier video streaming types or security requirements; whether the client is on the same LAN as the gateway, meaning that network firewall traversal is not needed.

Streaming methods with the highest priority are peer-to-peer because they scale best with server resources. Universal Plug and Play (UPnP) can be used by the gateway to open ports on the video stream device's LAN router and direct traffic through those ports to the video stream device. This allows a video stream client to talk directly with the video stream device or talk directly with the gateway which can in turn facilitate communication with the video stream device.

Another factor in determining the best video stream format to use is the success of STUN and TURN methods for establishing direct peer-to-peer UDP communication between the stream source device and the stream client. Again, the gateway and the server can help with the setup of this communication.

Client bandwidth availability and processing power are other factors in determining the best streaming methods. For example, due to its bandwidth overhead an encrypted MJPEG stream should not be considered for most mobile phone data networks.

Device bandwidth availability can also be considered in choosing the best video stream format. For example, consideration can be given to whether the upstream bandwidth capabilities of the typical residential DSL support two or more simultaneous MJPEG streams.

Components of the integrated security system of an embodiment, while considering various parameters in selecting a video streaming format to transfer video streams from streaming source devices and requesting client devices, prioritize streaming formats according to these parameters. The parameters considered in selecting a streaming format include, as described above, security requirements, client capabilities, device capabilities, and network/system capabilities. Components of the integrated security system of an embodiment select a video streaming format according to the following priority, but alternative embodiments can use other priorities.

The selected format is UPnP or peer-to-peer MPEG-4 over RTSP with encryption when both requesting client device and streaming source device support this format.

The selected format is UPnP or peer-to-peer MPEG-4 over RTSP with authentication when the requesting client device does not support encryption or UPnP or peer-to-peer MPEG-4 over RTSP with encryption.

The selected format is UPnP (peer-to-peer) MPEG-4 over HTTPS when both requesting client device and streaming source device support this format.

The selected format is UPnP (peer-to-peer) MPEG-4 over HTTP when the requesting client device does not support encryption or UPnP (peer-to-peer) MPEG-4 over HTTPS.

The selected format is UPnP (peer-to-peer) MPEG-4 over RTSP facilitated by gateway or touchscreen (including or incorporating gateway components) (to provide encryption), when the requesting client device supports encrypted RTSP and the streaming source device supports MPEG-4 over RTSP.

The selected format is UPnP (peer-to-peer) MPEG-4 over HTTPS facilitated by gateway or touchscreen (including or incorporating gateway components) (to provide encryption) when the requesting client device supports MPEG-4 over HTTPS and the streaming source device supports MPEG-4 over HTTP.

The selected format is UPnP (peer-to-peer) MJPEG over HTTPS when the networks and devices can handle the bandwidth and both requesting client device and streaming source device support MJPEG over HTTPS.

The selected format is Reverse RTSP with STUN/TURN facilitated by the server when the streaming source device initiates SSL/TLS TCP to server, the streaming source device supports Reverse RTSP over SSL/TLS with STUN/TURN, and the requesting client device supports RTSP with STUN/TURN.

The selected format is Reverse RTSP with STUN/TURN facilitated by server and gateway or touchscreen (including or incorporating gateway components) when the gateway initiates SSL/TLS TCP to the server and to the streaming source device, the streaming source device supports RTSP, and the requesting client device supports RTSP with STUN/TURN.

The selected format is Reverse MPEG over RTSP/HTTP facilitated by the server when the streaming source device initiates SSL/TLS TCP to server, the streaming source device supports Reverse RTSP or HTTP over SSL/TLS, and the requesting client device supports MPEG over RTSP/HTTP.

The selected format is Reverse MPEG over RTSP/HTTP facilitated by server and gateway or touchscreen (including or incorporating gateway components) when the gateway initiates SSL/TLS TCP to server and to streaming source device, the streaming source device supports MPEG over RTSP or HTTP, and the requesting client device supports MPEG over RTSP/HTTP.

The selected format is UPnP (peer-to-peer) MJPEG over HTTP when the networks and devices can handle the bandwidth and when the requesting client device does not support encryption and does not support MPEG-4.

The selected format is Reverse MJPEG over HTTPS facilitated by the server when the streaming source device initiates SSL/TLS TCP to server, the streaming source device supports Reverse MJPEG over SSL/TLS, and the requesting client device supports MJPEG.

The selected format is Reverse MJPEG over HTTPS facilitated by server and gateway or touchscreen (including or incorporating gateway components) when the gateway initiates SSL/TLS TCP to the server and to the streaming source device, the streaming source device supports MJPEG, and the requesting client device supports MJPEG.

Figure 24:
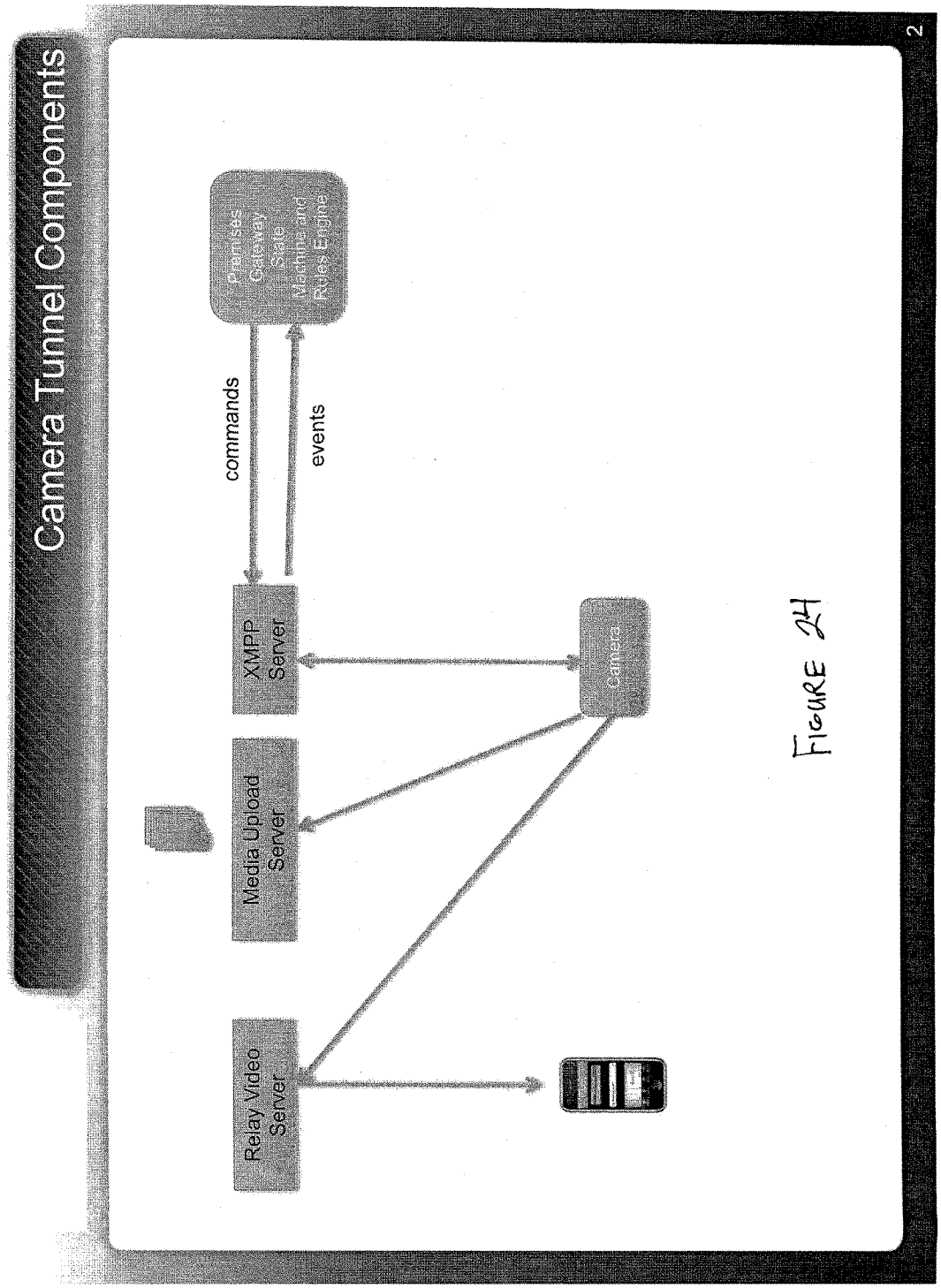
FIG. 24 is a block diagram showing camera tunneling, under an embodiment.

FIG. 24 is a block diagram showing camera tunneling, under an embodiment.

Additional detailed description of camera tunnel implementation details follow.

An embodiment uses XMPP for communication with a remote video camera as a lightweight (bandwidth) method for maintaining real-time communication with the remote camera. More specifically, the remote camera is located on another NAT (e.g., NAT traversal).

An embodiment comprises a method for including a remotely located camera in a home automation system. For example, using XMPP via cloud XMPP server to couple or connect camera to home automation system. This can be used with in-car cameras, cell phone cameras, and re-locatable cameras (e.g., dropped in the office, the hotel room, the neighbor's house, etc.).

Components of an embodiment are distributed so that any one can be offline while system continues to function (e.g., panel can be down while camera still up, motion detection from camera, video clip upload etc. continue to work.

Embodiments extend the PSIA in one or more of the following areas: wifi roaming configuration; video relay commands; wifi connectivity test; media tunnel for live video streaming in the context of a security system; motion notification mechanism and configuration (motion heartbeat) (e.g., helps with scalable server); XMPP for lightweight communication (helps with scalable server, reduced bandwidth, for maintaining persistent connection with a gateway); ping request sent over XMPP as health check mechanism; shared secret authentication bootstrapping process; asynchronous error status delivery by the camera for commands invoked by the gateway if the camera is responsible for delivering errors to the gateway in an asynchronous fashion (e.g., gateway requests a firmware update or a video clip upload).

Embodiments extend the home automation system to devices located on separate networks, and make them useable as general-purpose communication devices. These cameras can be placed in the office, vacation home, neighbor house, software can be put onto a cell phone, into a car, navigation system, etc.

Embodiments use a global device registry for enabling a device/camera to locate the server and home to which it is assigned.

Embodiments include methods for bootstrapping and re-bootstrapping of authentication credentials. The methods include activation key entry by installer into the cloud web interface. Activation key generation is based upon mac address and a shared secret between manufacturer and the service provider. Embodiments of the system allow activation of a camera with valid activation key that is not already provisioned in the global registry server.

Embodiments include a web-based interface for use in activating, configuring, remote firmware update, and re-configuring of a camera.

Embodiments process or locate local wifi access points and provide these as options during camera configuring and re-configuring. Embodiments generate and provide recommendations around choosing a best wifi access point based upon characteristics of the network (e.g., signal strength, error rates, interference, etc.). Embodiments include methods for testing and diagnosing issues with wifi and network access.

Embodiments include cameras able to perform this wifi test using only one physical network interface, an approach that enables the camera to dynamically change this physical interface from wired to wifi. Embodiments are able to change the network settings (wifi etc) remotely using the same process.

Cameras of an embodiment can be configured with multiple network preferences with priority order so that the camera can move between different locations and the camera can automatically find the best network to join (e.g., can have multiple ssid+bssid+password sets configured and prioritized).

Regarding firmware download, embodiments include a mechanism to monitor the status of the firmware update, provide feedback to the end user and improve overall quality of the system.

Embodiments use RTSP over SSL to a cloud media relay server to allow live video NAT traversal to a remote client (e.g., PC, cell phone, etc.) in a secure manner where the camera provides media session authentication credentials to the server. The camera initiates the SSL connection to the cloud and then acts as a RTSP server over this connection.

Embodiments include methods for using NAT traversal for connecting to the cloud for remote management and live video access allows the integrated security components to avoid port forwarding on the local router(s) and as a result maintain a more secure local network and a more secure camera since no ports are required to be open.

Embodiments enable camera sensors (e.g., motion, audio, heat, etc.) to serve as triggers to other actions in the automation system. The capture of video clips or snapshots from the camera is one such action, but the embodiments are not so limited.

A camera of an embodiment can be used by multiple systems.

A detailed description of flows follows relating to the camera tunnel of an embodiment.

A detailed description of camera startup and installation follows as it pertains to the camera tunnel of an embodiment.

Activation Key
   a. camera to follow same algorithm as ihub where activation key is generated from serial based upon a one-way hash on serial and a per-vendor shared secret.
   b. Used com.icontrol.util.ops.activation.ActivationKeyUtil class to validate serialNo<->activationKey.

Registry Request
[partner]/registry/[device type]/[serial]
   a. new column in existing registry table for id type; nullable but the application treats null as "gateway".
   b. rest endpoints allow adding with the new optional argument.
   c. current serial and siteId uniqueness enforcement by application depends upon device type (for any device type, there should be uniqueness on serial; for gateway device type, there should be uniqueness on siteId; for other device types, there need not be uniqueness on siteId).
   d. if no activation yet (e.g., no entry) then send dummy response (random but repeatable reply; may include predictable "dummy" so that steps below can infer.
   e. add/update registry server endpoints for adding/updating entries.

If Camera has No Password
Camera retrieves "Pending Key" via POST to /<CredentialGatewayURL>/GatewayService/<siteID>/PendingDeviceKey.
   a. pending key request (to get password) with serial and activation key.
   b. server checks for dummy reply; if dummy then responds with retry backoff response.
   c. server invokes pass-through API on gateway to get new pending key.
   d. if device is found, then gateway performs validation of serial+activation key, returns error if mismatch.
   e. if activation key checks out, then gateway checks pending key status.
   f. if device currently has a pending key status, then a new pending password is generated.
   g. gateway maintains this authorization information in a new set of variables on the camera device.
   h. device-authorization/session-key comprises the current connected password.
   i. device-authorization/pending-expiry comprises a UTC timestamp representing the time the current pending password period ends; any value less than the current time or blank means the device is not in a pending password state.
   j. device-authorization/pending-session-key comprises the last password returned to the camera in a pending request; this is optional (device may choose to maintain this value in memory).
   k. session-key and pending-session-key variables tagged with "encryption" in the device def which causes rest and admin to hide their value from client.

ConnectInfo Request
  a. returns xmpp host and port to connect to (comes from config as it does for gateway connect info).
  b. returns connectInfo with additional <xmpp> parameter.
Start Portal Add Camera Wizard
  a. user enters camera serial, activation key.
  b. addDevice rest endpoint on gateway called
  c. gateway verifies activation key is correct.
  d. gateway calls addDevice method on gapp server to add LWG_SerComm_iCamera_1000 with given serial to site.
  e. Server detects the camera type and populates registry.
  f. gateway puts device into pending password state (e.g., updates device-auth/pending-expiry point).
  g. rest endpoints on gateway device for managing device pending password state.
  h. start pending password state: POST future UTC value to device-auth/pending-expiry; device-auth/pending-expiry set to 30 minutes from time device was added.
  i. stop pending password state: POST−1 to device-auth/pending-expiry.
  j. check pending password state: GET device-auth/pending-expiry.
  k. message returned with "Location" header pointing to relative URI.
  l. user told to power on camera (or reboot if already powered on).
  m. once camera connects, gateway updates device-auth/pending-expiry to −1 and device-auth/session-key with password and device/connection-status to connected
  n. portal polls for device/connection-status to change to connected; if does not connect after X seconds, bring up error page (camera has not connected—continue waiting or start over).
  o. user asked if wifi should be configured for this camera.
  p. entry fields for wifi ssid and password.
  q. portal can pre-populate ssid and password fields with picklist of any from other cameras on the site.
  r. get XML of available SSIDs.
  s. non-wifi option is allowed.
  t. portal submits options to configure camera (use null values to specify non-wifi); upon success, message is returned with "Location" header pointing to relative URI.
  u. checks configuration progress and extracting "status" and "subState" fields.
  v. puts device state into "configuring"; upon error, puts device state into "configuration failure".
  w. performs firmware upgrade if needed, placing device state into "upgrading"; upon error, puts device state into "upgrade failure".
  x. upon configuration success, puts device state of "ok" and applies appropriate configuration for camera (e.g., resolutions, users, etc.).
  y. if non-blank wifi parameters, automatically perform "wifi test" method to test wifi without disconnecting Ethernet.
  z. portal wizard polls device status until changes to "ok" or "upgrade failure/"configuration failure" in "status" field, along with applicable, if any, with error code reason, in "subState" field; upon error, show details to user, provide options (start over, configure again, reboot, factory reset, etc)
  aa. notify user they can move camera to desired location.

Camera Reboots
  a. gets siteId and server URL from registry.
  b. makes pending paid key request to server specifying correct siteId, serial and activation key; gets back pending password.
  c. makes connectInfo request to get xmpp server.
  d. connects over xmpp with pending password.
If Camera Reboots Again
  a. get siteId and server URL from registry.
  b. already has password (may or may not be pending) so no need to perform pending paid key request.
  c. make connectInfo request to get xmpp server.
  d. connect over xmpp with password.
Xmpp Connect with Password
  a. xmpp user is of the form [serial]@[server]/[siteId]
  b. session server performs authentication by making passthrough API request to gateway for given SiteId.
  c. Session xmpp server authenticates new session using DeviceKey received in GET request against received xmpp client credential.
  d. If authentication fails or GET receives non-response, server returns to camera XMPP connect retry backoff with long backoff.
  e. gateway device performs password management.
  f. compares password with current key and pending key (if not expired); if matches pending, then update device-auth/session-key to be pending value, and clear out the device-auth/pending-expiry.
  g. gateway device updates the device/connection-status point to reflect that camera is connected.
  h. gateway device tracks the xmpp session server this camera is connected to via new point device/proxy-host and updates this info if changed.
  i. if deviceConnected returns message, then session server posts connected event containing xmpp user to queue monitored by all session servers.
  j. session servers monitor these events and disconnect/cleanup sessions they have for same user.
  k. may use new API endpoint on session server for broadcast messages.
Xmpp Connect with Bad Password
  a. Upon receiving a new connection request, session server performs authentication by making passthrough API request to gateway for given SiteId.
  b. Session xmpp server authenticates new session using DeviceKey received in above GET request against received xmpp client credential.
  c. If authentication fails or GET receives non-response from virtual gateway.
  d. Session server rejects incoming connection (is there a backoff/retry XMPP response that can be sent here).
  e. Session server logs event.
  f. Gateway logs event.
Xmpp Disconnect
  a. session server posts disconnected event to gateway (with session server name).
  b. gateway updates the device/connected variable/point to reflect that camera is disconnected.
  c. gateway updates the device/connection-status variable/point to reflect that camera is disconnected.
  d. gateway clears the device/proxy-host point that contains the session host to this camera is connected.
LWGW Shutdown
  a. During LWGW shutdown, gateway can broadcast messages to all XMPP servers to ensure all active XMPP sessions are gracefully shutdown.

b. gateways use REST client to call URI, which will broadcast to all XMPP servers.

To Configure Camera During Installation
  a. applies all appropriate configuration for camera (e.g., resolutions, users, etc).
  b. returns message for configuration applied, wifi test passed, all settings taken. returns other response code with error code description upon any failure.

To Reconfigure Wifi SSID and Key
  a. returns message for wifi credentials set.
  b. returns other response code with error code description upon any failure.

API Pass-Through Handling for Gateway Fail-Over Case
  a. When performing passthrough for LWGW, the API endpoint handles the LWGW failover case (e.g., when gateway is not currently running on any session server).
  b. passthrough functions in the following way: current session server IP is maintained on the gateway object; server looks up gateway object to get session IP and then sends passthrough request to that session server; if that request returns gateway not found message, server error message, or a network level error (e.g., cannot route to host, etc.), if the gateway is a LWGW then server should lookup the primary/secondary LW Gateway group for this site; server should then send resume message to primary, followed by rest request; if that fails, then server send resume message to secondary followed by rest request
  c. alternatively, passthrough functions in the following way: rather than lookup session server IP on gateway object, passthrough requests should be posted to a passthrough queue that is monitored by all session servers; the session server with the Gateway on it should consume the message (and pass it to the appropriate gateway); the server should monitor for expiry of these messages, and if the gateway is a LWGW then server should lookup the primary/secondary LW Gateway group for this site; server should then send resume message to primary, followed by rest request; if that fails, then server send resume message to secondary followed by rest request.

A detailed description follows for additional flows relating to the camera tunnel of an embodiment.

Motion Detection
  a. camera sends openhome motion event to session server via xmpp.
  b. session server posts motion event to gateway via passthrough API.
  c. gateway updates the camera motion variable/point to reflect the event gateway updates the camera motion variable/point to reflect the event Capture Snapshot
  a. gateway posts openhome snapshot command to session server with camera connected.
  b. gateway sends command including xmpp user id to xmpp command Queue monitored by all session servers.
  c. session server with given xmpp user id consumes command and sends command to camera (command contains upload URL on gw webapp).
  d. gateway starts internal timer to check if a response is received from camera (e.g., 5 sec wait window).
  e. if broadcast RabbitMQ not ready, then gateway will use device/proxy-host value to know which session server to post command to.
  f. session server sends command to camera (comprises upload URL on gw webapp)
  g. Example XML body:
    <MediaUpload>
    <id>1321896772660</id>
    <snapShotImageType>JPEG</snapShotImageType>
    <gateway_url>[gatewaysyncUrl]/gw/GatewayService/SPutJpg/s/[siteId]/[deviceIndex]/[varValue]/[varIndex]/[who]/[ts]/[HMM]/[passCheck]/</<failure_url>[gatewaysyncUrl]/gw/GatewayService/SPutJpgError/s/[siteId]/[deviceIndex]/[varValue]/[varIndex]/[who]/[ts]/[HMM]/[passCheck]/</</MediaUpload>
  h. session server receives response to sendRequestEvent from camera and posts response to gateway.
  i. camera uploads to upload URL on gw webapp.
  j. passCheck can be verified on server (based upon gateway secret); alternatively, the OpenHome spec calls for Digest Auth here.
  k. endpoint responds with message digest password if the URI is expected, otherwise returns non-response.
  l. gw webapp stores snapshot, logs history event.
  m. event is posted to gateway for deltas.

Capture Clip
  a. gateway posts openhome video clip capture command to session server with camera connected.
  b. gateway sends command including xmpp user id to xmpp command Queue monitored by all session servers.
  c. session server with given xmpp user id consumes command and sends command to camera (command comprises upload URL on gw webapp).
  d. gateway starts internal timer to check if a response is received from camera (e.g., 5 sec wait window).
  e. session server sends command to camera (comprises upload URL on gw webapp).
  f. Example URI from session server to camera: /openhome/streaming/channels/1/video/upload
  g. Example XML body:
    <MediaUpload>
    <id>1321898092270</id>
    <videoClipFormatType>MP4</videoClipFormatType>
    <gateway_url>[gatewaysyncUrl]/gw/GatewayService/SPutMpeg/s/[siteId]/[deviceIndex]/[varValue]/[varIndex]/[who]/[ts]/[HMM]/[passCheck]/</<failure_url>[gatewaysyncUrl]/gw/GatewayService/SPutMpegFailed/s/[siteId]/[deviceIndex]/[varValue]/[varIndex]/[who]/[ts]/[HMM]/[passCheck]/</</MediaUpload>
  h. session server receives response to sendRequestEvent from camera and posts response to gateway.
  i. camera uploads to upload URL on gw webapp.
  j. passCheck can be verified on server (based upon gateway secret).
  k. alternatively, spec calls for Digest Auth here.
  l. endpoint responds with message digest password if the URI is expected, otherwise returns non-response.
  m. gw webapp stores video clip, logs history event.
  n. event is posted to gateway for deltas.

Live Video (Relay)
  a. Upon user login to portal, portal creates a media relay tunnel by calling relayAPImanager create.
  b. RelayAPImanager creates relays and sends ip-config-relay variable (which instructs gateway to create media tunnel) to gateway.

c. Upon receiving media tunnel create ip-config-relay command, gateway posts openhome media channel create command to session server with camera connected.
d. session server sends create media tunnel command to camera (comprises camera relay URL on relay server).
e. Example URI from session server to camera: /openhome/streaming/mediatunnel/create
f. Example XML body:
   <CreateMediaTunnel>
   <sessionID>1</sessionID>
   <gatewayURL>TBD</gatewayURL>
   <failureURL>TBD</failureURL>
   </CreateMediaTunnel>
g. GatewayURL is created from relay server, port, and sessionId info included within ip-config-relay variable.
h. camera creates a TLS tunnel to relay server via POST to <gatewayURL>.
i. When user initiates live video, portal determines user is remote and retrieves URL of Relay server from relay-APImanager.
j. Upon receiving a user pole connection on the relay server (along with valid rtsp request), relay sends streaming command to camera: example: rtsp:://openhome/streaming/channels/1/rtsp
k. Upon user portal logout, portals calls relayAPImanager to terminate media tunnel.
l. RelayAPImanager send ip-config-relay variable to terminate media tunnel.
m. Gateway sends destroy media tunnel command to camera via XMPP.

Camera Firmware Update
a. Gateway checks camera firmware version; if below minimum version, gateway sends command to camera (via session server) to upgrade firmware (command: /openhome/system/updatefirmware).
b. Gateway checks firmware update status by polling: /openhome/system/updatefirmware/status.
c. Gateway informs portal of upgrade status.
d. Camera auto-reboots after firmware update and reconnects to Session server.

Camera First-Contact Configuration
a. After a camera is added successfully and is connected to the session server for the first time, gateway performs first contact configuration as follows.
b. Check firmware version.
c. Configure settings by: download config file using /openhome/system/configurationData/configFile; or configure each category individually (configure video input channel settings—/openhome/system/video/inputs/channels; onfigure audio input channel settings (if any)—/openhome/system/audio/inputs/channels; configure video streaming channel settings—/openhome/streaming/channels; configure motion detection settings—example: PUT/openhome/custom/motiondetection/pir/0; configure event trigger settings—example: PUT/openhome/custom/event).
d. Reboot camera (/openhome/system/factoryreset) if camera responds with reboot required.

Embodiments of the integrated system described herein include the use of security system data to gather fine-grained behavioral patterns and indicators relating to user occupancy or general daily disposition of a property. Under an embodiment, home automation and security systems may be leveraged to gather data from a plurality of in home (or on premises) sensors and detectors. Each sensor or detector may serve as a proxy for risk indicators. As just one example, frequent triggering of smoke detectors may indicate occupants who smoke or may indicate improper use of a fireplace. The smoke alarm data may be interpreted to assign a higher risk of fire to a property.

Home automation and security system data may under an embodiment be used to generate a risk profile or score analogous to a credit score. The risk profile or score would apply to a residence or a property. Unlike a credit score, this risk score may be associated with a physical location. This score could be sold like a credit score to third parties interested in assessing the risk profile of a physical address, be it a single family home, multi-dwelling unit, store front, business, or commercial and/or government building.

A score associated with a location may reveal risk not evident in usage data associated with an individual. For example, a single individual may own two different properties (an Austin main residence and a lake house) for differing purposes that may lead to differing risks of property damage at each location. Under an embodiment, home automation and home security systems are installed at both properties. Using an algorithm or some combination of data derived from those systems, a score is associated with both the Austin main residence and the lake house outside of Austin. A combination or interpretation of the data may generate a score or indicator showing that the Austin home is continually occupied except when the owner or owner's family is on holiday, whereas the lake home is frequently vacant except when the owner occasionally visits or a neighbor drops off mail at the lake house. Presumably, the profile of those two households—for home owners or renters insurance risk assessment and marketing, mortgage risk, compliance with home owner association provisions, or other purposes—is quite different and knowledge of such would be valuable to firms pricing and marketing such products or enforcing covenants.

Recurrence or presence of particular on-premise activity may indicate or suggest higher or lower prevalence of risk of damage to a property. Under another embodiment, the way an individual lives or behaves in a residence may be reflected in a score or risk profile and may also correlate to other behaviors which might be of interest to third parties. Sources of this particular score may under an embodiment be time based occupancy data from motion detection and frequency of door or window openings; smoke, CO and water detection frequency; percent a home is armed away/stay/night; the presence of surveillance cameras, monitored thermostats; abnormal swings or extreme temperatures inside; light and HVAC usage as an indicator of energy usage; and other such data. All this data is generated by home automation and alarm systems and could be aggregated into the cloud to generate such a score similar to the way credit agencies aggregate disparate information to generate a credit score sold to a variety of interested third parties. The credit score may under an embodiment assign a risk of damage at a particular property location.

Under an embodiment, gathering the home automation and/or security data from a home or business may provide a rich data bank for subsequent or real time analysis. As one example, data analysis methods and algorithms may use data bank data as inputs to generate a profile score assigning risk of damage to a property. Some examples of inputs to the algorithm or data analysis methods include:

Occupancy from door/window open/closes as well as motion or occupancy sensors
Temperature of the inside of the home by day/week/month from thermostat data as well as temperature data from the sensor telemetry Smoke or CO detection frequency by detectors or detector listeners Water detection frequency from water sensors or listeners for water sensor alarms Percent the home security system is armed (away or night) or disarmed Presence and frequency of use of surveillance cameras Presence and frequency of lights being turned on or off Door locks—frequency locked Garage doors frequency opened or closed Present of pets and use of pet doors Energy usage by home Use of and data from geo-fencing technology enabled by smartphones or an automobile device Some of the data might reside or be owned by the provider of the service. The algorithm might require gathering the data from multiple sources.

As indicated above, the risk score discussed herein may be tied to a physical location. However, a risk profile may also be associated with an individual's property ownership tendencies. As one example, an individual may own multiple properties. The home automation and security data gathered at each location may indicate persistent behaviors at each location that increase risk to property. For example, an owner may repeatedly fail to arm existing and available security systems at each location as evidenced by alarm system data. As another example, an owner may repeatedly fail to pay utilities as evidenced by frequent detection of power outages and termination of network connectivity. Disruption of utility services may interfere with or impede operation and reliability of safety systems. As another example, frequent water disruptions at cold weather locations as evidence by water meter data may indicate failure to insulate pipes indicating a track record or poor maintenance. In other words, a collection of home alarm and automation data may indicate that an individual's ownership, use and disposition of property itself introduces unnecessary risk of property damage to that individual's properties.

Under yet another embodiment, home automation and security system data may be used to underwrite an individual with respect to personal property. As indicated above, home automation and security data may reveal that an owner may repeatedly fail to arm existing and available security systems, pay utilities or perform upkeep maintenance with respect to real property. These behaviors may correlate with an individual's tendencies with respect to personal property. For example, data analysis may translate into a score rating an individual's ability to maintain personal property under an embodiment. This personal property score may under an embodiment augment existing data with respect to an individual's use of personal property. As one example, an individual's personal property score or risk profile may be combined with driving habits to indicate heightened risk of damage to that individual's automobile.

What is claimed is:

1. A system comprising:
   a touchscreen at a premises, wherein the touchscreen includes a processor coupled to a security system at the premises;
   network devices located at the premises and coupled to the touchscreen, wherein the touchscreen is configured as a premises gateway of the network devices and the security system;
   a plurality of user interfaces presented via the touchscreen, wherein the plurality of user interfaces include a security interface and a network interface, wherein the security interface provides control of functions of the security system and access to data collected by the security system, wherein the network interface provides access to network devices;
   a security server coupled to the touchscreen, wherein the security server is located at a remote location that is remote to the premises, wherein the security server comprises a client interface through which remote client devices exchange data with the gateway and the security system, wherein at least one of the security server and touchscreen collect behavioral data using the security system and the network devices, and generate a risk score using the behavioral data, wherein the risk score characterizes usage factors of the premises.

* * * * *